United States Patent [19]

Li et al.

[11] Patent Number: 5,418,950
[45] Date of Patent: May 23, 1995

[54] SYSTEM FOR INTERACTIVE CLAUSE WINDOW CONSTRUCTION OF SQL QUERIES

[75] Inventors: Shih-Gong Li; Theodore J. L. Shrader, both of Austin, Tex.

[73] Assignee: International Business Machines Corporation, Armonk, N.Y.

[21] Appl. No.: 310,007

[22] Filed: Sep. 21, 1994

Related U.S. Application Data

[63] Continuation of Ser. No. 878,954, May 4, 1992, abandoned.

[51] Int. Cl.[6] .................................................. G06F 15/40
[52] U.S. Cl. ..................................... 395/600; 395/155; 395/156; 395/157; 364/DIG. 1; 364/260.4; 364/282.1
[58] Field of Search ............... 395/155, 156, 157, 600

[56] References Cited

U.S. PATENT DOCUMENTS

| | | | |
|---|---|---|---|
| 4,068,304 | 1/1978 | Beausoleil et al. | 364/DIG. 1 |
| 4,087,794 | 5/1978 | Beausoleil et al. | 364/DIG. 2 |
| 4,506,326 | 3/1985 | Shaw et al. | 395/700 |
| 4,635,208 | 1/1987 | Coleby et al. | 364/491 |
| 4,686,522 | 8/1987 | Hernandez et al. | 340/709 |
| 4,815,029 | 3/1989 | Barker et al. | 364/900 |
| 4,821,211 | 4/1989 | Torres | 364/521 |
| 4,843,538 | 6/1989 | Lane et al. | 364/188 |
| 4,853,843 | 8/1989 | Ecklund | 364/DIG. 1 |
| 4,868,766 | 9/1989 | Oosterholt | 364/522 |
| 4,873,623 | 10/1989 | Lane et al. | 364/188 |
| 4,885,717 | 12/1989 | Beck et al. | 364/DIG. 2 |
| 4,899,136 | 2/1990 | Beard et al. | 340/706 |
| 4,933,514 | 6/1990 | Bowers | 178/18 |
| 4,939,507 | 7/1990 | Beard et al. | 345/156 |
| 4,945,475 | 7/1990 | Bruffey et al. | 364/DIG. 1 |
| 4,951,190 | 8/1990 | Lane et al. | 364/188 |
| 4,953,080 | 8/1990 | Dysart et al. | 364/DIG. 1 |
| 4,984,152 | 1/1991 | Muller | 364/DIG. 1 |
| 4,989,132 | 1/1991 | Mellender et al. | 364/DIG. 1 |
| 4,996,654 | 2/1991 | Rosenow | 364/521 |
| 5,001,697 | 3/1991 | Torres | 364/521 |
| 5,019,961 | 5/1991 | Addesso et al. | 364/192 |
| 5,040,131 | 8/1991 | Torres | 364/521 |
| 5,041,967 | 8/1991 | Ephrath et al. | 364/DIG. 1 |
| 5,041,982 | 8/1991 | Rathnam | 364/443 |
| 5,121,477 | 6/1992 | Koopmans et al. | 395/156 |
| 5,175,814 | 12/1992 | Anick et al. | 395/161 |
| 5,228,723 | 7/1993 | Heckel | 395/155 |
| 5,261,093 | 11/1993 | Asmuth | 395/600 |
| 5,263,167 | 11/1993 | Conner, Jr. et al. | 395/700 |
| 5,276,870 | 1/1994 | Shan et al. | 495/600 |

OTHER PUBLICATIONS

TSVDA et al, "Iconic Browser And Iconic Retreval System for Object-Oriented Databases", IEEE Workshop on Visual Languages, 4–6 Oct. 1989, Rome, Italy, ISBN 08186 2002 1, pp. 130–137.

IBM Technical Disclosure Bulletin, Interactive Schema Diagram to Visually Represent Tables of Related Data and Meaningful joins between tables, vol. 33, No. 9, Feb., 1991, pp. 243–246.

*Primary Examiner*—Thomas G. Black
*Assistant Examiner*—Wayne Amsbury
*Attorney, Agent, or Firm*—Keith Stephens; Diana L. Roberts

[57] ABSTRACT

A method and system for viewing information stored in one or more rows and columns in a database. The system having a logical progression of choosing a column, determining conditions for a row to be included in a panel, specifying a column to be used as a base to group rows in a panel and a display for viewing the information.

26 Claims, 31 Drawing Sheets

| Main View | | |
|---|---|---|
| NAME: | ORGAREA | |
| COMMENT: | UNION OF THE ORG AND AREA TABLES | |

☒ WITH CHECK OPTION

| | ID | NAME | MANAGER | DIVISION | LOCATION | | | | | | |
|---|---|---|---|---|---|---|---|---|---|---|---|
| ORG.DEPTNUMB UNION AREA.DEPTNUMB | | | | | | | | | | | |
| ORG.DEPTNAME UNION AREA.DEPTNAME | | | | | | | | | | | |
| ORG.MANAGER UNION AREA.COORDINATOR | | | | | | | | | | | |
| ORG.DIVISION UNION AREA.CODE | | | | | | | | | | | |
| ORG.LOCATION UNION AREA.LOCATION | | | | | | | | | | | |

FIG. 3c

Data Structures (Part I)

Logical Table Column List
(Contains a library list for the columns in a Logical Table)

SubselectList
(Contains a library list of subselect statements.)

FullselectString
(Contains the fullselect string.)

ColumnList
(Contains a list of column names.)

SYSTEM FOR INTERACTIVE CLAUSE WINDOW CONSTRUCTION OF SQL QUERIES

This is a continuation of application Ser. No. 07/878,954 filed May 4, 1992, now abandoned.

FIELD OF THE INVENTION

This invention generally relates to improvements in computer based filing systems and more particularly to a system and method for accessing information in a database application.

CROSS REFERENCE TO RELATED APPLICATIONS

Subject matter in the present application is related to the invention in U.S. Patent application; AT9-92-014; Ser. No. 07/878,065 filed May 4, 1992 under the title "DATABASE VIEW", now abandoned.

Subject matter in the present application is related to the invention in U.S. Patent application; AT9-92-030; Ser. No. 07/878,090 filed May 4, 1992 under the title "NAMING DATABASE VIEW COLUMNS", now abandoned.

Subject matter in the present application is related to the invention in U.S. Patent application; AT9-92-031; Ser. No. 07/878,109 filed May 4, 1992 under the title "FULLSELECT FOR A DATABASE VIEW", now abandoned.

Subject matter in the present application is related to the invention in U.S. Patent application; AT9-92-029; Ser. No 07/878,110 filed May 4, 1992 under the title "LOGICAL TABLES FOR A DATABASE VIEW", now abandoned.

Subject matter in the present application is related to the invention in U.S. Patent application; AT9-92-037; Ser. No. 07/878,118 filed May 4, 1992 under the title "MANAGING TABLE ALIASES", now abandoned.

Subject matter in the present application is related to the invention in U.S. Patent application; AT9-92-038; Ser. No. 07/878,066 filed May 4, 1992 under the title "DYNAMICALLY CONSTRUCTING DATABASE ACCESSES", now abandoned.

BACKGROUND OF THE INVENTION

Databases have become the subject of significant recent interest, not only because of the increasing volume of data being stored and retrieved by computerized databases but also by virtue of the data relationships which can be established during the storage and retrieval processes. Most of the interest in databases has concerned users' demands for an improved ergonomic interface to the database through innovative display technology.

Among database objects, table objects are the basis for data storage and retrieval. In a relational database design, data redundancy should be minimized while maintaining data integrity and performance efficiency. To increase the flexibility in retrieving and updating data in the base tables, database view objects are created to provide specific portals to the data in one or more base tables and/or other view objects. View objects also provide a means to control data accessibility by specifying users' authorization on view objects. The view objects are commonly used to hide columns in base tables, select columns from multiple tables into a logical format, and access a subset of the data from base tables.

The complexity of defining a database view object grows with the number of participating base table or view objects, the conditions specified for data selection, the columns selected into the view, the necessary aliases specified for the tables and views involved, and the relationships specified among the selected database objects. A user interface that can help the user handle this complex process for defining a database view object becomes important to database administrators and users. This interface can also be used to define complex SELECT statements that use set operators and/or nested SUBSELECTS.

From a SQL standpoint, a database view object is defined by a FULLSELECT statement, which is composed of a set of SQL SELECT statements. The simplest form of a view object is based on a single SELECT statement with a single base table involved. More likely, the definition of a view object will include multiple SELECT statements and the relationships between them will be specified by set operations (UNION, INTERSECT, etc.). When set operations are involved in a SQL FULLSELECT definition, it is usually difficult for the user to construct the FULLSELECT statement in a plain and flat textual format. In defining a complicated FULLSELECT statement, a user typically thinks from the view object's basic building blocks, which are SELECT statements, and the relationships among the building blocks. A pictorial construction of a FULLSELECT in most users' mental model is like using a Venn Diagram to describe a specific area as discussed in modern algebra.

Structured Query Language (SQL), and in particular ANSI SQL, has become a preferred language media for communicating queries to relational databases. As a consequence, there presently exist thousands of relational databases and thousands of related queries directed to such databases. Given an investment in such databases and queries, migration is not only a desirable feature, but a substantially necessary capability for new relational database systems and methods.

The concept of portraying a query in a graphical depiction on a display screen of a workstation is a relatively new approach to relational database interfacing. Visual queries, often referred to as graphical queries, utilize workstation graphics to represent query objectives heretofore defined by SQL statements. A visual query presents a pictorial depiction of the objectives of a search, thereby eliminating any need for a user to learn a query language, improving the rate at which SQL queries can be formulated, and reducing the defect or error rate of queries.

An example of a prior art approach to a database user interface is found in IBM Technical Disclosure Bulletin, vol. 33, no. 9, pp. 243–6, February 1991, entitled Interactive Schema Diagram to Visually Represent Tables of Related Data and Meaningful Joins Between Tables. The article discusses a non-procedural, graphical relational database interface. The interface uses the database schema graph as a top-level directory and access tool for manipulating tables, attributes and relational join operations.

Another example of a user interface for interfacing to a database application is U.S. Pat. 4,853,843 entitled, System For Merging Virtual Partitions of a Distributed Database. This patent discloses an object-oriented distributed database application which is divided up into partitions. Each partition merges the databases into a single merged database which permits versions of data objects and collections of data objects to be identified and accessed in the merged database.

SUMMARY OF THE INVENTION

Accordingly, it is a primary object of the present invention to provide a user with a database interface matching a user's mental model for defining SQL SELECT statements. The present invention provides a screen layout that intuitively guides a user with prompted interfaces, and also provides a dynamic and flexible way of creating SELECT statements by providing all the needed information and controls on the screen simultaneously.

In the present invention, a display screen is divided, from top to bottom, into seven areas (panes), based on the function and definition of SQL SELECT statements. A user model can be pictured as generating a report in a certain sequence. First, choosing the columns (fields) for the report. Second, determining the conditions for a row (data record) to be included in the report. Third, if grouping is necessary, specifying the columns to be used as a base to put the retrieved rows into groups in the report. Fourth, specifying the conditions for each group to be finally included in the report.

Looking at this screen layout from top to bottom, it matches the sequence described above. Inexperienced users can intuitively define a SELECT statement starting by choosing the columns and expressions for the SELECT clause. Then, working on the WHERE, group-by and HAVING clauses as needed. In most cases, the FROM clause can be formulated automatically by the user interface based on the referenced columns in the other clauses. For experienced users or users who have different models, this screen layout does not restrain their freedom in defining SQL SELECT statements dynamically.

BRIEF DESCRIPTION OF THE DRAWINGS

FIG. 3c shows the View Main Statement screen design in accordance with the subject invention;

FIGS. 16–20a are the flowcharts presenting the detailed logical for the internal processing of the FULLSELECT interface in accordance with the subject invention;

FIGS. 20b–23 are the flowcharts presenting the detailed logical for the internal processing of the logical table interface for user defined columns in accordance with the subject invention;

DETAILED DESCRIPTION OF THE INVENTION

Figures 1A, 1B:
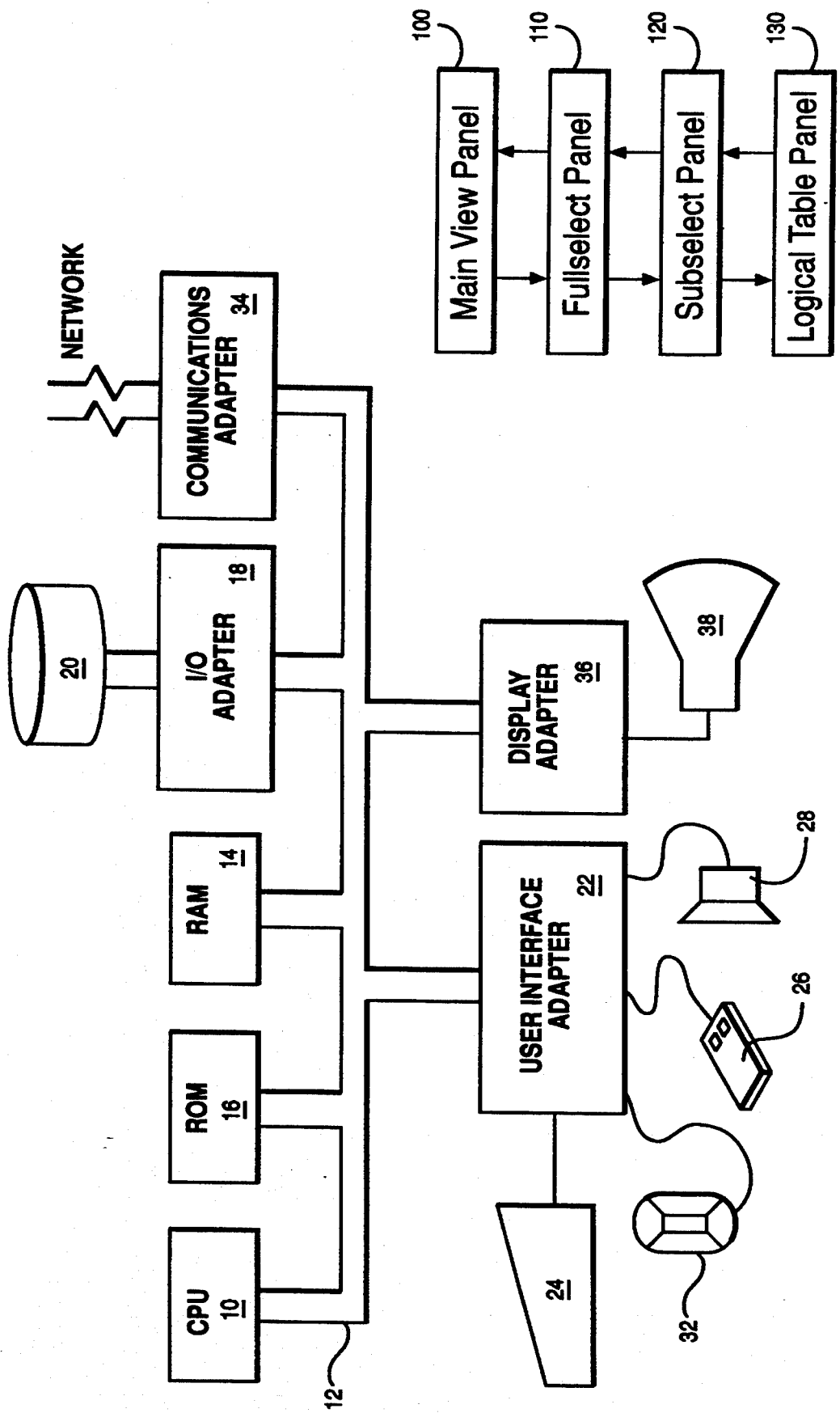
FIG. 1a is a block diagram of a personal computer system in accordance with the subject invention.
FIG. 1b is an illustration of the display hierarchy in accordance with the subject invention.

The invention is preferably practiced in a representative hardware environment as depicted in FIG. 1a, which illustrates a typical hardware configuration of a workstation in accordance with the subject invention having a central processing unit 10, such as a conventional microprocessor, and a number of other units interconnected via a system bus 12. The workstation shown in FIG. 1a includes a Random Access Memory (RAM) 14, Read Only Memory (ROM) 16, an I/O adapter 18 for connecting peripheral devices such as disk units 20 and tape drives 40 to the bus, a user interface adapter 22 for connecting a keyboard 24, a mouse 26, a speaker 28, a microphone 32, and/or other user interface devices such as a touch screen device (not shown) to the bus, a communication adapter 34 for connecting the workstation to a data processing network and a display adapter 36 for connecting the bus to a display device 38.

The invention is a method and system for creating database view objects to provide selective portals to the data in one or more database tables or other views. The database tables created to support the views use all or a subset of one or more base tables or views. However, the keys and indexes of any of the selected tables have no direct bearing on the view definition. Database views are flexible enough to restrict which rows are visible. Views can be divided into four distinct parts: user defined columns (stored in a logical table), SUBSELECT statements, FULLSELECT statement, and the main view statement. The four parts are managed using the following panels:

VIEW LOGICAL TABLE DEFINITION PANEL

The logical table definition panel is the lowest level of the hierarchy. It allows a user to modify existing columns from the current view's base tables or views as shown in FIG. 1b at 130. These columns can then be used in the SUBSELECT panel 120. In a relational database, the expressions and functions specified in SQL SELECT statements are defined by users. Typically, columns are the basic components in these expressions and functions. The columns referenced in the expressions or functions belong to database table or view objects. Because these expressions and functions are used as they were "columns" of a relation, they are classified as "user defined columns", in contrast to the regular columns in "physical" database tables. These "user defined columns" are reusable if they are saved.

The present invention provides a method that allows a set of user defined columns to be saved, named, and managed as a logical table. A logical table is an object that does not have any data stored in it at an instance in time. It is different from a real table, which is a database table object that is a real entity for storing data, or a virtual table, which is a database view object that is a table with stored information during run time.

In the present invention, a logical table in a database has properties, such as name, comment, creator, authorization, etc., similar to a physical table. However, the concept of logical tables is implemented only for managing the saved and reusable user defined columns. It is not designed to address any data management in the database system. Since a logical table does not contain any data at any moment, it cannot be used as entity in database operations. Thus, logical tables cannot be referenced in any SQL statement. They are only used in user interfaces to provide a convenient mechanism for database operations.

View SUBSELECT Panel (FIG. 1b, 120)

SUBSELECT statements are the next highest level in the hierarchy of displays. The SUBSELECT statements are treated as the fundamental building blocks for the view definition because at least one SUBSELECT statement is required for view definition.

In a relational database, queries and views are defined using SQL SELECT statements or their equivalents. In defining a SQL SELECT statement, users typically have a certain model in their mind for definition flow. Pictorially, users think about the format and contents of the result generated by executing a SELECT statement. It starts from choosing the fields of data to be included to build the headings of a query report. This involves identifying the database tables and/or views to which these fields belong. Typically, users are interested in a selective group of data from the chosen fields. Thus, specifying the conditions for selecting data from the chosen database tables is a logical next step. Afterwards, users may want to arrange the query result into groups and display the groups satisfying certain conditions. This requires operations for specifying the criteria for grouping and constraints for selecting groups.

Many user interface designs follow the order in the model and provide a process mechanism in prompted manner. However, a prompted user interface design can only serve a rigid model. Experienced users, prefer to have higher flexibility and use a more object-oriented user interface design. When users are given more freedom, the SQL SELECT statement can be defined in a more robust and dynamic way. However, inexperienced users may easily lose their direction when using a dynamic user interface design for defining a SELECT statement, since this design must comply with multiple SQL rules. As there are several clauses with interrelationships to be specified in a SQL SELECT statement, a user interface design that can guide inexperienced users to define a SELECT statement as desired is needed. In the meantime, this guiding mechanism should not be rigid in restraining experienced users' freedom in defining a SELECT statement in a dynamic manner.

View FULLSELECT Panel (FIG. 1b, 110)

The present invention provides a user with a database interface matching the user's mental model for defining a view object by exploiting the use of predefined and saved SELECT statements. The invention provides a screen layout that allows a user to view and manage a SQL SELECT library, construct a FULLSELECT statement with set operations, immediately see the FULLSELECT statement in SQL text, and modify the FULLSELECT text as desired. A FULLSELECT statement can be thought of as a fully defined query statement in accordance with the SQL language.

A screen layout is disclosed for a user interface that provides a user with a manageable SELECT library list, a set of action buttons, a set of buttons representing operations between SELECT statements, and a text pane that displays the editable FULLSELECT statement. This layout matches the user model of the FULLSELECT statement definition. From top to bottom, it starts from a list of building blocks. The user can select OPEN to view the detailed definition of a SELECT statement on the SUBSELECT panel, DELETE to remove a SELECT statement from the library, CREATE to define a new SELECT statement and store it into the library, and TRANSFER to pick a SELECT statement as a building block for a FULLSELECT statement.

Whenever a SELECT statement in the library is picked and the TRANSFER button is pressed, its SQL text is immediately displayed in the FULLSELECT statement pane. The text appears at the last cursor location in the text pane. The button pane provides buttons representing the supported operations to define the relationships among SELECT statements. The number and types of buttons may vary according to the database implementation. Once a button is pressed, its corresponding text will be displayed in the FULLSELECT statement pane after the last position that the cursor occupied in the text pane. Because the FULLSELECT statement pane is an editable text pane, the user can type in new text and edit existing text. Thus, a user can pick a SELECT statement from the library, which is close to the desired building block, and modify its text directly for inclusion in the FULLSELECT statement. The interface also allows the nesting of SUBSELECT statements. The nested SUBSELECTS are combined into a fullselect statement with set operators.

This screen layout design provides intuitive guidance that matches the user model for building FULLSELECT statements. This is especially useful for aiding inexperienced users because most of the information needed for defining FULLSELECT statements is visible and accessible at the same time. However, it can also provide experienced users with greater flexibility and freedom in defining FULLSELECT statements. In other words, it provides a single interface suitable for both experienced and inexperienced users. This display also provides more information and requires less user operations for both keyboard-oriented and mouse-oriented users, and it reduces the opportunity for user errors.

Mainview Panel (FIG. 1b, 100)

Finally, the Main View panel allows a user to define the view name, attributes and its top-level columns. This panel rests at the "top" of the view hierarchy as shown at label 100 of FIG. 1b.

LOGICAL TABLES

Each logical table contains a set of saved and reusable column expressions, including summary functions on columns. Each defined column expression saved in a logical table is a column of this logical table. The column expressions may be physically stored as fields, but they are treated as columns in the user interface. The saved expression is the column name. Unlike real or virtual tables, the column names in logical tables are usually longer. Column names are the major information a logical table provides in the user interface design. Additional fields can be included in logical tables, such as column length and column type. Both column length and column type can be derived by the functions and arithmetic calculations specified in the expression, the column length and column type of each column used in the expression, and the type and length of each constant used in the expression. Such information is useful to the user when trying to determine the width and type of the query report. The properties of a logical table are maintained each time its contents are modified. For each logical table, its authorization property determines if a user is allowed to use the defined columns saved in this table, if a user can add new defined columns into this table, and if a user can modify or delete any defined column in this table.

Expressions and functions involving columns are sometimes required in a SQL definition of a query or a view. These expressions and functions are usually used in the select, WHERE and HAVING clauses of a SELECT statement, similarly as regular columns are used. Thus, they can be classified as "user defined columns" to distinguish them from the regular columns of tables existing in a relational database. Typically, "user defined columns" with identical or similar definitions will be used in multiple places of a query or view definition, or multiple query or view definitions. The present invention provides a mechanism allowing a user to store a set of the likely reusable "user defined columns" in a logical table with a unique name.

By managing a logical table as a physical table, the proposed mechanism provides the capability for multiple logical tables in a database. When a user interface provides a list of tables that currently exist in a database, all the logical tables to which the user has access authorization are included in the list. Each logical table is displayed by its given name. FIG. 2b illustrates an implementation of the logical table concept for "user defined columns". In the table list 210, Defined Columns 215 is a logical table name that is displayed together with the names of the other real or virtual tables in the particular database. Users can follow a naming convention to easily identify a listed table is a logical table.

Figure 3A:
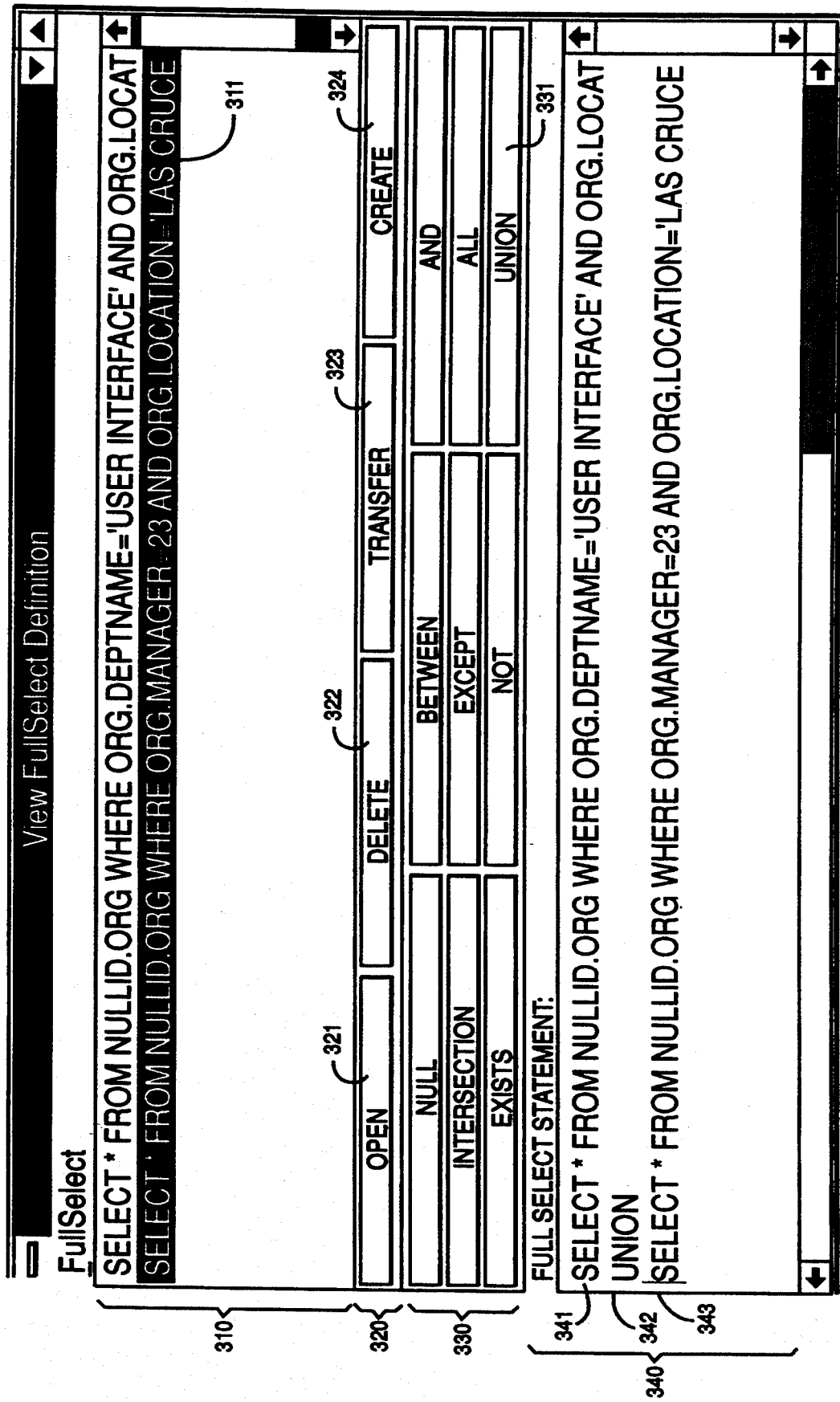
FIG. 3a shows the FULLSELECT screen design in accordance with the subject invention.
Figure 3B:
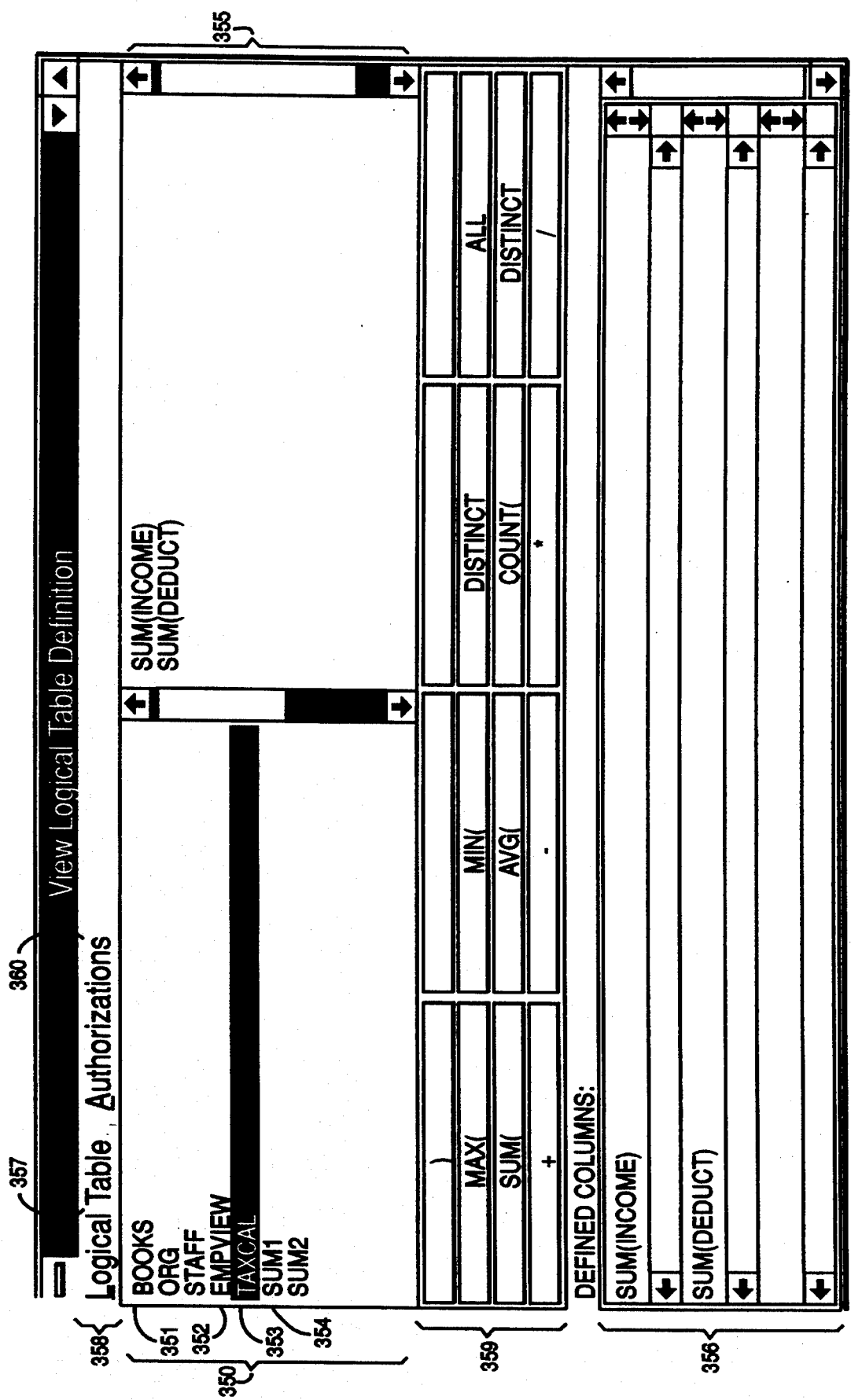
FIG. 3b shows the Logical Table Definition screen design in accordance with the subject invention.

In managing logical tables, the user interface provides users with information on the real tables, the virtual tables (views), and logical tables to which the user has authorization to access. FIG. 3b shows a screen for the logical table management. The table list 350 includes real tables such as BOOKS 351, virtual tables (view objects) such as EMPVIEW 352, logical tables that the user has "write" authorization such as TAXCAL 353, and logical tables that the user has "read only" authorization such as SUM1 354. When a table in the table list 350 is selected, its column information will be displayed in the column list 355. A user can use the columns in the column list 355 as raw materials for defining new "user defined columns." The user can choose to copy the "user defined columns" saved in a logical table into the DEFINED COLUMNS area 356 to facilitate the process by choosing the COPY action from the Logical Table pulldown menu 357 on the action bar 358.

Buttons 359 on the interface can be used in conjunction with the entries in the column list 355 to construct "user defined columns" in the Defined Columns cell panes 356 without the user needing to use the keyboard. Note that the number and types of buttons on the interface will vary according to the database implementation of "user defined columns."

Located below the buttons are the Defined Columns cell panes 356 for storing column expressions of the current logical table. Note that the contents of the cell panes need not reflect the same contents as the column list, since the user may be in the process of defining a new logical table that is different from the column expressions shown in the column list for the selected logical table in the table list. Note again that the numbers and types (scroll bars or not, etc.) of cell panes may differ according to the implementation of the interface.

After defining a set of user defined columns, the authorized user may choose to save them into a logical table, new or existing, by choosing the SAVE . . . action from the Logical Table pulldown menu 357 on the action bar 358. If the specified logical table does not exist, this save operation will create a new logical table with the specified name and save the column expressions in 356 into the newly created logical table. If the specified logical table is an existing one, this save operation will overwrite the logical table with the contents in 356.

Optionally, the interface can display a prompted message requesting confirmation for this overwrite. However, a user can only overwrite the contents of an existing logical table that the user has "write" authorization. After each action, the table list 350 and the corresponding column list 355 is updated accordingly.

Similarly, by specifying the authorization property of a logical table, the creator or administrator can define a set of "user defined columns" for providing convenience to authorized users in query and view definition process. After selecting a logical table in table list 350, the user can choose menu item Authorization 360 in the action bar 358 to add or modify authorization properties for the selected logical table.

Although the concept of a library has been widely adopted in many applications, the present invention provides a mechanism to allow a set of reusable user defined columns that have common properties to be stored together and treated a logical table. This allows multiple logical tables to be defined and to coexist in a database. Instead of putting all user defined columns into a single library, the present invention provides a better organization for managing and using the user defined columns. A table list includes only the tables, views, and logical tables that the particular user has authorization to access. Thus, for each user, only the user defined columns that the user is interested in and authorized to access will be displayed. In addition, the logical tables are displayed together with the physical tables, this can reduce the complexity of defining expressions and functions for SQL SELECT statements, since the logical tables are considered similar to physical tables. Using the present invention, user defined columns are more reusable and manageable.

View SUBSELECT User Interface

In the present invention, the screen is divided, from top to bottom, into seven areas (panes) as shown in FIG. 2b.

(1) The Table-Column List Pairs 210 that allow the user to specify the columns and/or expressions to be included in the select clause. One pair is labeled 211 and 212. The other pair is labeled 217 and 218.

(2) The Comparison Operators Buttons 220 that help the user to define the where clause and/or the HAVING clause.

(3) The SELECT Clause text pane 230 where the SELECT clause can be built.

(4) The FROM Clause text pane 240 where the FROM clause can be built.

(5) The WHERE Clause text pane 250 where the WHERE clause can be built.

(6) The GROUP-BY Clause text pane 260 where the GROUP-BY clause can be built.

(7) The HAVING Clause text pane 270 where the HAVING clause can be built.

The Table-Column List Pairs and the Comparison Operators Buttons provide the column names, expressions, symbols, and comparison keywords that are the basic "raw materials" to put into the SELECT, FROM, WHERE, HAVING and GROUP-BY clauses. Since the SELECT Clause, FROM Clause, WHERE Clause, GROUP-BY Clause, and HAVING Clause are all text panes, the user can type in new text and modify existing text in these panes as needed.

Based on the function and definition of SQL SELECT statements, a user model can be pictured as generating a report in a certain sequence. First, choosing the columns (fields) for the report. Second, determining the conditions for a row (data record) to be included in the report. Third, if grouping is necessary, specifying the columns to be used as a base to put the retrieved rows into groups in the report. Fourth, specifying the conditions for each group to be finally included in the report. The FROM clause in the SELECT statement specifies the tables from which data are retrieved. In most cases, the tables can be determined automatically from the chosen columns.

If there is no column selected in the SELECT Clause text pane, "SELECT *" will be generated for the SELECT clause. The user can also explicitly select a table or view name from the Table List into the FROM Clause text pane.

Looking at this screen layout from top to bottom, it matches the sequence described above. Inexperienced users can intuitively define a SELECT statement starting by choosing the columns and expressions for the SELECT clause. Then, working on the WHERE, GROUP-BY and HAVING clauses as needed. Likely, the FROM clause can be formulated automatically by the user interface based on the referenced columns in the other clauses. For experienced users or users who have different models, this screen layout does not restrain their freedom in defining SQL SELECT statements dynamically.

This screen layout design can satisfy both novice and experienced database users. After an inexperienced user gains a greater understanding of SQL SELECT statements, the same user interface design can still be used and possibly in a more dynamic way. When an experienced user prefers to have more help, the intuitive guidance and needed information are displayed on the screen all the time.

SELECT statements are used for selectively retrieving data from base tables in a database. The basic components in a SQL SELECT statement include the select, FROM, WHERE, GROUP-BY, and HAVING clauses. Other optional clauses are usually used for cosmetic or refinement arrangement on query reports. Different versions of SQL languages may support different optional clauses. However, the five basic clauses are used commonly in all versions of SQL languages and they are sufficient to specify the data to be included in a query report. The present invention focuses on these five basic clauses and provides a screen layout that matches a common user model in dealing with the five clauses. As database view objects are regarded as table objects in the SELECT definition, wherever database table object is mentioned in the following description, it includes view objects as well.

The select clause in a SQL SELECT statement specifies the columns (fields) of the data that will be included in a query report. As different database tables (or views) may have identical column names, the specification of a column in the SELECT clause includes an identification of the database table to which the column belongs. The sequence of the columns specified in the select clause determines the order of the column data in the query report. The specified columns may include columns or expressions of columns.

The FROM clause in a SQL SELECT statement specifies the database tables and views to which referenced columns belong. The referenced columns include columns specified in the other clauses of the SELECT statement. There are occasions where the same table must be referenced more than once in the FROM clause. In those cases, each reference should be assigned with its own alias for unique identification and every referenced column should have the appropriate alias for correct identification. When there is no reference column in any other clause, then a user can select table names from a table list.

The WHERE clause in a SQL SELECT statement specifies the conditions that a row (record) of a referenced table or view must satisfy to qualify for subsequent processing. The GROUP-BY clause in a SQL SELECT statement specifies the columns upon which a regrouping will be performed on the selected rows of the referenced tables. After the regrouping, all rows (records) within any one group have the same value for the GROUP-BY columns. This further step is performed after the qualified rows from referenced tables and views have been selected. The GROUP-BY operation basically rearranges the qualified rows based on the specified GROUP-BY columns. Finally, the HAVING clause is used to specify the conditions that a group must satisfy to be included in the query result.

The invention presents the user with a screen layout as depicted in FIG. 2b which depicts a presentation window divided into seven panes. From top to bottom, they are the Table-Column List Pairs 210, the Comparison Operators Buttons 220, the SELECT Clause text pane 230, the FROM Clause text pane 240, the WHERE Clause text pane 250, the GROUP-BY Clause text pane 260, and the HAVING Clause text pane 270.

The table and column lists in the Table-Column List Pairs 210 are arranged from left to right in a table1-column1-column2-table2 order. The table list 211 and the column list 212 form a table-column pair, and the table list 217 and the column list 218 form another pair. The column lists 212 and 218 are placed next to each other rather a table1-column1-table2-column2 order to make it easier to compare columns of one table against columns in another table. Each table-column pair provides a list of table names and a list of column names for the table highlighted in the table list. For example, when table name ORG 213 is selected, the corresponding column name list 212 displays the column names of table ORG 213.

A user may select a column name in the column name list for a subsequent process. Predefined column expressions are stored in a logical table. This logical table is available in the table name list belonging to the name "Defined Columns" entry 215. When "Defined Columns" is selected, the corresponding column name list displays predefined and saved column expressions. The Comparison Operators Buttons 220 provides the comparison keywords and symbols that are used in the WHERE and HAVING clauses. The Table-Column List Pairs and Comparison Operators Buttons provide the basic information for building a SQL SELECT statement. Note also that the contents of the Comparison Operators Buttons are used for representative purposes only. The number and types of buttons may vary according to the database implementation.

In defining the text for a clause, a user moves a cursor to the desired position in an appropriate text pane to select a target. By choosing the appropriate column name or comparison operator button, the name of the chosen object will be copied into the target text pane after the cursor position. Each text pane is editable, and the user may modify the text in the text pane as needed. For example, to add column names into the text of the SELECT Clause pane, the user positions a cursor at the SELECT Clause text pane and selects the column name from the column name list. This operation is the same for all text panes. Each selected column name is copied to the target location with its table name identifier.

Because each referenced column belongs to a database table that has been specified in the FROM clause, the FROM clause can be built semi-automatically by adding the table name of each referenced column into the FROM clause. When a column name is selected in a column name list, the system will check if the corresponding table name is included in the text in the FROM Clause text pane. Then, if the table name is not included, this is the first time a column of this table is referenced and the table name will be added into the text for the FROM clause. It is possible that a database table may be compared against itself. Whenever this situation is encountered, the referenced table name should have more than one occurrence in the FROM clause and the user needs to specify an alias for each occurrence. After aliases are specified for the occurrences of a table, all referenced columns belong to this table have to be modified accordingly. This modification can be done manually or using a systematic prompted manner.

The screen layout patterns a user model in defining a SELECT statement and intuitively guides the user through the complexity of the SQL language. The same screen layout also provides the user interface that allows a flexible flow in defining a SELECT statement. The user can work on any text pane to build the corresponding clause in any order. However, there is no rigid requirement forcing the user to follow the screen layout arrangement.

User Interface for Managing Table Aliases

The present invention provides a user interface that allows the user to specify, change, or delete one or more of the aliases of a base table or view. In the user interface, each entry of a table list includes a field for the table name and a field for the corresponding alias. If it is a base table or view entry, the alias field is an editable field displaying the alias name. If it is a logical table, the alias field is not editable and displays no text in an inactive or "greyed" shade.

Figure 29:
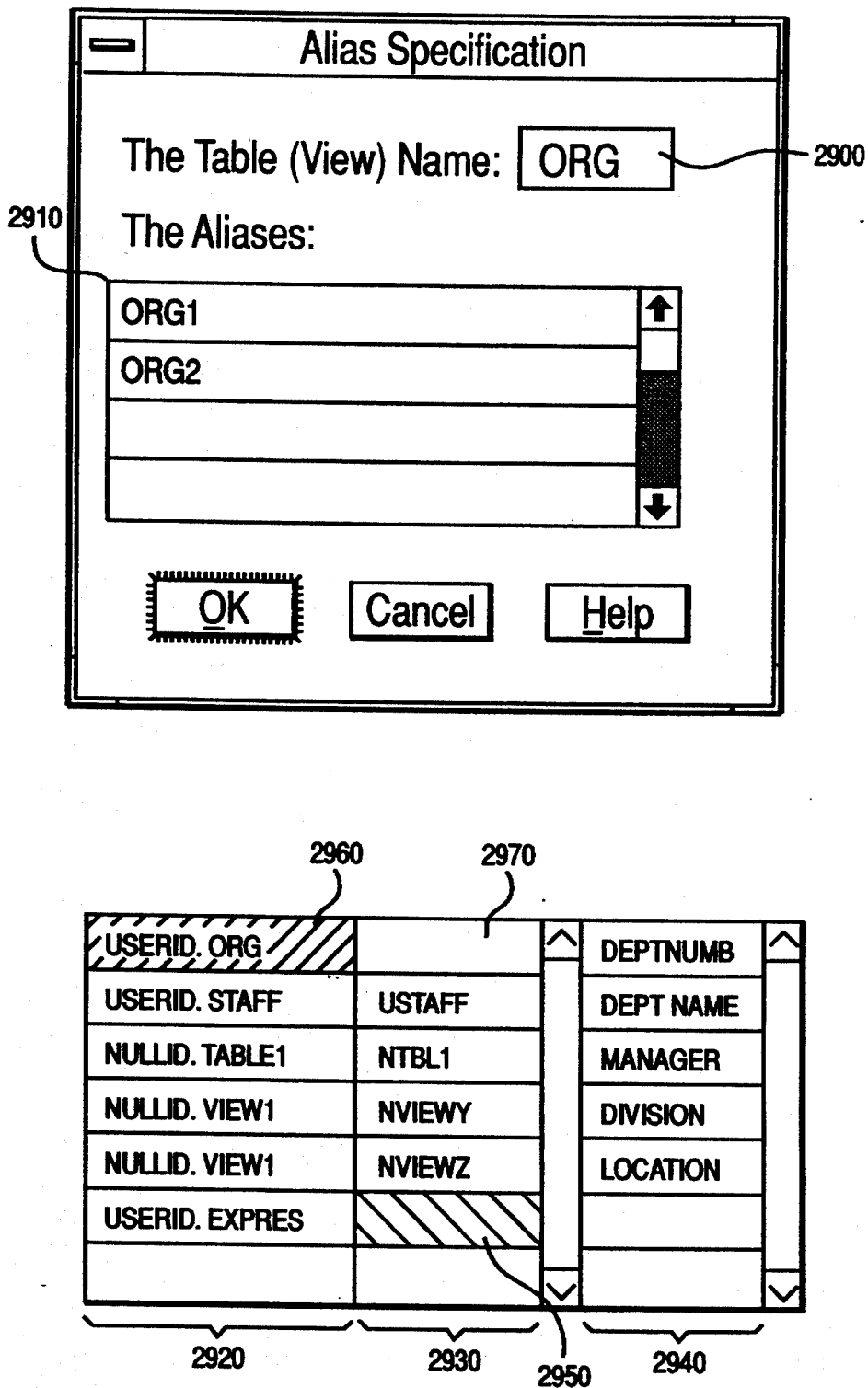
FIG. 29 shows the alias specification dialog box and the modified table and column listboxes with alias name extensions in accordance with the subject invention.

When a user invokes the process for specifying new aliases, a dialog box as shown in FIG. 29 appears. The dialog box prompts the user to specify a base table (or view) name 2900 and its aliases in a multiple-entry listbox 2910. Initially, the multiple-entry list box will contain existing aliases for the table (or view) to allow the user to make a modifications to them and to allow new alias names to be added. After the dialog box is committed, the table listboxes in the user interface will be updated accordingly.

FIG. 29 also provides an example table listbox with corresponding alias entries. The table, view, and logical table names are listed in the first column 2920, their corresponding alias entries are in the adjacent list 2930, and the column list for the currently selected table is in the last list 2940. Thus, USERID.ORG 2960 is the currently selected table, and its columns appear in 2940. Its alias name is ORG 2970. (The alias names for the remaining table and view entries have been changed from their defaults.) Note that the logical table entry USERID.EXPRES does not have an alias and its field is "grayed" out 2950.

In the case where the user selects a table or view name from the table list to add a new alias of the selected entry into the FROM Clause text pane, the same dialog box will be invoked. The user can also choose to change or delete the defined aliases by invoking the same dialog box. To change one alias at a time, the user can move the cursor to the target alias field and edit the text in the field directly. When the user moves the cursor out the alias field, the edit operation completes. To delete an alias, the user can point to the specific alias field and press "DELETE" button or drag the specific entry to the "Shredder" icon, if such a capability is provided in the user interface. However, if the specified entry is the only entry for a base table or view in the table list, this delete operation is invalid and will be discarded.

FROM Clause Building Process

The FROM clause of a SQL SELECT statement specifies the tables and/or views from which data is to be retrieved in a database. Most existing user interface designs for defining SELECT statements ask users to explicitly specify tables and/or views for the FROM clause first, so that the programs can provide the needed information for defining the other clauses. When the FROM clause of a SELECT statement needs multiple occurrences of a table, the user has to specify an alias name for each occurrence of such tables. When an alias is used in a referenced, fully-qualified column name, the FROM clause should include the alias instead of the base table name. However, duplications of table or alias names should be avoided. Specifying all the table names and naming the necessary aliases for the FROM clause of a SELECT statement requires a clear and complete picture of the SELECT statement in the user's mind. This increases the complexity of defining a SELECT statement.

Each column, including base columns and columns in column expressions, referenced in a SQL SELECT statement must belong to a table or view specified in the FROM clause. In the present invention, when a column name in a column list is selected for the SELECT, WHERE, Group-By, or HAVING clauses, the corresponding table or view name of the selected column name is known. By collecting the table (or view) names of the selected columns, the FROM clause can be built automatically. The only exception case happens when there is no referenced column specified for the SELECT, WHERE, GROUP-BY, and HAVING clause, such as when the user specifies a "SELECT *" statement. In this case, the user can select a table or view name from the table list to copy into the FROM Clause text pane.

In the present invention, each table entry in the table list has an alias. Initially, each table or view in the table list is given a default alias, which is identical to the table or view name. The user can specify new aliases, change an alias, or delete an alias of a table. The logical tables in the table list do not have any alias names.

If the selected column entry belongs to a table or view, the alias from its corresponding entry in the table list is retrieved. If the retrieved alias exists in the current FROM Clause text pane, there is no need to add this alias into the FROM Clause text. Otherwise, the alias name will be appended to the current text of FROM Clause text pane.

If the selected column is a column expression that belongs to a logical table, it is possible that multiple base columns are used in the column expression. In this case, the table name to which each specified column in the column expression belongs should be included in the FROM clause. For each specified column, its table name is used to search the table list to locate all the aliases specified in the table list. If none of the searched aliases exist in the current text of the FROM Clause text pane or if there is only one entry for the referenced table in the table list, the first or default alias of the referenced table is chosen automatically. Otherwise, the user will be prompted to choose the right alias to use. After the alias is specified, the alias will be added to the current text of the FROM Clause text pane, if necessary. After the correct aliases have been chosen for all the referenced tables in the selected column expression, the chosen aliases will replace their corresponding base table or view names in the column name text to be copied into the proper text pane.

In the present invention, the user is allowed to explicitly specify a table or view name for inclusion into the FROM clause by placing the cursor in the FROM Clause text pane and then selecting a table or view name from a table list. If the selected entry in the table list is a logical table, this is an invalid operation. If the selected entry is a base table or view, its alias specified in the entry will be used. If the alias does not exist in the current text of the FROM Clause text pane, the alias will be added into the FROM Clause text pane. Otherwise, the user will be prompted if a new alias should be specified.

If the user needs to specify a new alias for the selected table (since the alias already appears in the FROM clause), the user should specify the new alias name and the new alias will be added into the FROM Clause text pane. If the user does not want to specify a new alias name, this operation will be discarded. The present invention provides both the ability to build the FROM clause automatically and for the user interface to allow the user to explicitly specify of the table or view names to be included in the FROM clause.

View FULLSELECT User Interface

SUBSELECT statements can be joined by arithmetic operations or nested within one another in the FULLSELECT Panel. For example, two SUBSELECT statements created in the SUBSELECT panel can be unioned in the FULLSELECT panel.

In SQL, a database view object is defined by a FULLSELECT statement, which is composed of a set of SQL SELECT statements. The simplest form of a view object is based on a single SELECT statement with a single base table involved. The definition of a view object includes multiple SELECT statements and the relationships between them are specified by set operations (UNION, INTERSECT, etc.). When set operations are involved in a SQL FULLSELECT definition, it is difficult for a user to construct the FULLSELECT statement in a plain and flat textual format. In defining a complicated FULLSELECT statement, a user visualizes a statement starting with the view object's basic building blocks, which are SELECT statements, and the relationships among the building blocks. A pictorial construction of a FULLSELECT in a user's mental model is like using a Venn Diagram to describe a specific area.

Figure 2A:
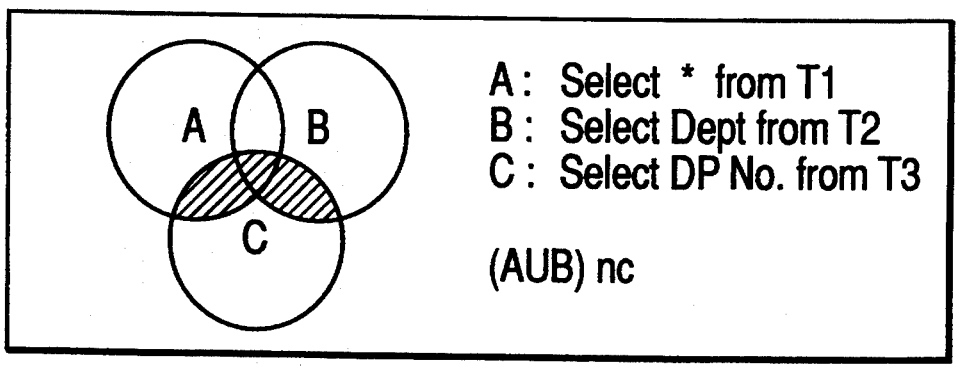
FIG. 2a illustrates a Venn Diagram with the UNION, INTERSECTION, and EXCEPT relationships in accordance with the subject invention.
Figure 2B:
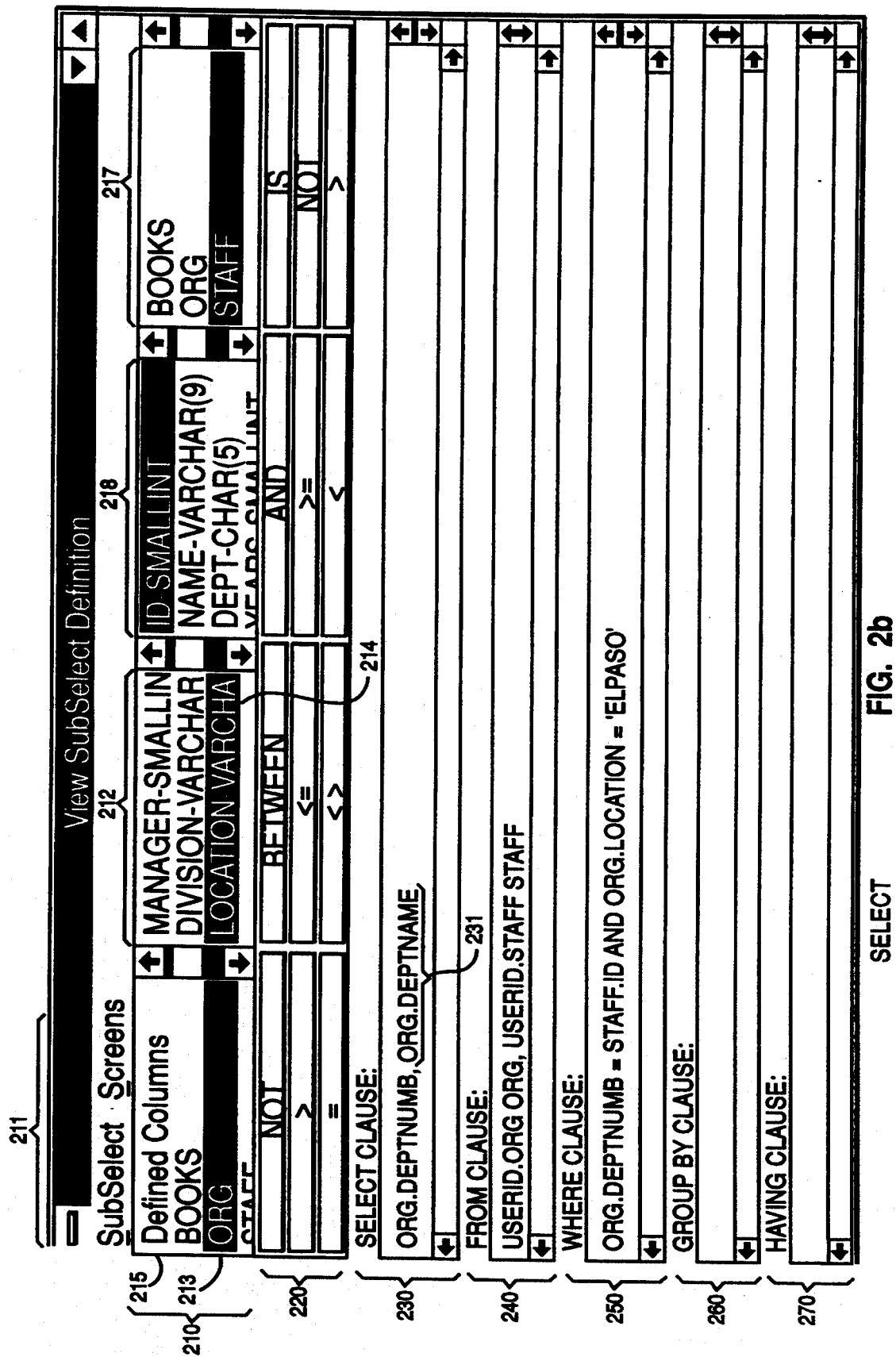
FIG. 2b depicts the SUBSELECT screen design divided into seven panes in accordance with the subject invention.

FIG. 2a illustrates an example of a Venn Diagram with the UNION, INTERSECTION, and EXCEPT relationships described. However, the depiction becomes difficult to comprehend when there are more circles involved in a Venn Diagram. In a user's mental model, a hierarchical approach is usually used to divide the definition of a complex view object into a comprehensible scale and then merge them hierarchically. A good user interface for view object definition should adopt this divide-and-conquer approach by providing an effective way to build the text for a mental Venn Diagram in a comprehensible scale as well as for hierarchical construction using the built textual blocks.

The user can OPEN to see the detailed definition of a SELECT statement, DELETE to remove a SELECT statement from the library, CREATE to define a new SELECT statement and store it into the library, and TRANSFER to pick a SELECT statement as a building block for a FULLSELECT statement.

Whenever a SELECT statement in the library is picked and the TRANSFER button is pressed, its SQL text is immediately displayed in the FULLSELECT statement pane. The text appears just following where the cursor was last located in the text pane. The button pane provides buttons representing the supported operations to define the relationships among SELECT statements. The number and types of buttons may vary according to the database implementation. Once a button is pressed, its corresponding text will be displayed in the FULLSELECT statement pane. Similar to the definition of a SELECT statement from the library, the text of the SELECT statement appears after the cursor in the text pane. Because the FULLSELECT statement pane is an editable text pane, the user can type in new text and can edit existing text. Thus, a user can pick a SELECT statement from the library, which is close to the desired building block, and modify its text directly to construct the FULLSELECT statement. This interface also allows the nesting of SUBSELECT statements in addition to using set operators.

This screen layout design provides intuitive guidance that matches the user model of building FULLSELECT statements. This is especially useful in helping inexperienced users because most of the information needed for defining FULLSELECT statements is visible and accessible at the same time. However, it can also provide experienced users with greater flexibility and freedom in defining FULLSELECT statements. In other words, it provides a single interface suitable for both experienced and inexperienced users. In addition, this screen layout provides more information and requires less user operations for both keyboard-oriented and mouse-oriented users. It reduces the opportunity for user errors.

In defining a database view object, several SQL SELECT statements may be used as building blocks for constructing a FULLSELECT statement. Instead of directly entering text for the FULLSELECT statement, the present invention exploits the use of predefined and saved SELECT statements, which are stored in a library. FIG. 3a shows the FULLSELECT screen design in accordance with the subject invention. The screen is divided into four areas: the SELECT Library List 310, the Action Buttons 320, the Relation Buttons 330, and the FULLSELECT text pane 340. Note that the contents of the Relation Buttons are used for representative purposes only. The number and types of buttons may vary according to the requirements of a particular database implementation.

The SELECT statements in 311 are user manipulable. A user can select a SELECT statement in the SELECT library list for further operations. After a SELECT statement in 310 is selected, it will be highlighted as shown in 311. After a SELECT statement is highlighted, the user can invoke the interface for defining a SELECT statement to view or modify its detailed definition by choosing the OPEN button 321, delete it by choosing the DELETE button 322, and copy its text to the FULLSELECT text pane by choosing the TRANSFER button 323. When a user chooses a CREATE button 324, the interface for defining a new SELECT statement will be invoked regardless of the highlighted SELECT statement in 310.

To specify the relationships between SELECT statements in the FULLSELECT text pane, the user can position the cursor after the text of a copied SELECT statement in the text pane and then choose the appropriate relation button in 330. Text represented by the chosen button will be copied to the target location in the FULLSELECT text pane. For example, after the SELECT statement 341 has been transferred into the FULLSELECT text pane, the user can choose to specify a UNION relation between 341 and the next SELECT statement to be chosen.

By positioning the cursor to the line below 341 and clicking the relation button UNION 331, the text "UNION" is copied into the text pane shown as 342. A user can position the cursor to the line below the text "UNION", select the SELECT statement 311, and then choose the TRANSFER button 323, the text of 311 will be transferred into the text pane shown as 343.

When direct manipulation and "shredder icons" are available, an alternative design does not require the use of Action Buttons 320. A user can double click on a SELECT statement in 310 to open a detailed definition for viewing or modification, single click on a SELECT statement to copy its text to the last cursor location in the FULLSELECT text pane and drag-drop a SELECT statement to a "trash can" to delete it from the library list. Providing a menu item in the action bar or a handle in the Library List allows a user to invoke the program for defining new SELECT statement to be saved in the library. The alternative design still keeps the intuitive guidance the present invention provides to the users in defining a FULLSELECT statement.

The presented screen layout matches the user model in defining FULLSELECT statements. By exploiting the predefined and saved SELECT statements, together with the keywords for specifying relations among SELECT statements provided by the Relation Buttons, users are not required to work on the FULLSELECT statements in a flat textual format. With the building blocks in the SELECT Library List and glues in the Relation Buttons, the complexity of defining a FULLSELECT statement can be greatly reduced.

Naming Database View Columns

A database view object is a relation referenced similarly as physical tables in SQL queries. In queries, column names are the most commonly used identifiers for both views and tables. When a database view is defined, the user usually prefers to give each column in the view a name close to the column's natural property or its role in an application. For the views that are defined for general use without any specific application, the user may prefer to name all the columns with the same prefix. The natural properties of view columns depend on the FULLSELECT specified in the view definition. However, the plain text format of a FULLSELECT statement in a view definition usually is not comprehensible for a user to identify the natural properties of the view columns. Thus, naming view columns becomes a complicated task for the user in defining a database view object.

Accordingly, the present invention provides a user interface design allowing users to exploit the information provided in a base column list or to take advantage of the default naming conventions for naming view columns. Each entry in the base column list describes the base for a view column as defined in the FULLSELECT statement specified for the view definition. For a view definition, the interface will build the base column list based on the selected columns in the order as they are referenced in the select clause of each SELECT statement specified in the FULLSELECT statement. The textual description of a base column entry can provide basic information about the definition of a view column. When the user needs to know more about a view column's natural property, the user can choose to open the corresponding entry in the base column list for more information. The user interface allows the user to directly type in view column names, specify a common prefix for view column names, or adopt default naming convention.

In the present invention, FIG. 3c depicts a user interface that provides a list of base columns and a list of entries for defining the columns of a database view object. The left list 370 is the base column list for view columns of a database view object under definition. In the base column list, each entry is a full expression of column combinations that serves as the base of a new view column, which is named in the corresponding entry in the right list 371. For example, an entry 372, with text "ORG.DEPTNUMB UNION AREA.-DEPTNUMB", in the base column list displays the basic information that shows the natural property of the first column in the database view under definition. The entry field is scrollable in case the contents do not fit in the current display area. Its corresponding entry ID 373 in list 371 is the entry field for the user to define the name for the first column for this view object.

In the present invention, a user can double click on an entry in the base column list 370 to obtain a full description of the comment that belongs to the first column in the entry expression. The dialog box showing the comment scrolls to present comments of the other columns as well. A user can then reference comments and names corresponding to a new view column mnemonically. The right list 371 is an editable entry list that the user can type in names for view columns. At any instance when the interface is available, the user can choose to edit any entry in 371. In addition, this interface also allows the user to choose to define the common prefix for column names of the view object under definition. A dialog box, which is not shown in FIG. 3c, is displayed to allow a user type in the text for a common prefix. After a common prefix is specified, each entry in the right list 371 is updated accordingly. When a user prefers to adopt the default naming convention provided by the interface for view columns, each view column will be named with the common prefix, if it has been specified, and concatenated with its sequence number.

If a common prefix is not defined yet, a system-supplied text is used. When the default naming convention is adopted, any defined view column name in the right list 371 will be overridden. Note that if new names are not supplied by the user, the default naming convention will be adopted automatically.

The present invention provides comprehensible information about the natural property of view columns for a more mnemonic naming. It also provides a method that allows the user to define a preferred common prefix for view column names, adopt the default naming convention, and edit any view column name dynamically. By integrating these methods into a single user interface, the user has higher flexibility in naming the view columns.

Figure 4:
FIG. 4 is a data structure in accordance with the subject invention.
Figure 4:
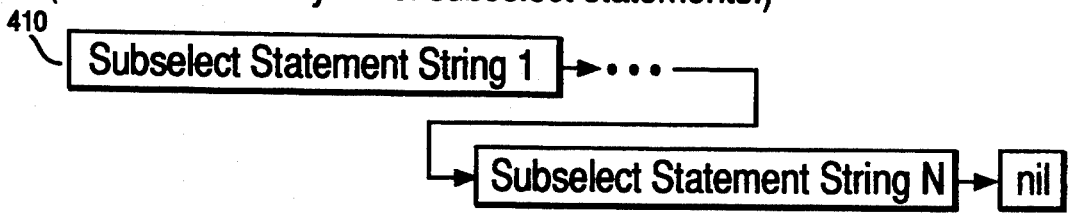
Figure 4:
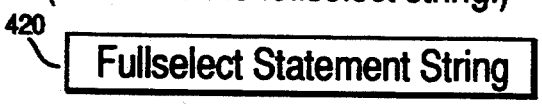
Figure 4:
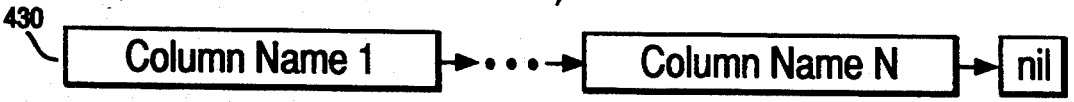

| Data Structures | |
|---|---|
| select_string | This string is constructed by concatenating the contents of the text panes and their keywords. For example, if all the text panes had values, then the string would equal SELECT (select_pane contents FROM (from_pane contents) WHERE (where_pane contents) GROUP BY (groupby_pane contents) HAVING (having_pane contents). If some panes are empty, such as the WHERE or HAVING panes, they and their associated keywords will not be included with the string. If the selected columns pane does not contain entries, its contents will default to the asterisk symbol. In SQL, the columns for all the tables and views in the FROM clause will be displayed. |
| from_string | contains the contents of the FROM clause pane. |
| where_string | contains the contents of the WHERE clause pane. |
| groupby_string | contains the contents of the GROUPBY clause pane. |
| having_string | contains the contents of the HAVING clause pane. |
| cursor_pos | stores the position and the text pane in which the cursor was last located. |
| library | contains the select_strings (SELECT statements) that were previously stored by the user. This library can reside on disk. An example of this data structure appears in FIG. 4 at 410. |
| full_select | this data structure contains the contents of the fullselect text pane. An example of this data structure appears at 420 of FIG. 4. |
| main_view | this data structure stores the values used by the Main View user interface, as shown in FIG. 3c. It contains the view object's name string, comment string, with_check_option attribute, other attributes, and the fullselect statement string. An example of this data structure appears at 520 of FIG. 5. |
| view_columns | This structure consists of a linked list of entries with each entry containing the base_column string and its corresponding new_column string. The base_column strings are created when the interface parses the fullselect_statement. |
| table_list | This data structure stores all the tables, views, and logical tables to which the user has access. |
| column_list | This data structure stores all the column names or column expressions for the selected entry in the table list. An example of the column_list data structure appears in FIG. 4 at 400 and 430. |
| cell_list | This data structure stores the contents of all the cell panes in the Logical Table interface. |

Figure 5:
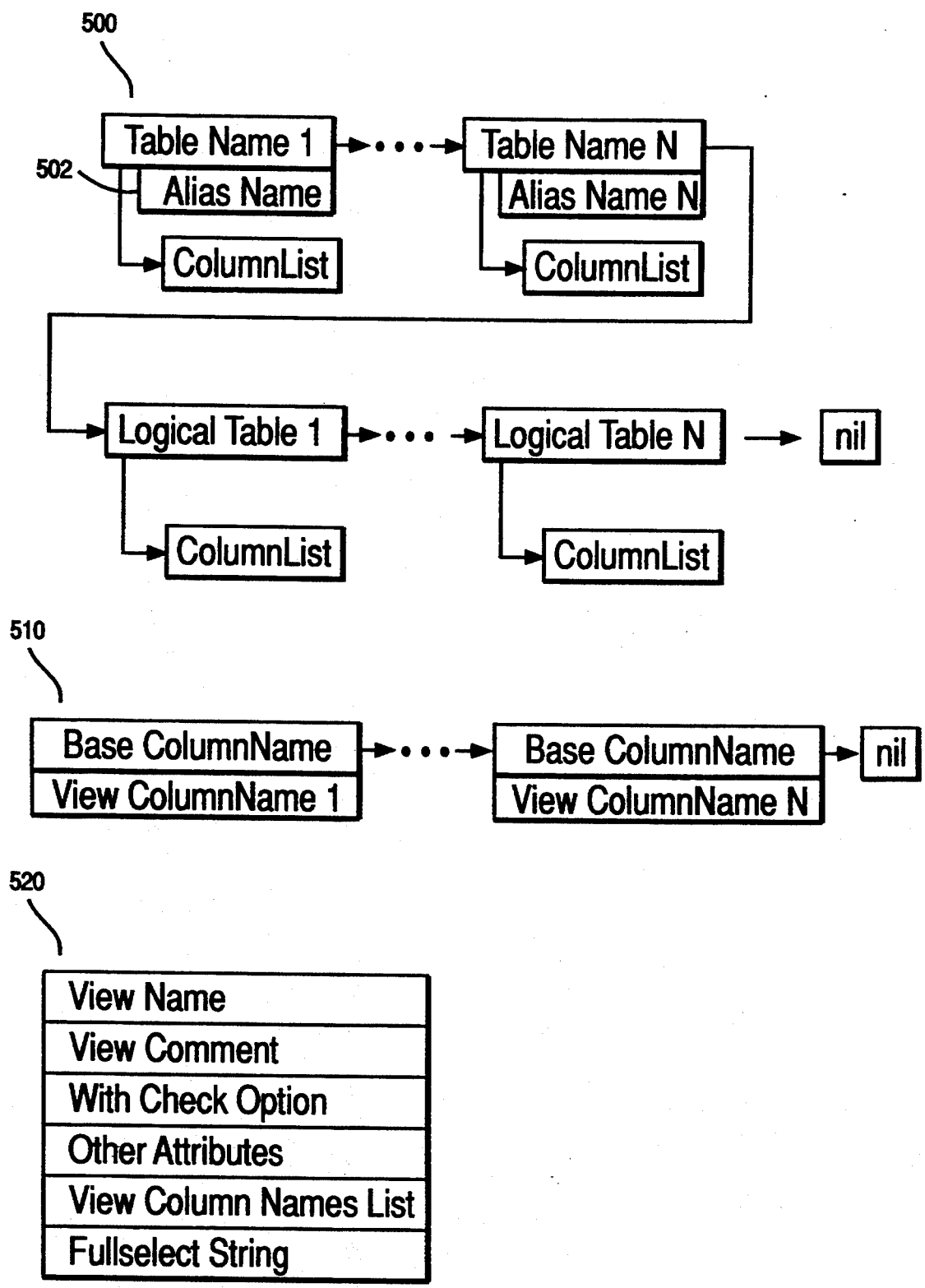
FIG. 5 contains a pictorial presentation of a data structure for TableViewList 500, ViewColumn-NamesList 510, and ViewStructure 520. TableViewList 500 contains a list of the created table and view names which a user has access to in accordance with the subject invention.

FIG. 5 contains a pictorial presentation of a data structure for TableViewList 500, ViewColumnNamesList 510, and ViewStructure 520. TableViewList 500 contains a list of the created table, view and logical table names which a user has access. The table name has an alias name associated with it that is similar to the previously described table_list.

The ViewColumnNamesList 510 data structure contains a list of each base column name in the view definition and its view column name if any is defined.

FLOWCHARTS DEPICTING DETAILED LOGIC

Figure 6:
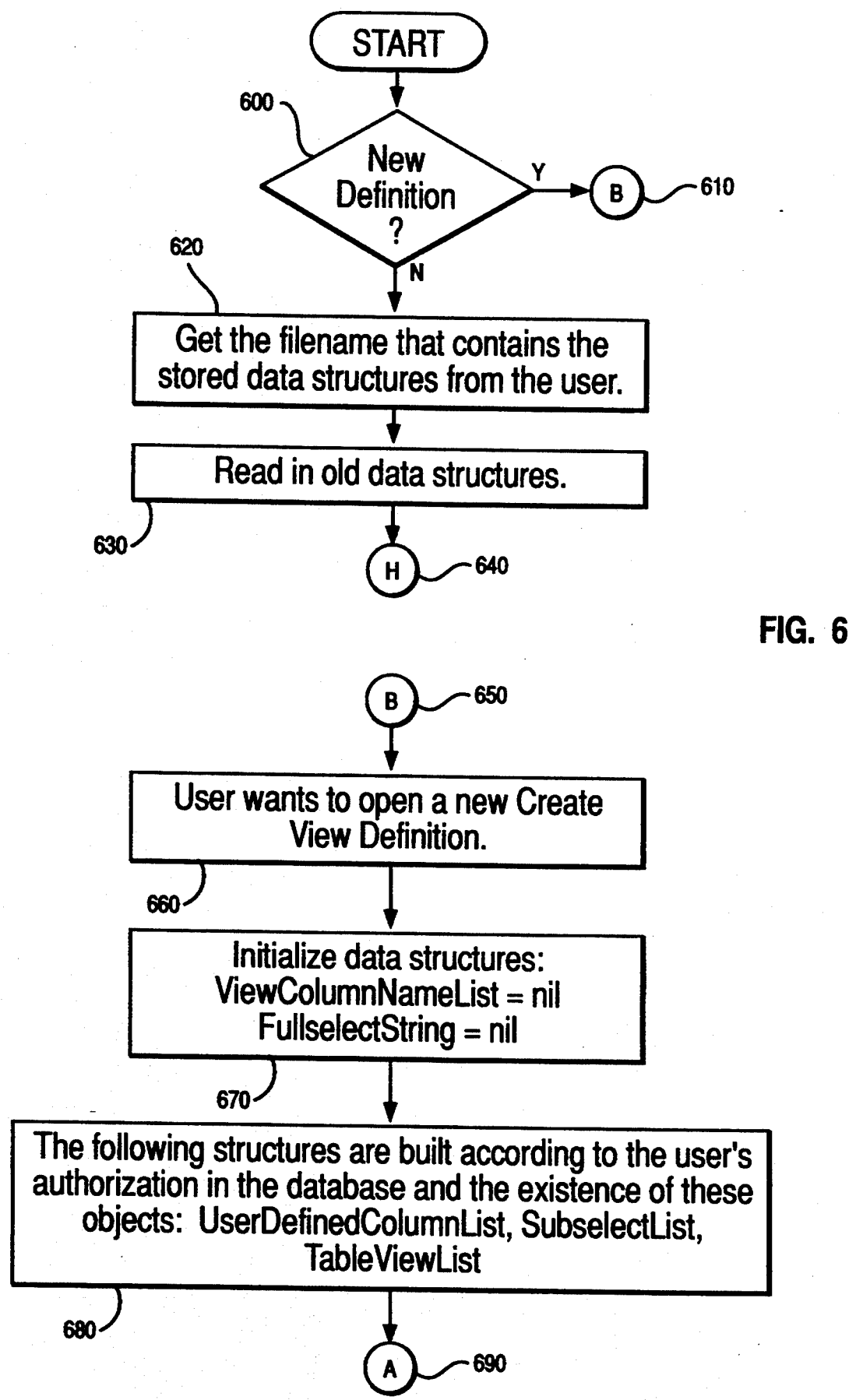
FIG. 6 illustrates the detailed logic for creating a new definition or opening an existing definition in accordance with the subject invention.

FIG. 6 illustrates the detailed logic for creating a new definition or opening an existing definition in accordance with the subject invention. Processing commences with a test at decision block 600. If a new definition is to be created, then control passes via label 610 through label 650 to function block 660 where a new view definition is opened, initialized in 670 and the appropriate data structures are created as shown in function block 680. Thereafter, control is passed via label 690 to function block 700 of FIG. 7. If a new definition is not desired in decision block 600, then the file name containing the stored data structures of the existing view definition is obtained in function block 620, the existing data structures are read in at function block 630 and control is passed via label 640 to label 1100 of FIG. 11.

Figure 7:
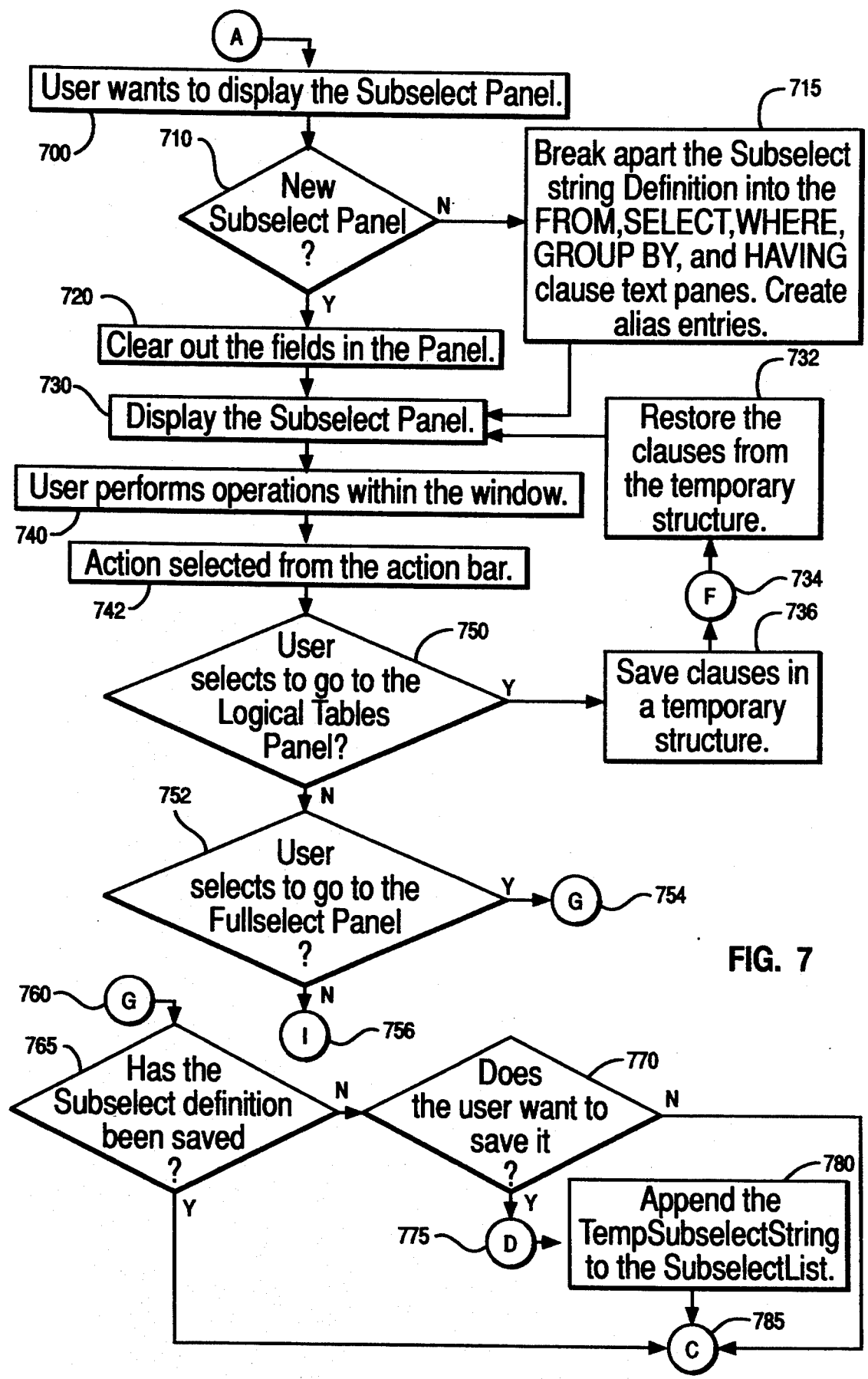
FIG. 7 is a flowchart depicting the detailed logic associated with the SUBSELECT processing in accordance with the subject invention.

FIG. 7 is a flowchart depicting the detailed logic associated with the SUBSELECT processing in accordance with the subject invention. Processing commences at function block 700 when a user invokes a SUBSELECT panel. An immediate test is thereafter performed at decision block 710 to determine if the request involves a new or an existing SUBSELECT panel. If existing, then information is parsed in function block 715 and control is passed to function block 730 for further processing. If a new panel display is detected, then panel fields are cleared in function block 720, the SUBSELECT panel is displayed in function block 730, various actions are presented to a user in function block 740, and a particular action is selected by a user function block 742. Then, a test is performed at decision block 750 to determine if a user wants to define column expressions in the Logical Table. If so, then clauses are saved in a temporary data structure at function block 736, control is passed via label 734 to label 900 of FIG. 9 for defining a new column expression. When column expression processing is completed, control is returned to function block 732 where the saved clauses are restored and control is passed to function block 730 to re-display the SUBSELECT panel.

If column expression definition is not detected at decision block 750, then a test is performed at decision block 752 to determine if a user desires FULLSELECT processing. If not, then control passes via label 756 to label 1240 of FIG. 12. If FULLSELECT processing is requested, then at decision block 765, a test is performed to determine if a SUBSELECT definition has been saved. If so, then control is passed via label 785 to label 1000 of FIG. 10 for further processing. If not, then a further test is performed at decision block 770 to determine if a user wants to save the definition. If a save is desired, then control passes via label 775 to function block 800 of FIG. 8 for further FULLSELECT processing. Then, at function block 780, the TempSubSelectString is appended to the SubSelectList at function block 780. Then, control is passed via label 785 to label 1000 of FIG. 10 for further processing. If no save is desired at decision block 770, then control is also passed via label 785 to label 1000 of FIG. 10.

Figure 8:
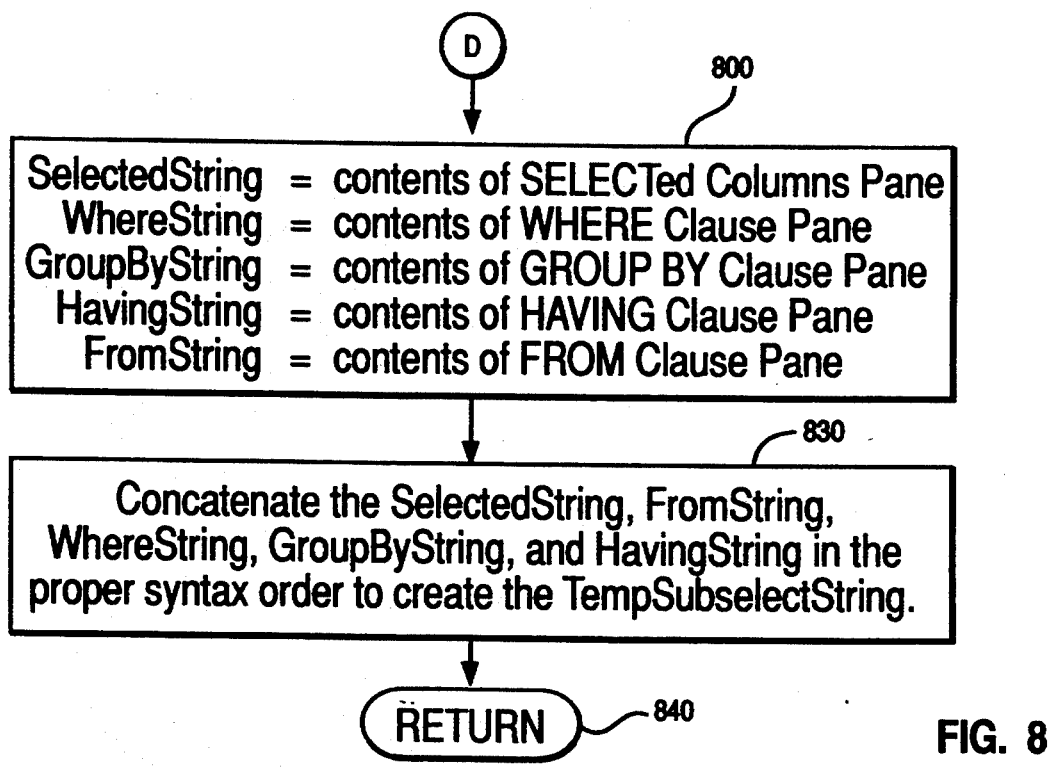
FIG. 8 is a flowchart depicting the detailed logic of constructing the SUBSELECT statement in accordance with the subject invention.

FIG. 8 is a flowchart depicting the detailed logic for construction of a SUBSELECT statement. Function block 800 initializes the various variables based on user selections, and concatenates the various variables to create a temporary SUBSELECT string in function block 830 and returns via label 840 to the calling routine.

Figure 9:
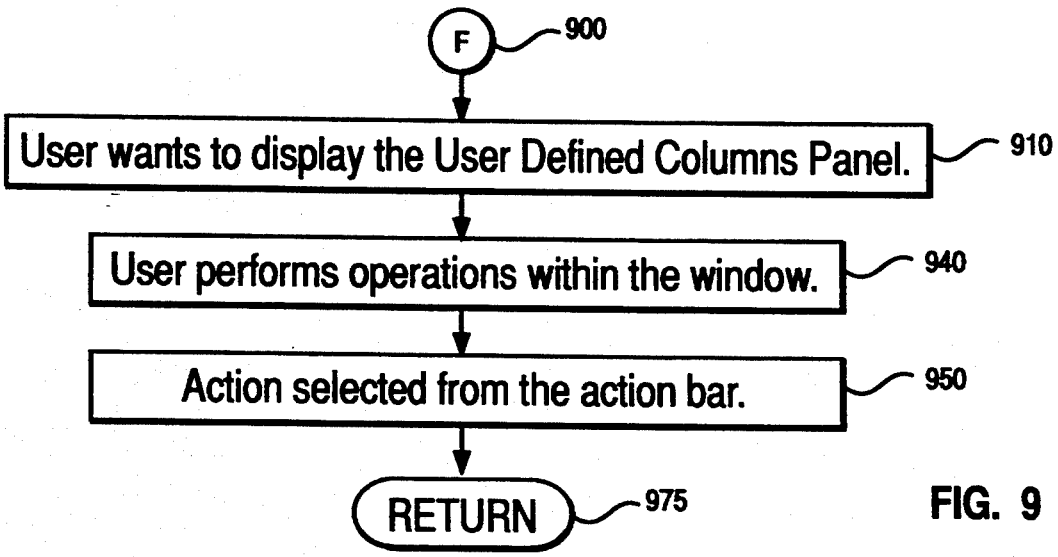
FIG. 9 is a flowchart depicting the detailed logic for creating and editing defined columns in accordance with the subject invention.

FIG. 9 is a flowchart depicting the detailed logic for creating and editing columns in a logical table in accordance with the subject invention. At function block 910 a user's request to display a logical table interface is detected and control is passed to function block 940, and an external action selection is handled in function block 950.

Figure 10:
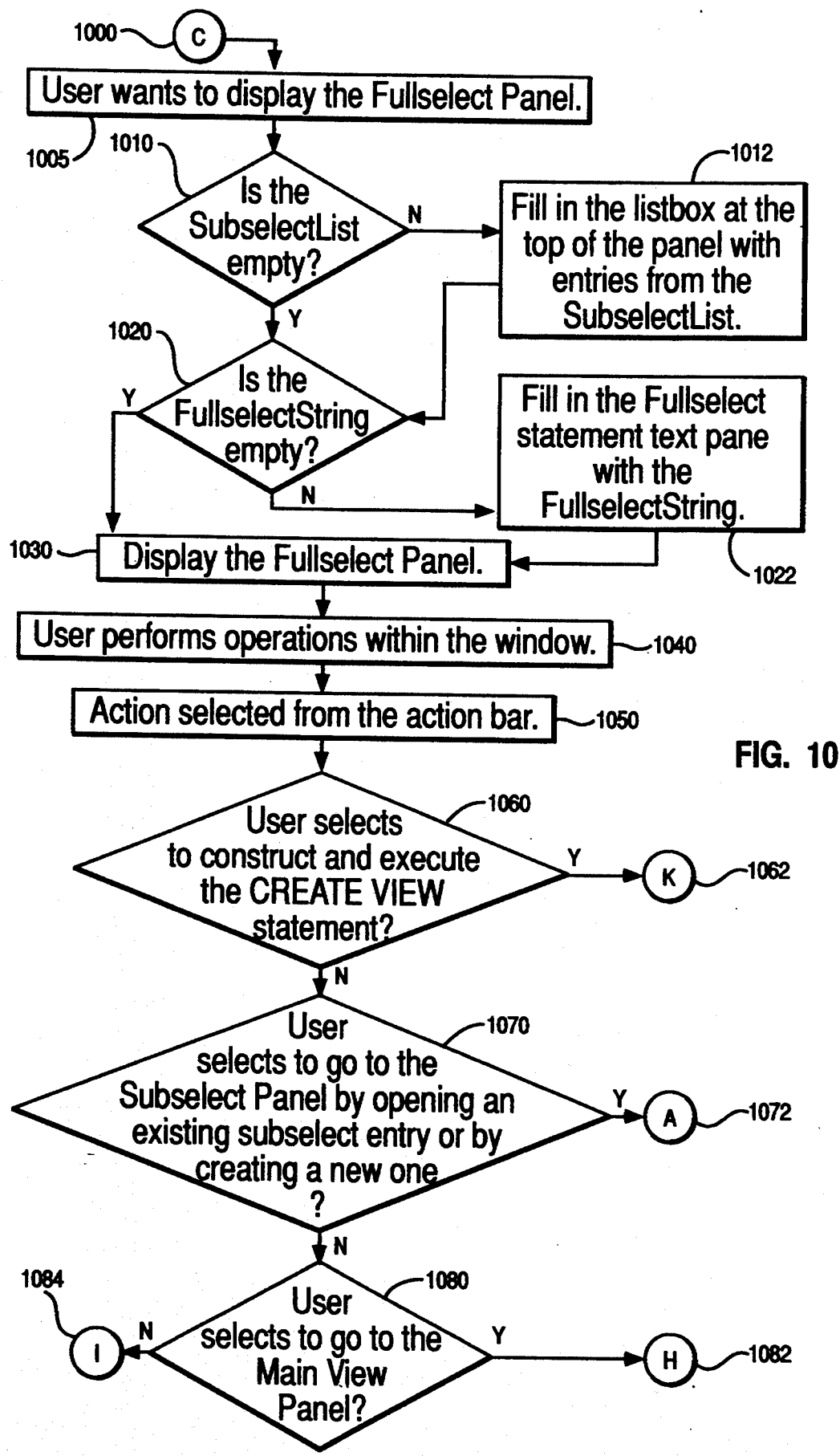
FIG. 10 is a flowchart depicting the detailed logic for displaying the FULLSELECT panel in accordance with the subject invention.

FIG. 10 is a flowchart depicting the detailed logic for displaying the fullselect panel in accordance with the subject invention. When a user requests fullselect display as in function block 1005, a test is performed in decision block 1010 to determine if the SUBSELECT list is empty. If not, then the entries are updated from a data structure as shown in function block 1012. Then, another test is performed at decision block 1020 to determine if a fullselect string is empty. If not, then a data structure is used to update the pane as shown in function block 1022. Next, the fullselect panel is displayed as shown in function block 1030, operations are performed in function blocks 1040 and 1050, and a test is performed in decision block 1060 to determine if a user desires to construct and execute a create view statement. If so, the control passes via label 1062 to label 1200 of FIG. 12. If not the another test is performed at decision block 1070 to determine if a user wants a SUBSELECT panel. If so, then control is passed via label 1072 to label 700 of FIG. 7. If not, then a final test is performed at decision block 1080 to determine if a main panel view is desired. If so, then control is passed via label 1082 to label 1100 of FIG. 11. If not, then control is passed via label 1084 to label 1240 of FIG. 12.

Figure 11:
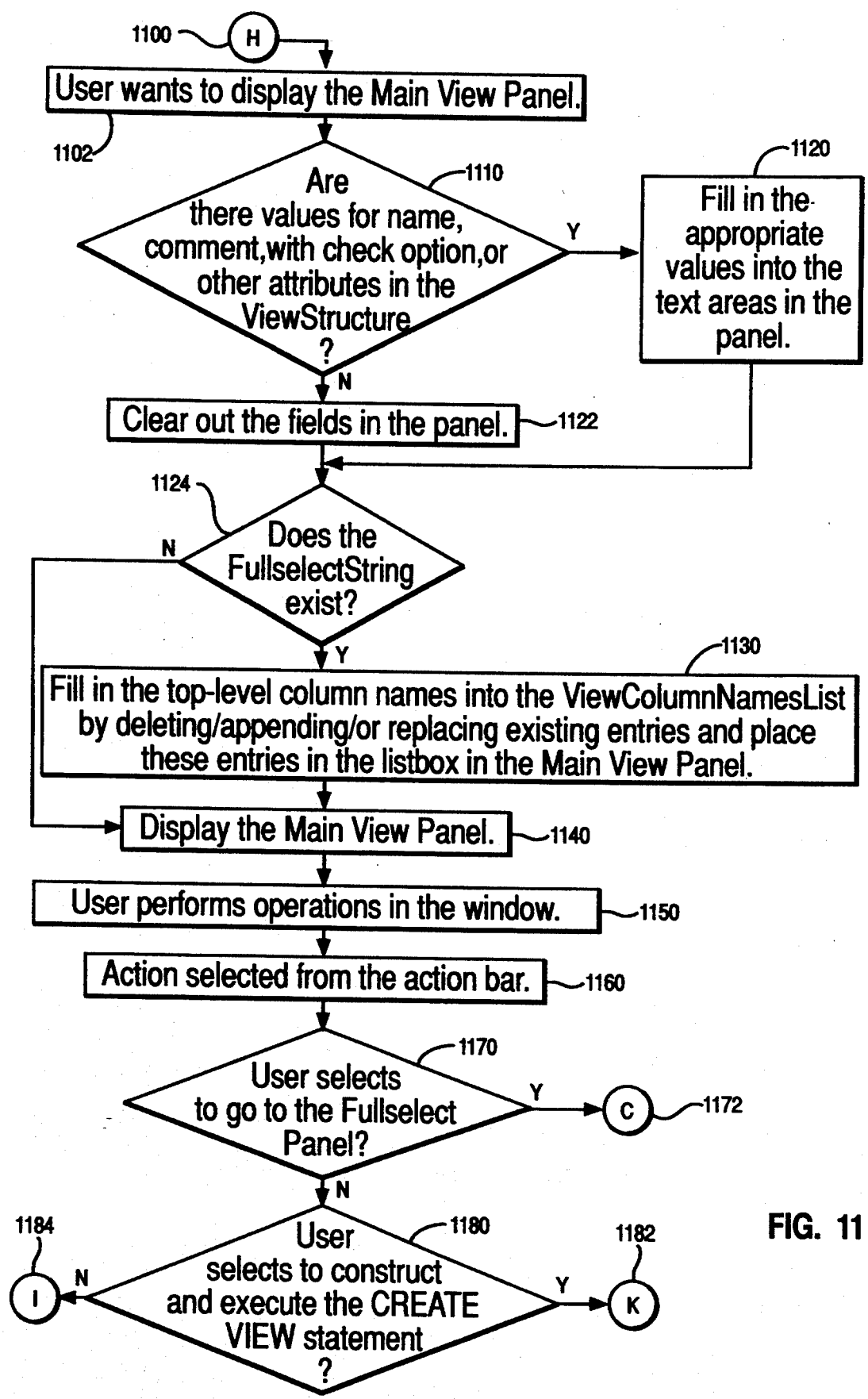
FIG. 11 is a flowchart of the detailed logic associated with displaying a main view panel in accordance with the subject invention.

FIG. 11 is a flowchart of the detailed logic associated with displaying a main view panel in accordance with the subject invention. When a user requests a main view panel at function block 1102, a test is performed at decision block 1110 to detect values for various values in the view structure. If values are detected, then the panel is updated with the values at function block 1120 and control passes to decision block 1124. If no values are detected, then the fields on the panel are cleared in function block 1122 and a test is performed at decision block 1124 to determine if a FULLSELECT string exists. If no FULLSELECT string exists, then the main view panel is displayed at function block 1140. If a FULLSELECT string exists, then the entries in the main view panel are updated as shown in function block 1130 and control passes to 1140. Following the display in function block 1140, the user invoked operations are carried out in function block 1150, and action is selected in function block 1160 and a test is performed in decision block 1170 to determine if a fullselect panel is desired. If so, then control is passed via label 1172 to label 1000 of FIG. 10. If not, then a further test is performed at decision block 1180 to determine if a user desires to construct and execute a create view statement. If so, then control is passed via label 1182 to label 1200 of FIG. 12. If not, then control is passed via label 1184 to label 1240 of FIG. 12.

Figure 12:
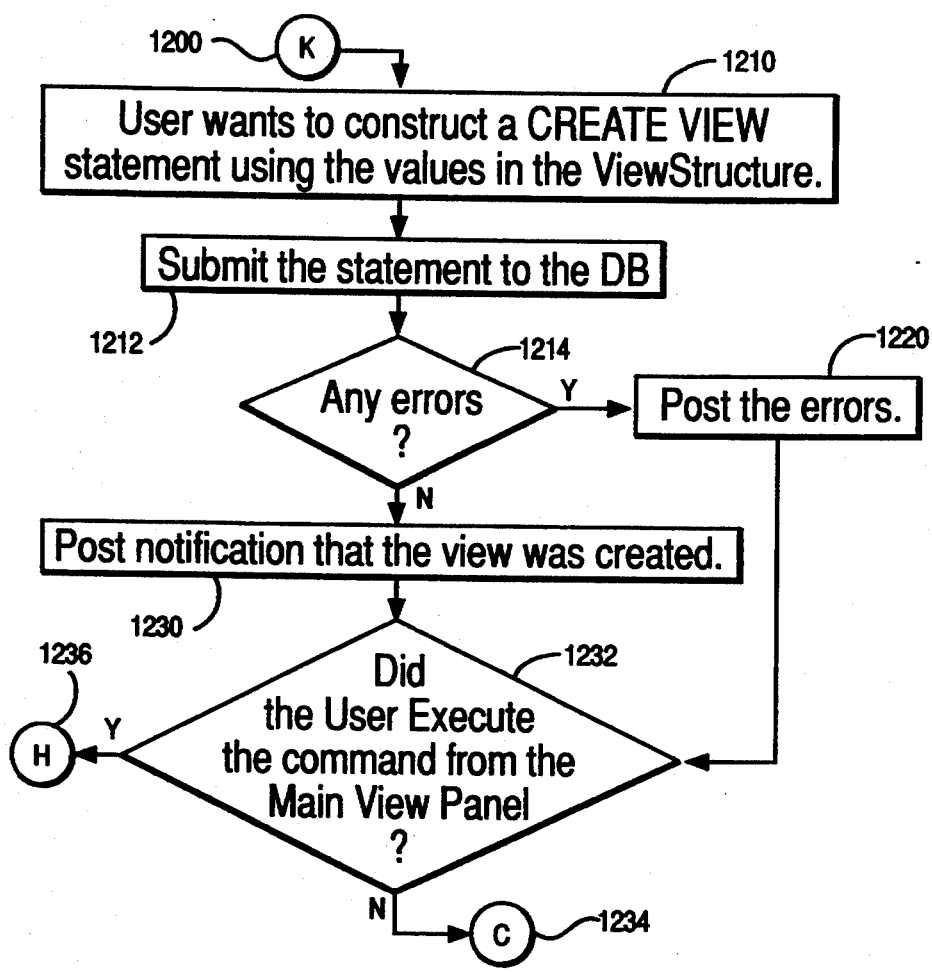
FIG. 12 is a flowchart depicting the detailed logic for constructing a view structure and closing the view interface in accordance with the subject invention.
Figure 12:
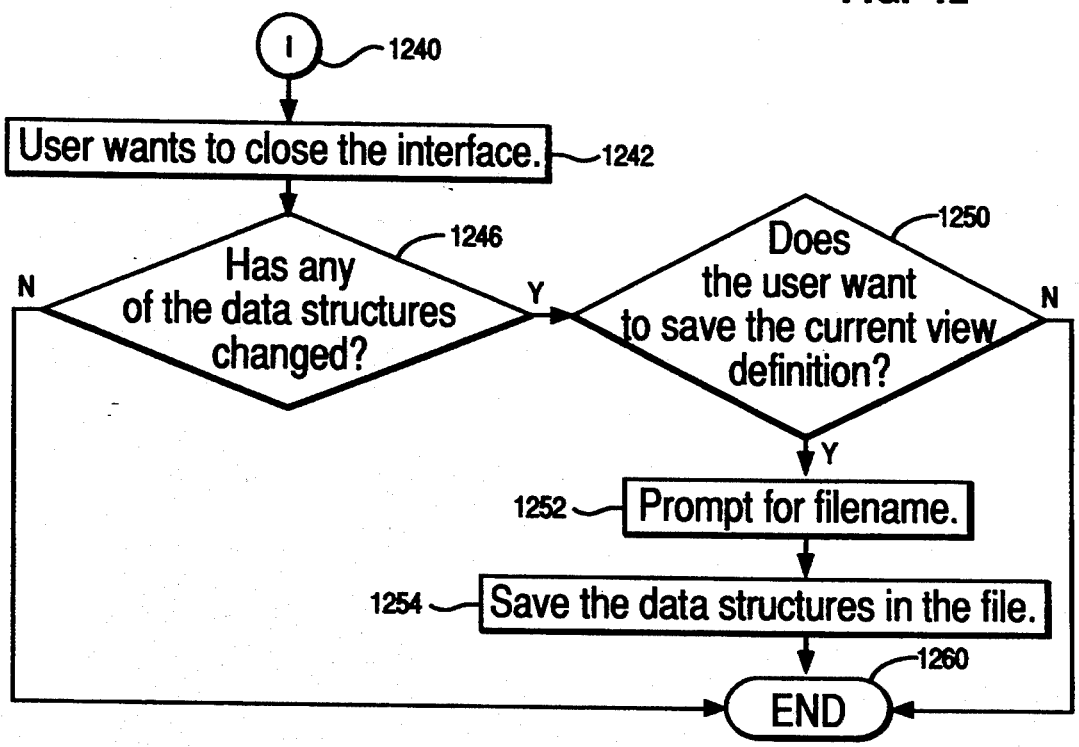

FIG. 12 is a flowchart depicting the detailed logic for constructing a view structure and closing the view interface in accordance with the subject invention. If a user wants to construct a create view as shown in function block 1210, the statement is submitted to the database system as shown in function block 1212, then a test is performed at decision block 1214 to determine if any errors were detected. If errors were detected, then the errors are posted in function block 1220 and control is passed to decision block 1232. If errors are not detected, then a message is presented indicating the a view was created in function block 1230 and control is passed to decision block 1232. In decision block 1232 a test is performed to determine if a command was invoked from a main view panel. If so, then control passes via label 1236 to label 1100 of FIG. 11. If not, then control passes via label 1234 to label 1000 of FIG. 10.

At function block 1242, the close processing is initiated and a test is immediately performed at decision block 1246 to determine if any data structures have changed. If so, then another test is performed to determine if the current view definition is to be saved at decision block 1250. If a save is requested, the user is prompted for a file name at function block 1252, the data structure is saved in function block 1254 and processing is completed at terminal 1260. If no save is requested or none of the data structures have changed, the processing is also completed at terminal 1260.

FIGS. 13–28 are flowcharts presenting the detailed logic in accordance with the subject invention. Processing for the SUBSELECT interface commences at terminal block 1300 and immediately flows to function block 1302 where variables are initialized appropriately. Then, in function block 1304 the table and view name lists are initialized to conform with a user's access rights, in function block 1306, a list of the user defined columns in each of the logical tables that the user has access to are read and stored in a data structure, and a decision is performed at decision block 1310 to determine a user selection. If a user selects an entry from a table list pane at function block 1320, then processing continues at label 1361 of FIG. 13b.

Figure 13A:
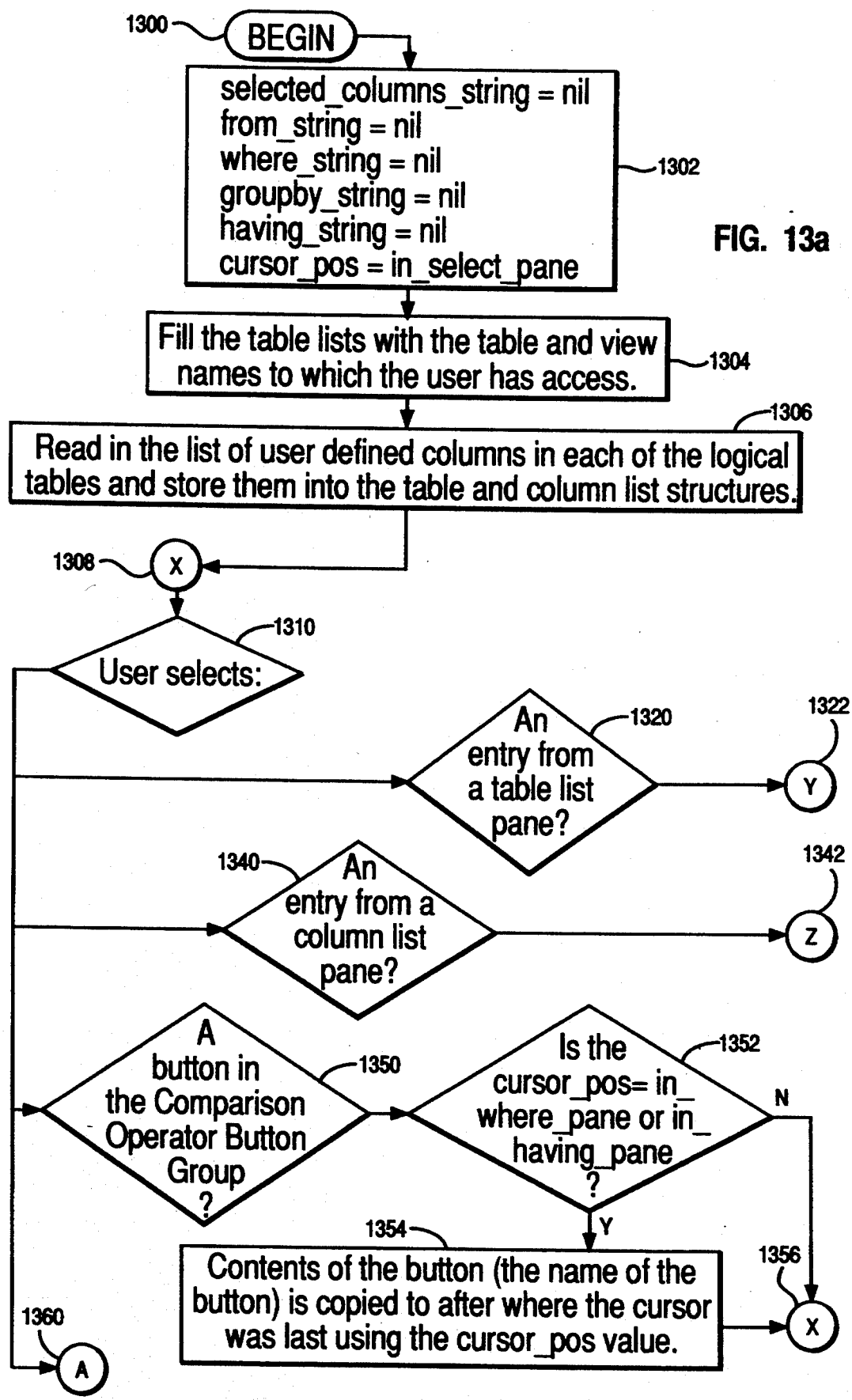
FIGS. 13a–15 are the flowcharts presenting the detailed logical for the internal processing of the SUBSELECT interface in accordance with the subject invention.
Figure 13B:
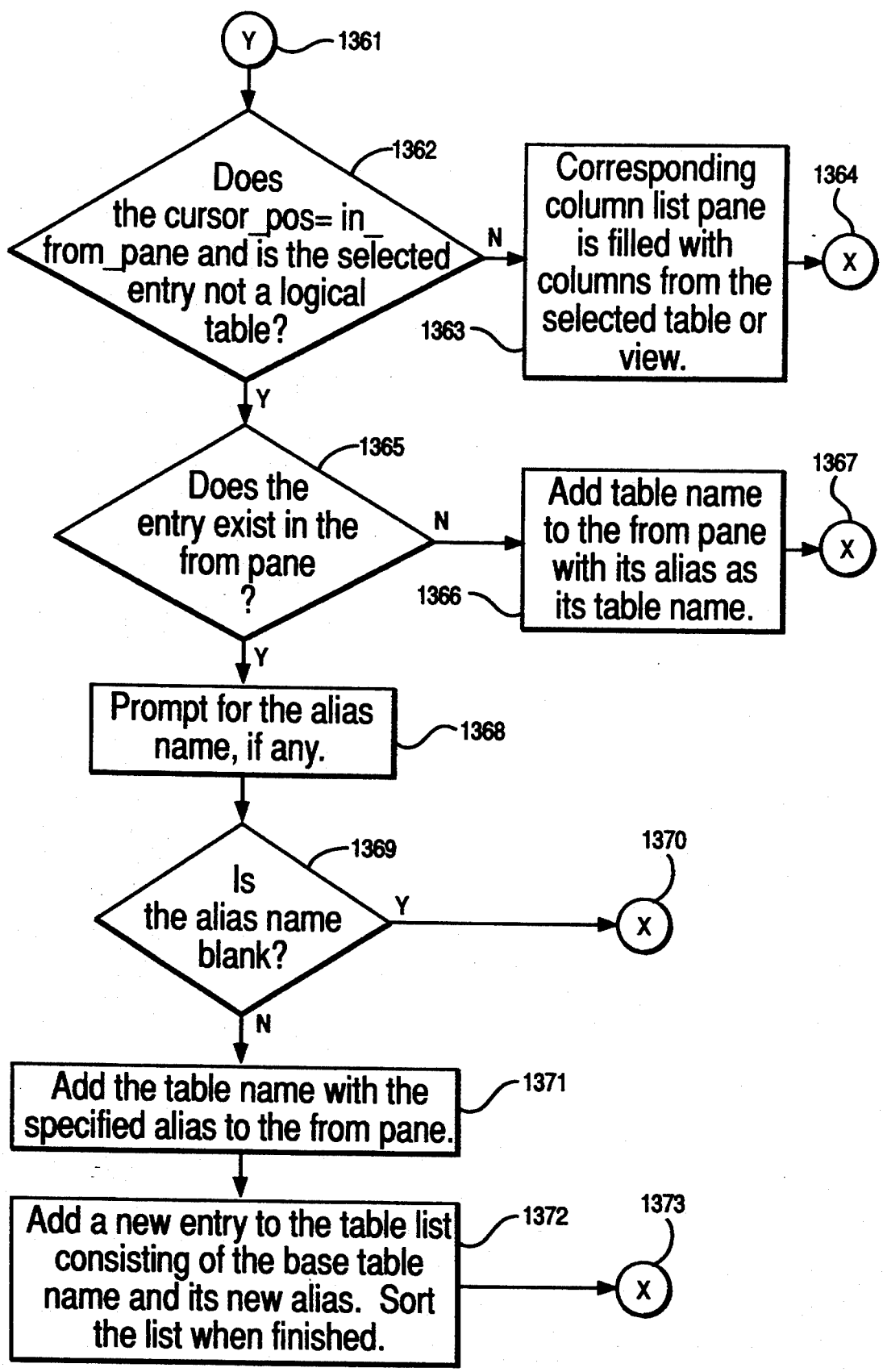
Figure 13C:
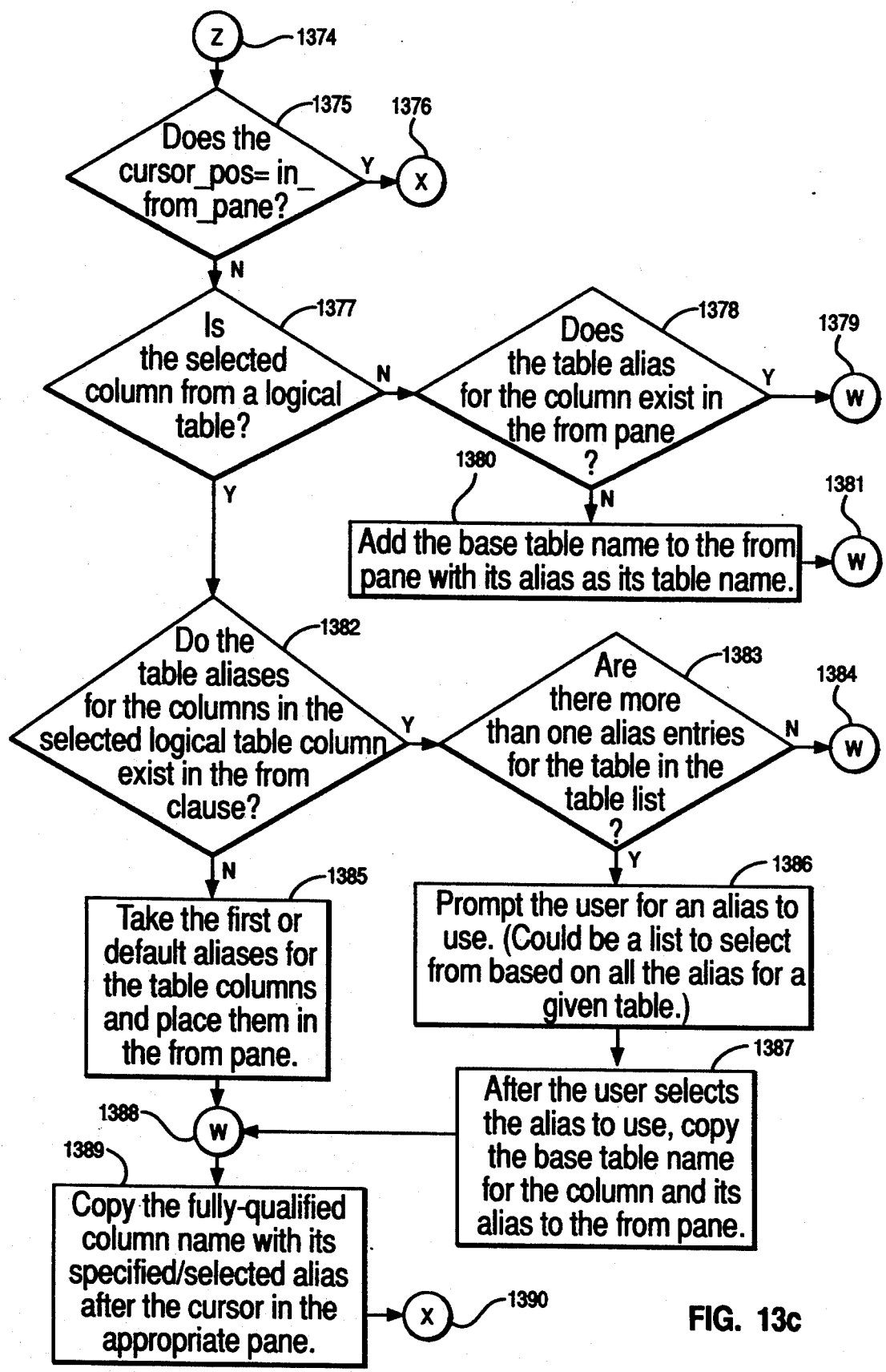

If a user selects an entry from a column list as shown in function block 1340, then processing continues at label 1374 of FIG. 13c. If a user selects a button as shown in function block 1350, then a test is performed at decision block 1352 to access the cursor position. If the cursor is positioned appropriately, then the contents of the button is copied as shown in function block 1354 and control is passed to 1308 to await the next user selection. If not, then control is passed to 1308 to await the next user selection. If the user selection is none of those parsed in function blocks 1320, 1340, or 1350, then control passes via label 1360 to 1400 of FIG. 14.

In FIG. 13b, since the user selected an entry from the table list pane, decision block 1362 checks if the cursor is located in the from pane and if the selected entry is not a logical table. If not, the corresponding column list pane is filled with the columns belonging to the selected entry in function block 1363 and control is returned to label 1308 to await the next user selection.

If the entry was a logical table and if the cursor was positioned in the from pane, decision block 1365 checks to see if the entry already exists in the FROM pane. If not, function block 1366 adds the table name to the FROM pane with its alias. Afterwards, control is returned to label 1308 to await the next user selection.

If the entry did exist in the FROM pane, processing continues with function block 1368 prompting the user for the alias. Decision block 1369 checks to see if an alias name was given. If not, control is returned to label 1308 to await the next user selection. If so, function block 1371 adds the table name with the specified alias to the FROM pane and function block 1372 adds a new entry to the table list consisting of the base table name and its alias. Afterwards, control is returned to label 1308 to await the next user selection.

In FIG. 13c, since the user selected an entry in the column list pane, decision block 1375 checks if the cursor is located in the FROM pane. If so, control is returned to label 1308 to await the next user selection. If not, decision block 1377 checks if the selected column was from a logical table. If not, decision block 1378 checks if the table alias for the column already exists in the FROM pane. If so, control is returned to label 1388 to copy the column name to the appropriate pane. If the table alias does not exist, the base table name and its alias are added to the FROM pane in function block 1380. Afterwards, control is returned to label 1388 to copy the column name to the appropriate pane.

If the selected column was from a logical table, decision block 1382 checks if the table aliases for all the columns in the selected logical table column already exist in the FROM clause. If not, function block 1385 takes the unique default aliases for the columns in the selected column expression and places them in the FROM pane. Afterwards, processing continues with label 1388.

If the table aliases for the columns in the selected column expression already exist, decision block 1383 checks if there are more than one alias entries for the table in the table list. If not, processing continues with label 1388. If so, the user is prompted for the alias to use in function block 1386. Next, function block 1387 retrieves the alias the user selected (or gets the default one if the user did not select one) and copies it along with its base table name into the FROM pane. Processing continues with label 1388.

Label 1388 continues to function block 1389 where the fully-qualified column name (consisting of the alias name, column name, and other names required by the database system) is copied after the cursor in the pane where the cursor last resided. Afterwards, control is returned to label 1390 of FIG. 13a to await the next user selection.

Figure 14:
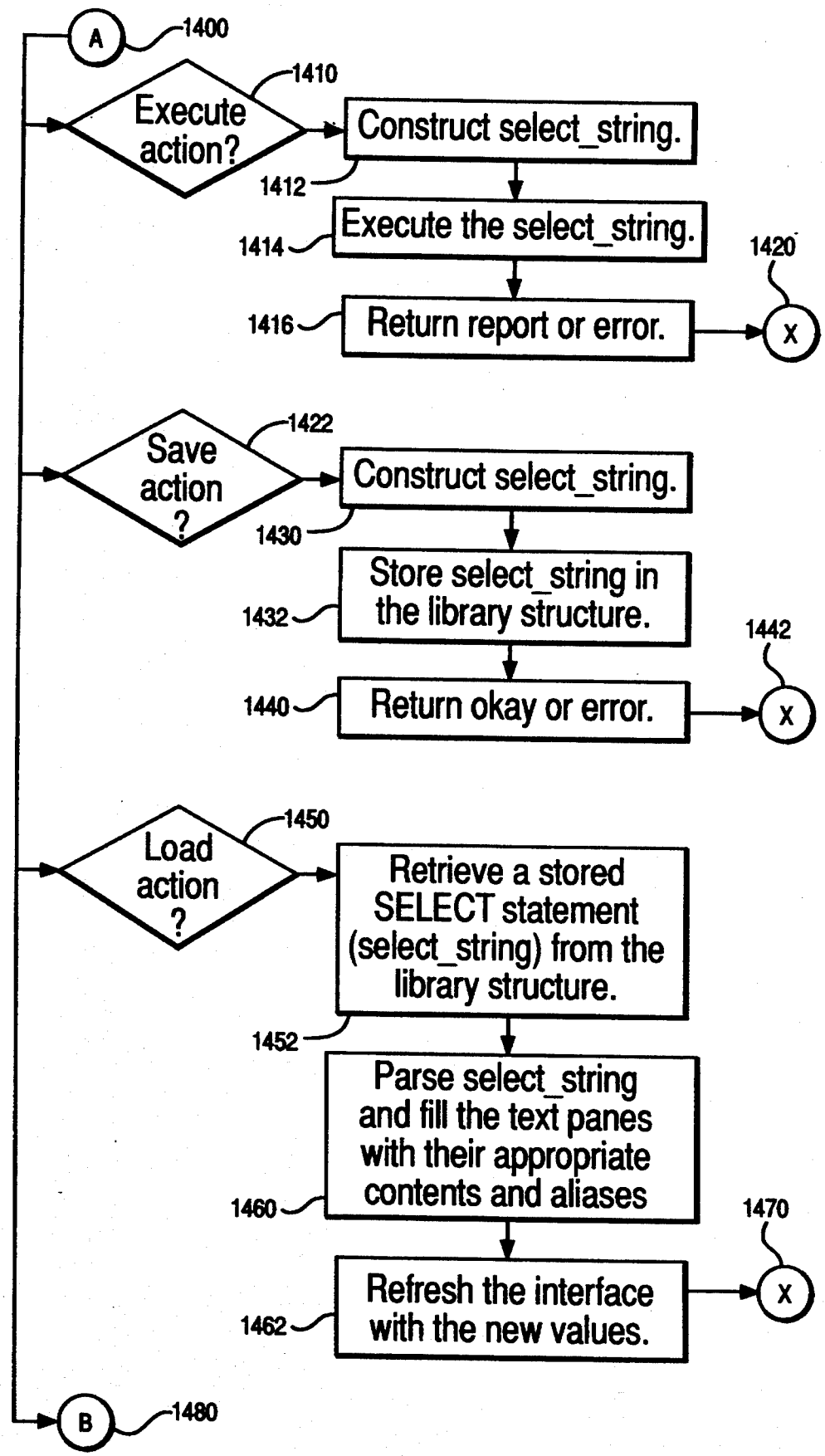
Figure 15:
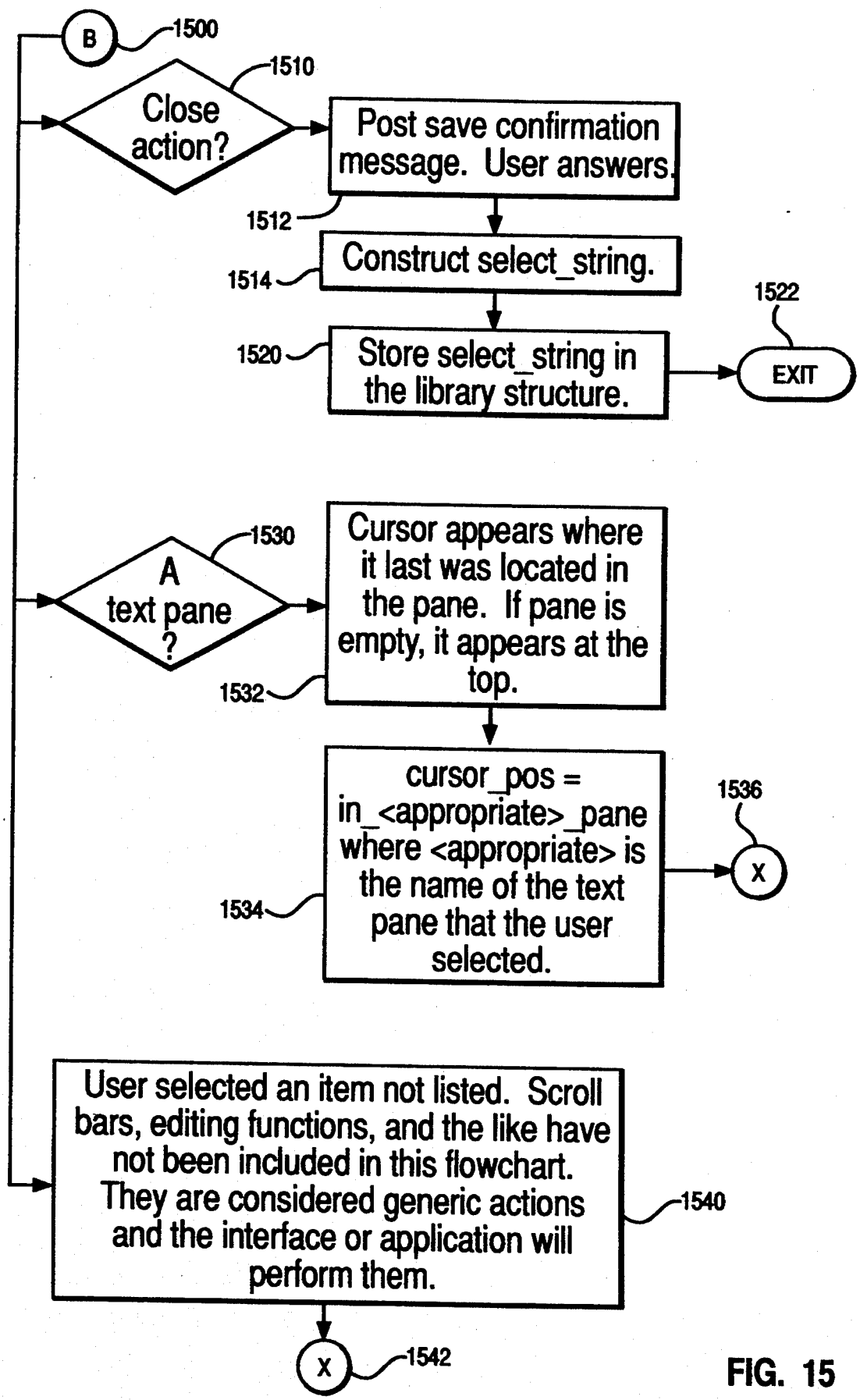

In FIG. 14, a user selects an execute action as shown in function block 1410, then in function block 1412, the select$_{13}$ string is constructed, the string is executed as shown in function block 1414, a report or error is returned in function block 1416 and control is returned to 1308 to await the next user selection.

If a user selects a save action as shown in function block 1422, then a select string is constructed as shown in function block 1430, the SELECT string is stored in a library structure as shown in function block 1432, a return code is returned in function block 1440 and control is returned to 1308 of FIG. 13a to await the next user selection.

If a user selects a load action as shown in function block 1450, a stored SELECT statement is retrieved as shown in function block 1452, a SELECT string is parsed to fill the text panes appropriately as shown in function block 1460, the interface is refreshed with the new values as shown in function block 1462 and control is returned to 1308 of FIG. 13a to await the next user selection.

If the user selection has still not been processed, then control is passed via label 1480 via label 1500 to process additional user selections. If the user has selected a close action as shown in function block 1510, then a save confirmation message is posted at function block 1512, a SELECT string is constructed at function block 1514, a SELECT string is stored in a library structure at function block 1520 and processing is terminated at terminal block 1522.

If a user selects a text pane at function block 1530, then a cursor is placed where a cursor last appeared in a pane in function block 1532, the cursor is reset as shown in function block 1534, and control is returned to 1308 of FIG. 13a to await the next user selection.

If a user selected a non listed item as shown in function block 1540, then it is appropriately executed as shown in function block 1540 and control is passed back to 1308 of FIG. 13a to await the next user selection.

Figure 16:
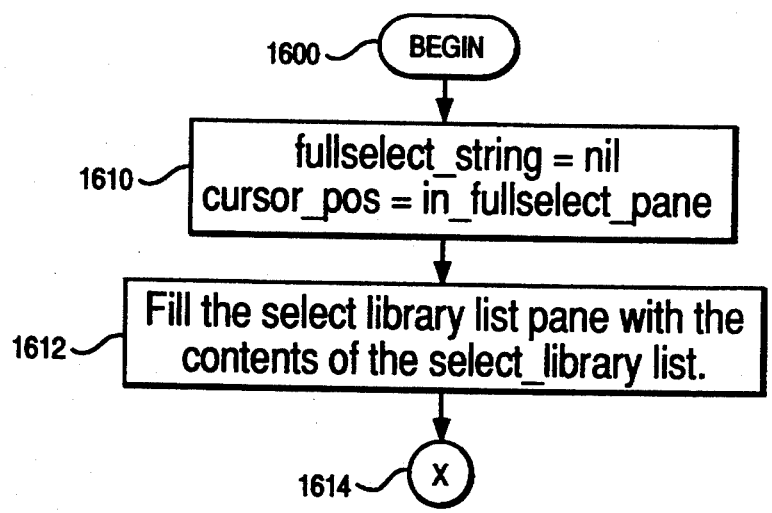

FIG. 16 depicts the logic associated with initializing a SELECT library pane. Function block 1610 sets the pointers and function block 1612 fills the SELECT library list pane with the contents of the list. Thereafter control passes via 1614 to label 1700 of FIG. 17. Function block 1710 traps a user selection, function block 1720 selects an entry and the copies the contents of the entry as shown in function block 1722. Function block 1730 detects a button in the relation button group, function block 1732 copies the contents of the button and label 1740 is used to guide control to label 1800 of FIG. 18.

At function block 1810 a create button action is processed by initializing definitions as shown in function block 1812, performing user actions as shown in function block 1814, and returning to the FULLSELECT definition interface as shown in function block 1816. Thereafter, control is returned to 1700 of FIG. 17 to await the next user selection.

At function block 1820, a SUBSELECT entry is detected while an open button was pressed. Thus, in function block 1822, a SUBSELECT definition interface is opened, a user performs actions as shown in function block 1824, a user returns to the FULLSELECT definition as shown in function block 1826, and control returns to 1700 of FIG. 17 to await the next user selection. At function block 1830, a SUBSELECT and delete operation are detected. Then, at function block 1832, the selected entry is removed and the display is refreshed. Finally, control is returned via label 1834 to label 1700 of FIG. 17 to await the next user selection.

At function block 1840, a SUBSELECT and transfer operation are detected. Then, at function block 1842, the selected entry is copied and the display is refreshed. Finally, control is returned via label 1844 to label 1700 of FIG. 17 to await the next user selection.

Figure 19:
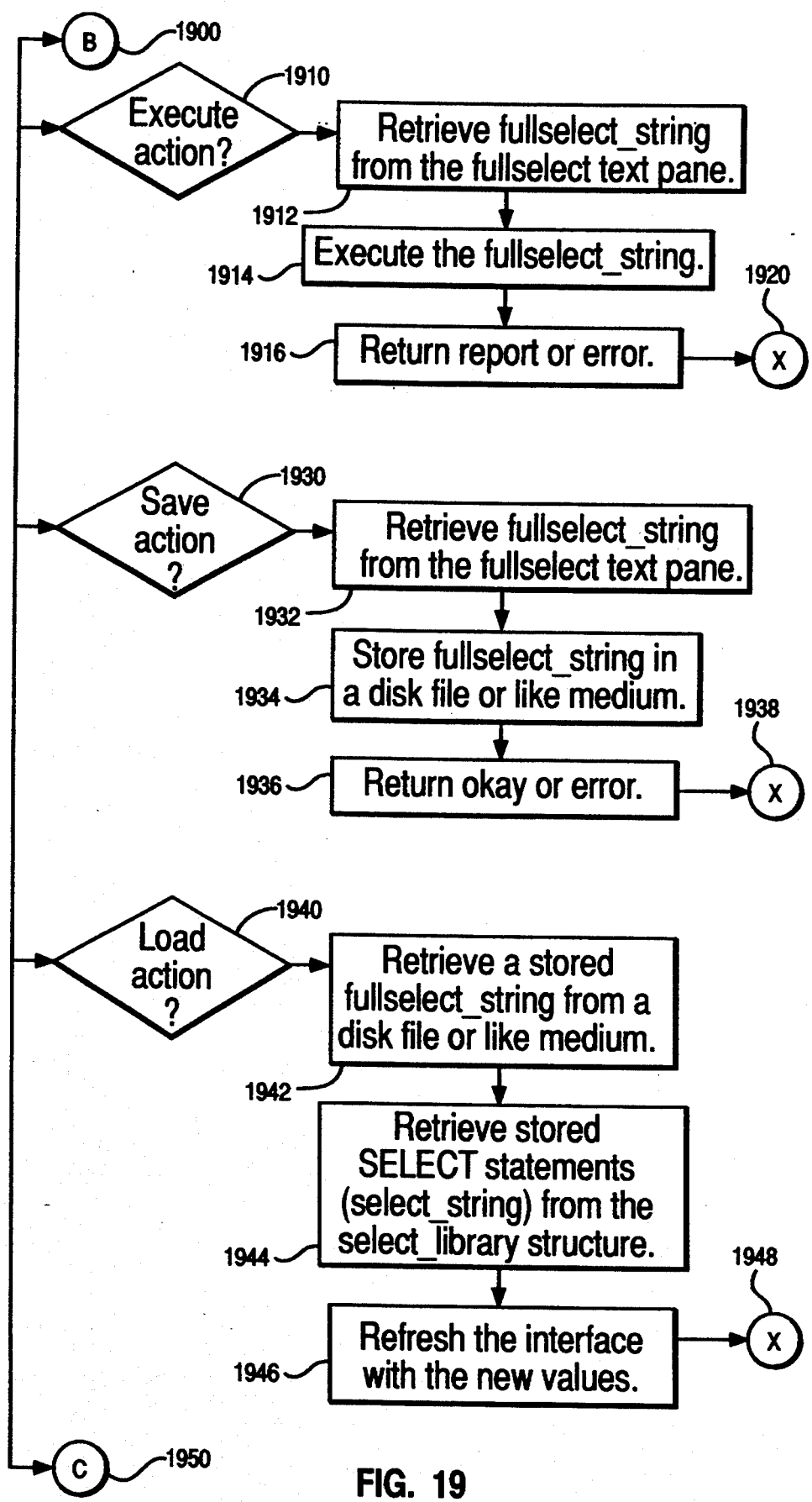

If a user did not select an action in 1810, 1820, 1830 and 1840, then control passes via label 1850 to label 1900 of FIG. 19. If a user selects an execute action as shown in function block 1910, then in function block 1912, the fullselect_string is constructed, the string is executed as shown in function block 1914, a report or error is returned in function block 1916 and control is returned to 1700 in FIG. 17 to await the next user selection.

Figure 17:
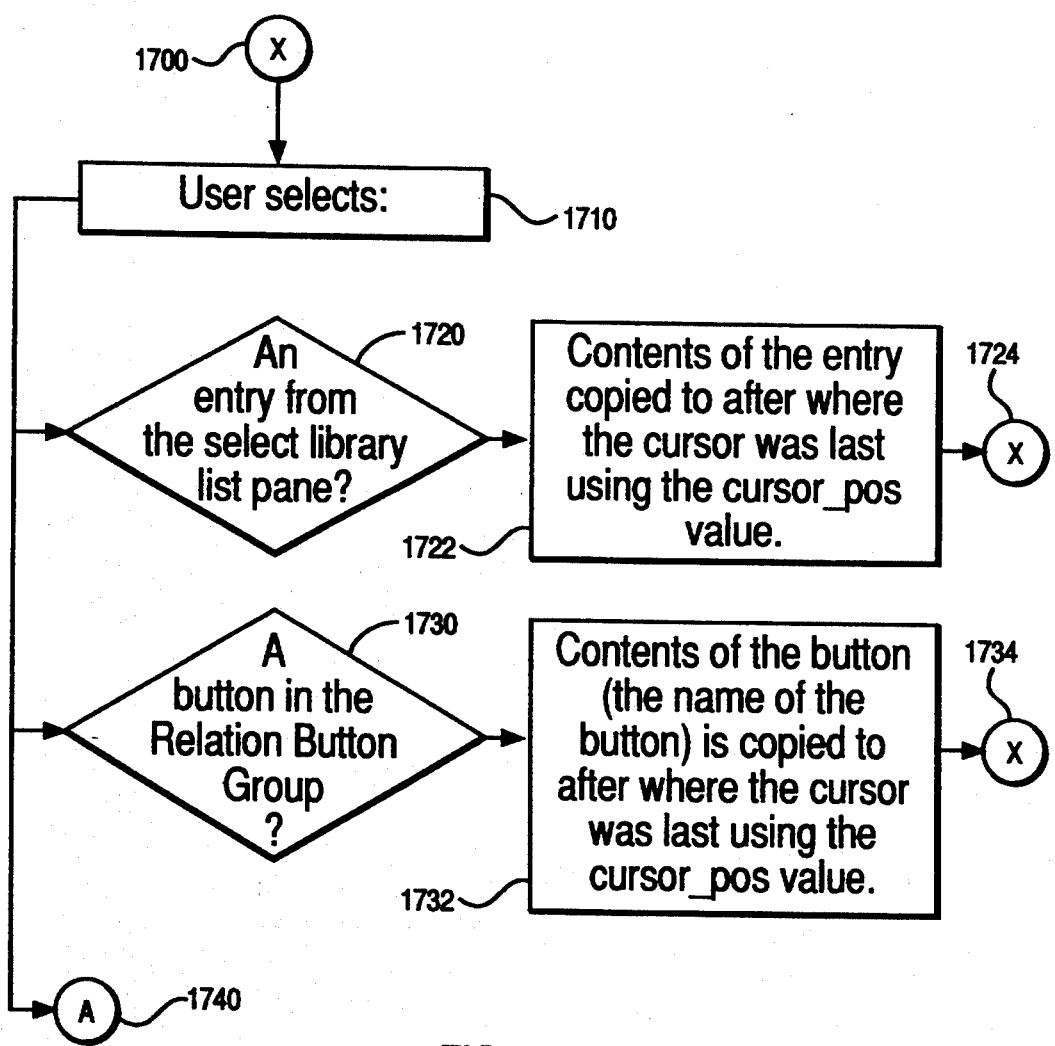
Figure 18:
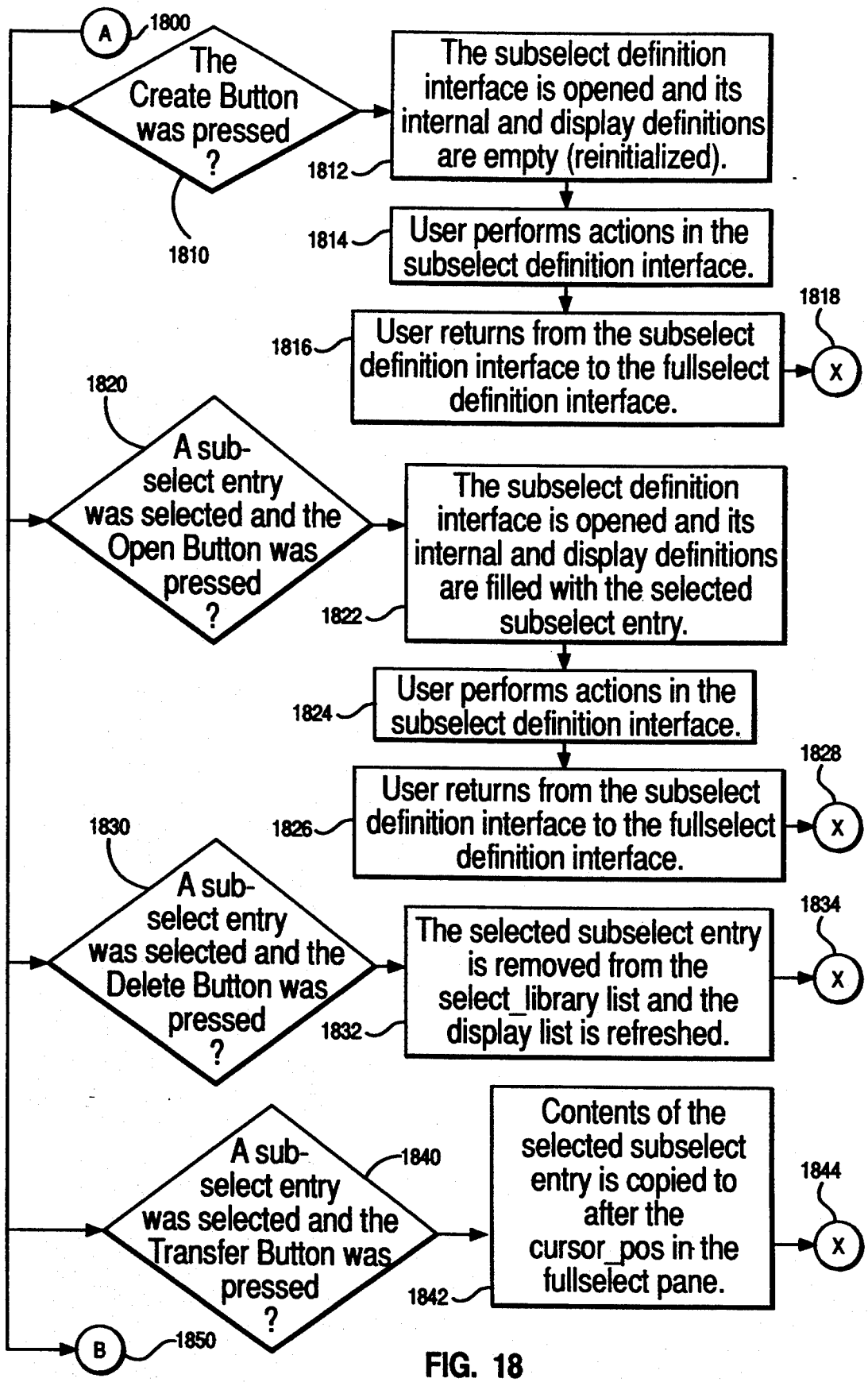

If a user selects a save action as shown in function block 1930, then a FULLSELECT string is constructed as shown in function block 1932, the fullselect string is stored in a library structure as shown in function block 1934, a return code is returned in function block 1936 and control is returned to 1700 of FIG. 17 to await the next user selection.

If a user selects a load action as shown in function block 1950, a stored FULLSELECT statement is retrieved as shown in function block 1942, a FULLSELECT string is parsed to fill the text panes appropriately as shown in function block 1944, the interface is refreshed with the new values as shown in function block 1946 and control is returned to 1700 of FIG. 17 to await the next user selection.

If the user selection has still not been processed, then control is passed via label 1950 via label 2000 to process additional user selections. If the user has selected a close action as shown in function block 2010, then a save confirmation message is posted at function block 2012, a FULLSELECT string is stored in a library structure at function block 2014 and processing is terminated at terminal block 2016.

If a user selects a FULLSELECT pane at function block 2030, then a cursor is placed where a cursor last appeared in a pane in function block 2032, the cursor is reset as shown in function block 2034, and control is returned to 1700 of FIG. 17 to await the next user selection.

If a user selected a non listed item as shown in function block 2040, then it is appropriately executed as shown in function block 2040 and control is passed back to 1700 of FIG. 17 to await the next user selection.

Figure 20A:
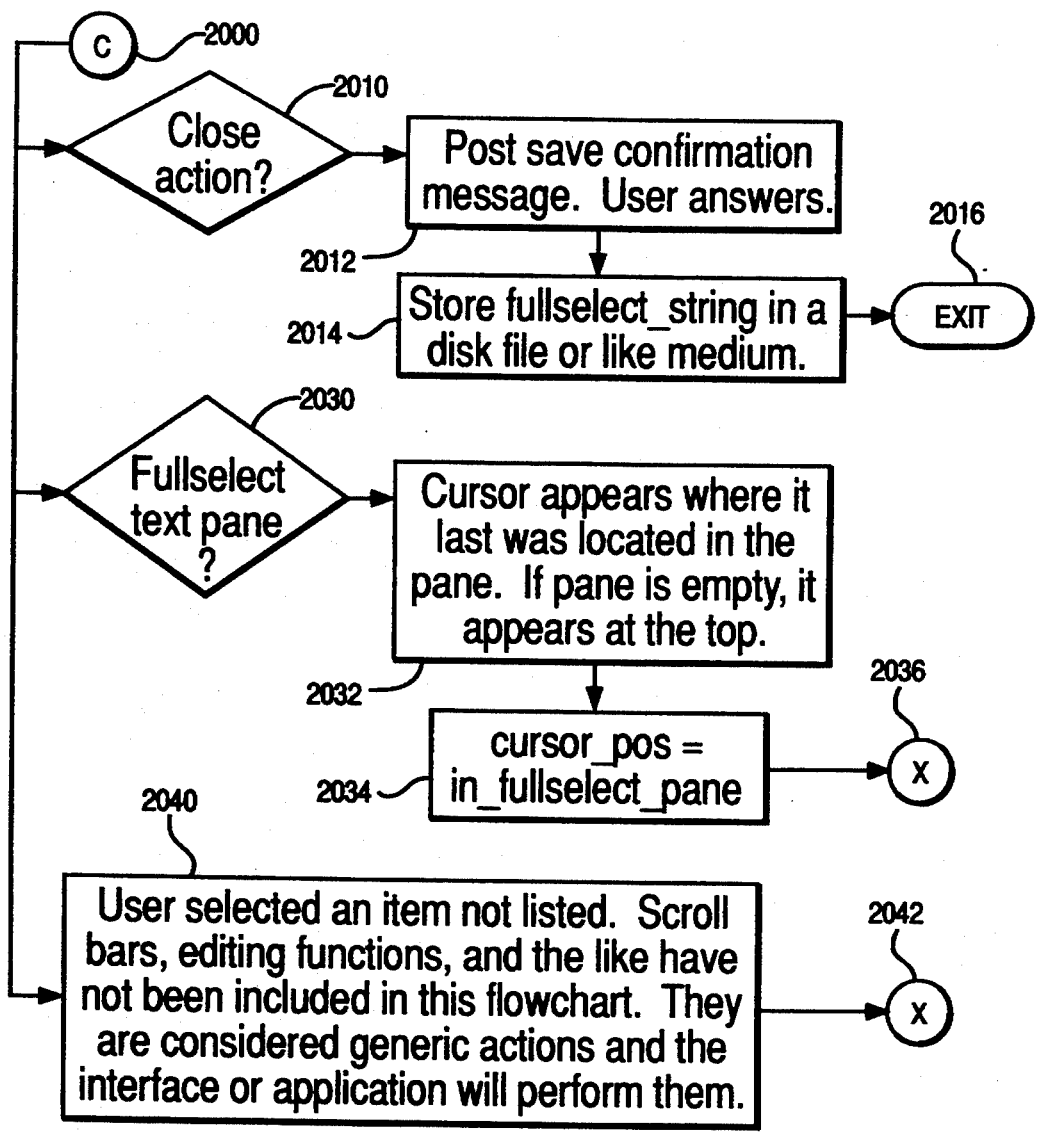
Figure 20B:
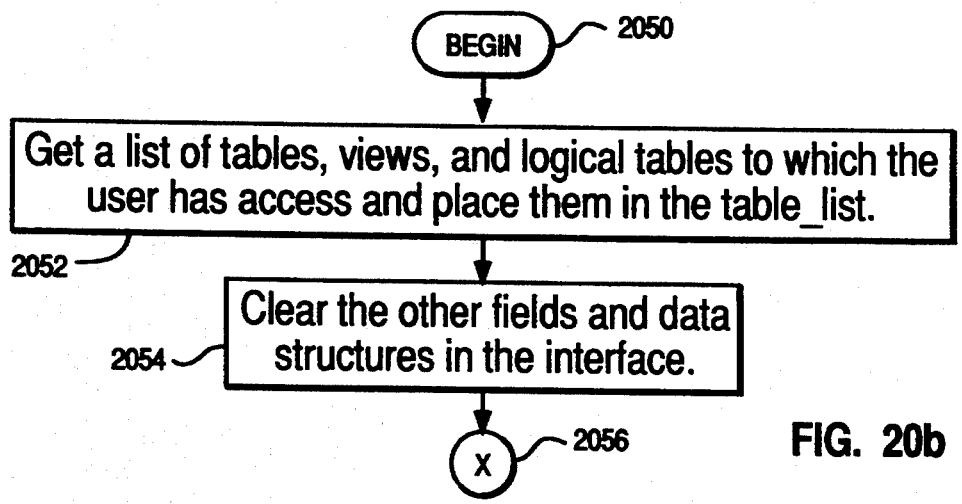

Processing for the logical table interface for user defined columns commences at terminal block 2050 in FIG. 20b and immediately flows to function block 2052 where a list of tables, views, and logical tables are retrieved if the user has authorization to them. Then, in function block 2054, the other fields in the interface are cleared and processing continues to label 2056 through to label 2060 in FIG. 21. From label 2060, the current display controls are refreshed at function block 2062 and the user selection is retrieved at decision block 2064.

If the user selected an entry in the table list as shown in function block 2066, then the column list structure is filled in function block 2068 and control is returned to label 2060 to await the next user selection.

If the user selected an entry in the column list as shown in function block 2072, then the entry in the column list is copied to the appropriate cell pane in function block 2074 and control is returned to label 2060 to await the next user selection.

If the user selected a button in the button pane as shown in function block 2078, then the contents of the button is copied to the appropriate cell pane in function block 2080 and control is returned to label 2060 to await the next user selection.

If the user selected the copy action and an entry in the table list was selected as shown in function block 2084, then the cell pane data structure is reinitialized in function block 2086 and the cell panes are set to contain the column entries of the selected entry as shown in function block 2088. Afterwards, control is returned to label 2060 to await the next user selection.

Figure 21:
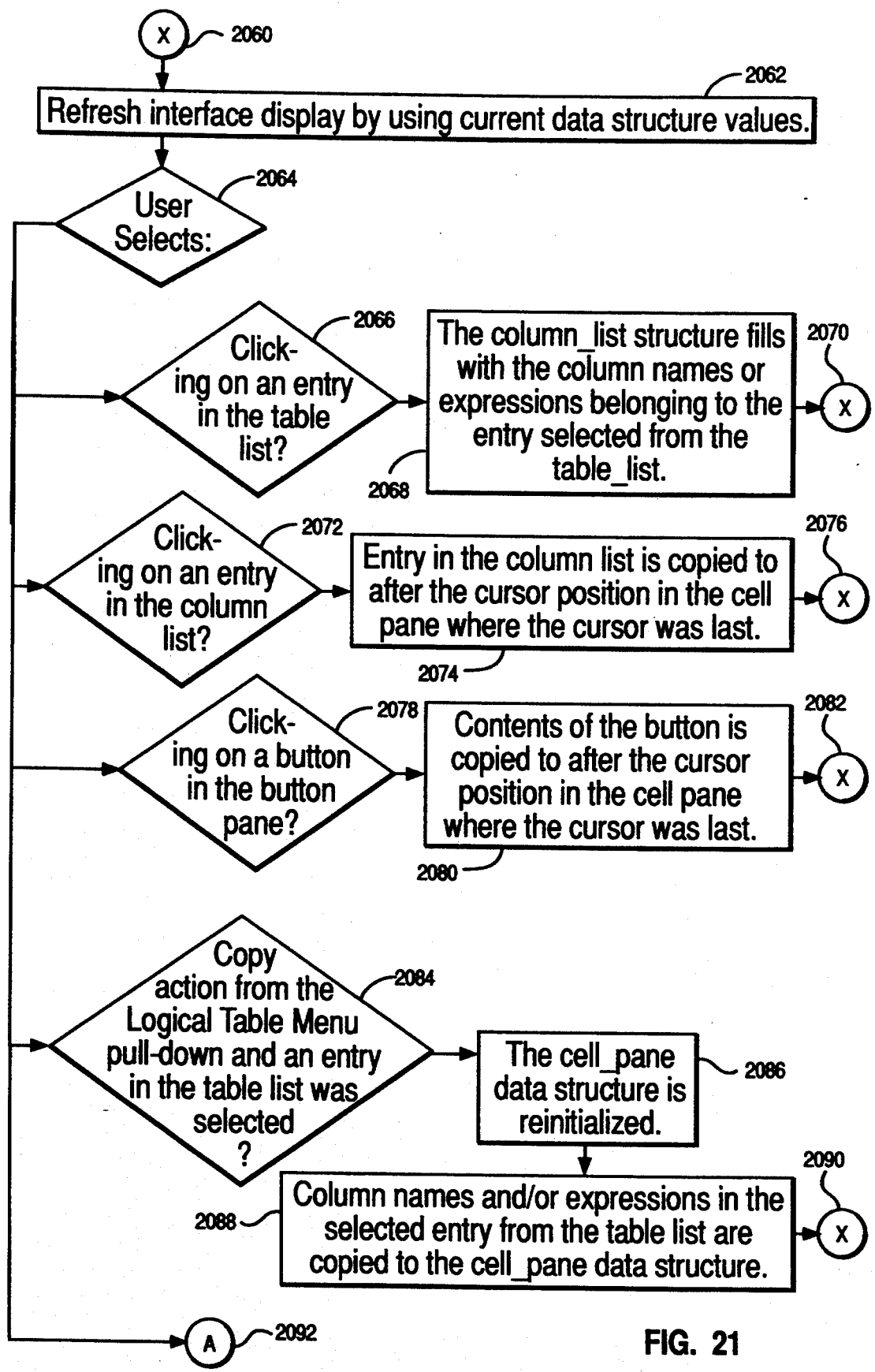
Figure 22:
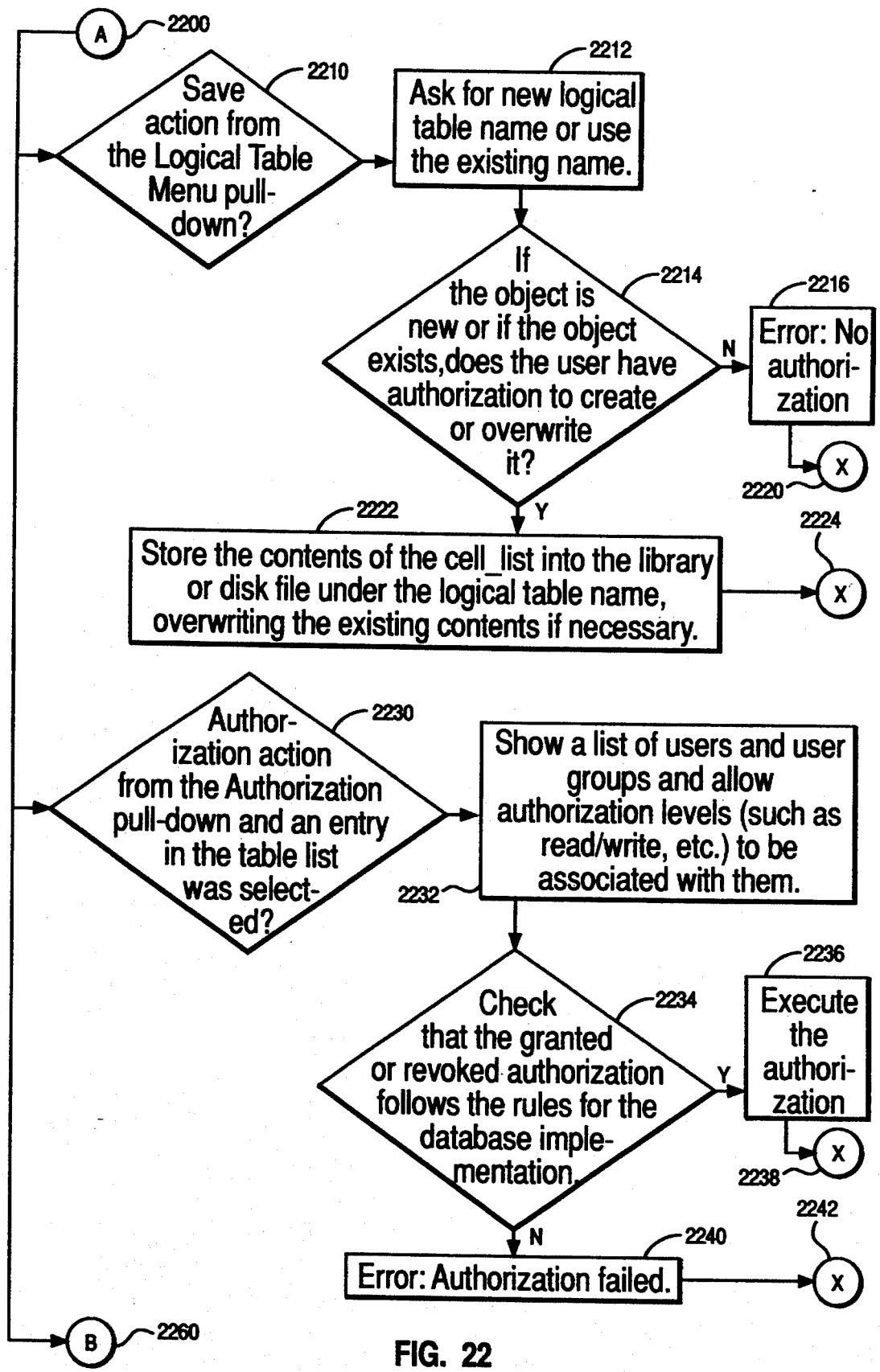

If the user did not select an action in 2066, 2072, 2078, or 2084, control passes via label 2092 to label 2200 of FIG. 22. If a user selects a save action from a logical table pull-down as shown in function block 2210, then a logical name is prompted for in function block 2212, a creation test is performed in decision block 2214, and if no authorization exists, then control passes to label 2060 of FIG. 21 to await the user's next selection. However, if authorization does exist, then the contents of cell list are stored as shown in function block 2222, and control is returned to 2060 of FIG. 21 for the next user selection.

If an alternate entry was selected as shown in function block 2230, then a list of users is presented in function block 2232 and a test is performed at decision block 2234 to assure proper rules and authorization. If improper, then the operation fails as shown in function block 2240 and control is returned to 2060 of FIG. 21 to process the next user selection. However, if authorized, then authorization is executed as shown in function block 2236 and control is returned to 2060 of FIG. 21 to await the next user selection.

Figure 23:
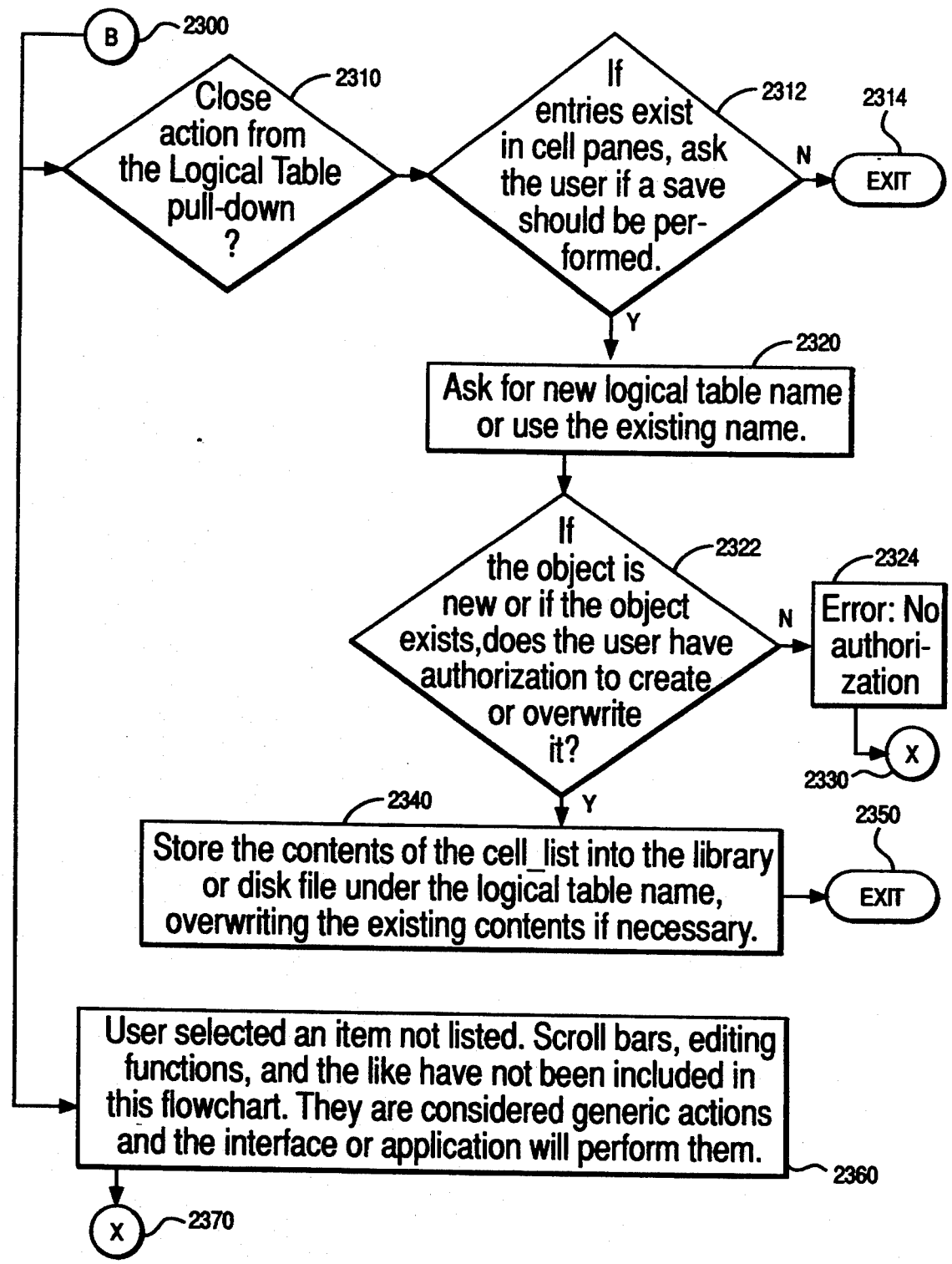

Control passes via label 2160 to 2300 of FIG. 23. At function block 2310 close processing is commenced. A test is performed at decision block 2312 to determine if a save operation should be performed. If not, then exit as shown in terminal 2314. If so, then prompt for a name as shown in function block 2320, test for a new object in decision block 2322, if it is new, then store it as shown in function block 2340 and exit at terminal block 2350. If it is not new, then error as shown in function block 2324 and control passes back to 2060 of FIG. 21 to await next user selection.

If a user selects an item not listed as shown in function block 2360, then the selection is processed and control is passed to 2060 of FIG. 21 to await the next user selection.

Figure 24:
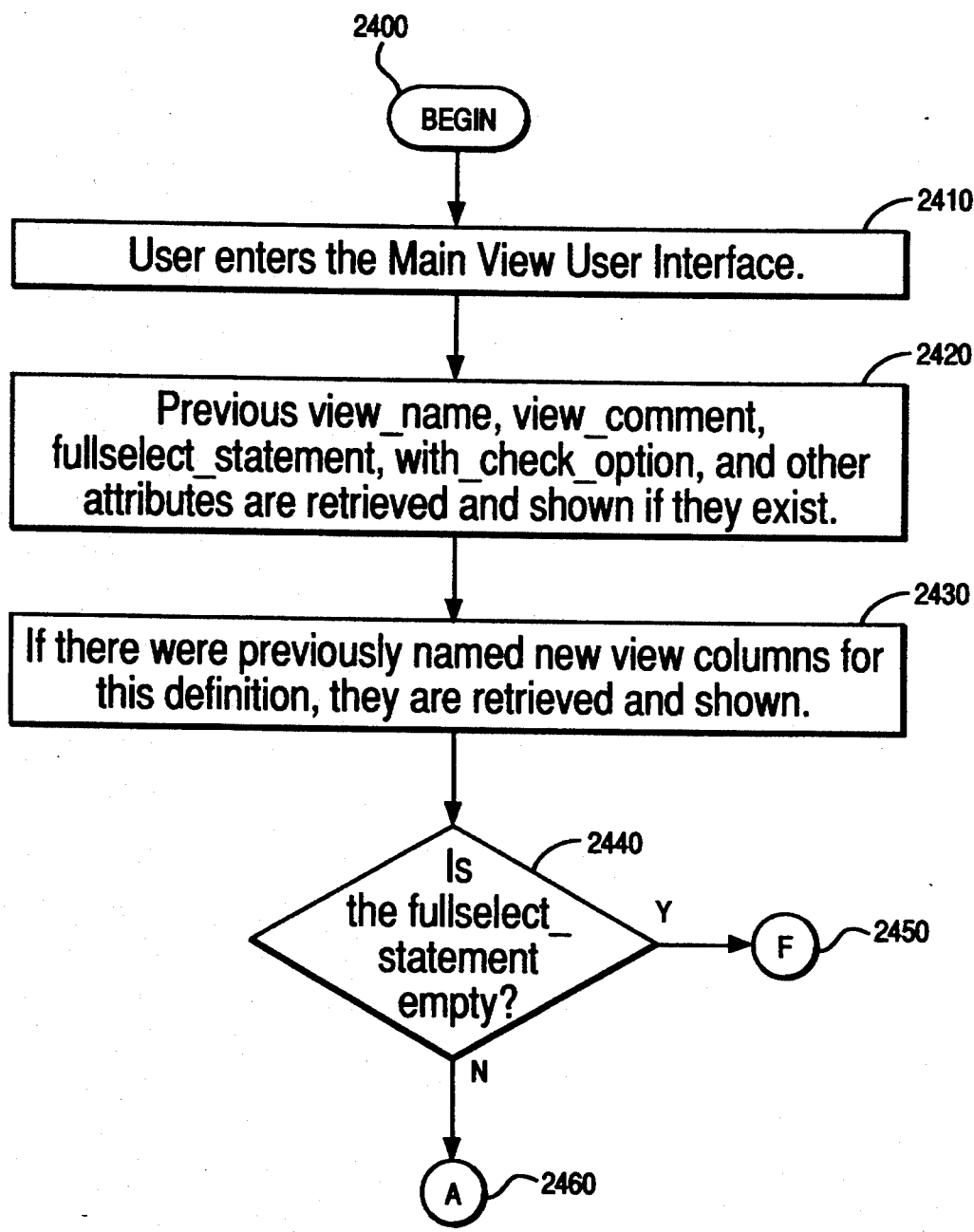
FIGS. 24–28 are the flowcharts presenting the detailed logical for the internal processing of the main view interface for naming view columns in accordance with the subject invention.

FIG. 24 performs the main view interface initialization commencing at terminal 2400 and immediately flowing into function block 2410 for the main view interface entry. Thereafter, attributes are retrieved as shown in function block 2420 and shown in function block 2430. If the fullselect is empty in decision block 2440, then control passes via label 2450 to label 2812 of FIG. 28. However if an empty state is not encountered, then control passes via label 2460 to label 2500 of FIG. 25.

Figure 25:
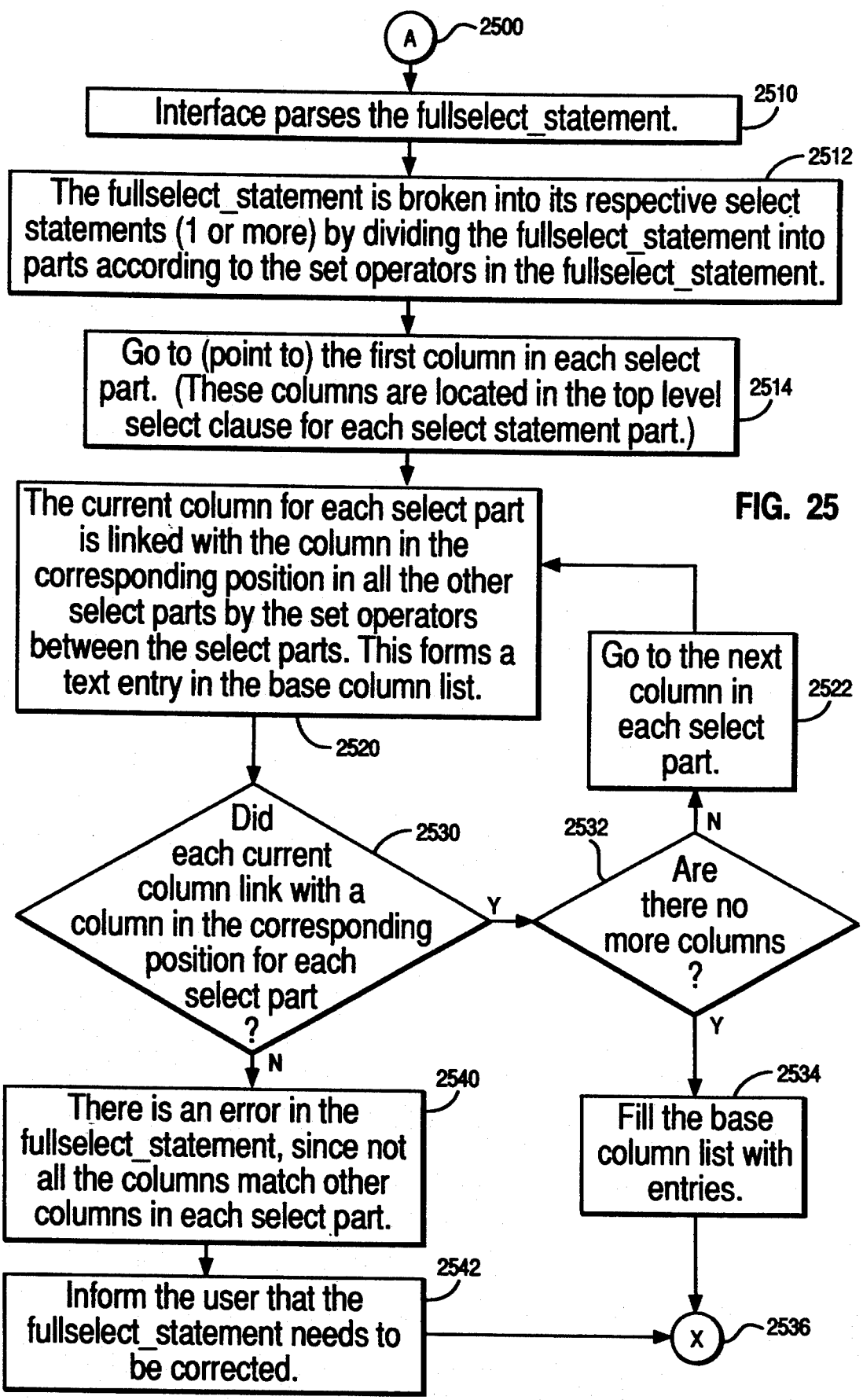

FIG. 25 commences at label 2500 and immediately passes control to function block 2510 to parse the FULLSELECT statement. Then, at function block 2512, the fullselect statement is parsed, a branch is executed in function block 2514, a text entry is created in function block 2520, and a test is performed in decision block 2530 to determine if linkages are appropriately set. If proper linkages, then if no more columns in decision block 2532, then the next column part is processed in function block 2522 and control passes to function block 2520. If there are no more columns, then control passes to function block 2534, the base column is filled with entries and control passes to label 2600 of FIG. 26 to update the display and await another user selection. If linkages are not appropriately set at decision block 2530, then error processing in line with function block 2540 is performed, a message is displayed as shown in function block 2542, and control passes to label 2600 of FIG. 26 to update tile display and await another user selection.

Figure 26:
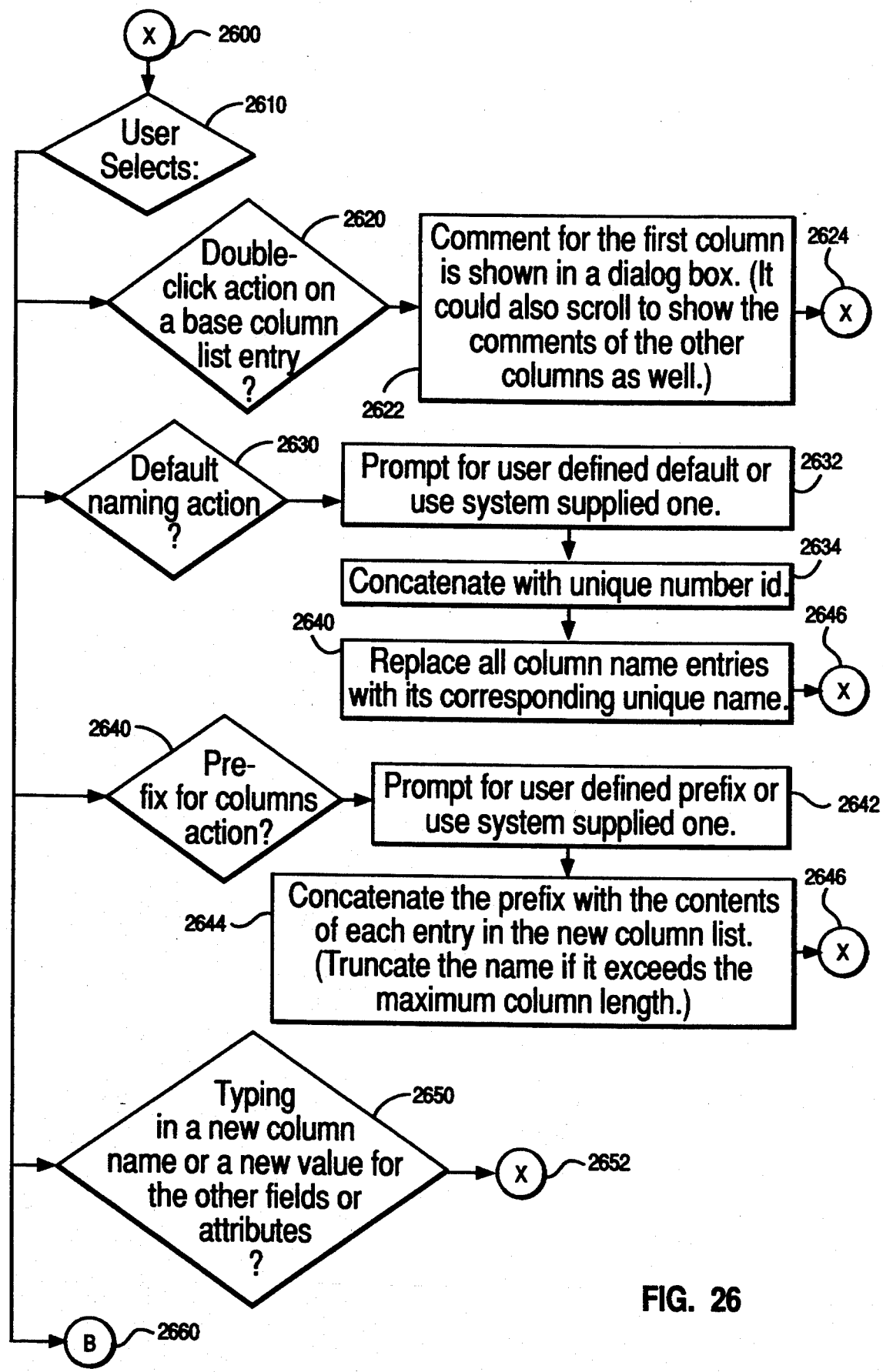

A test is performed at decision block 2610 of FIG. 26 to determine user selection. If a user selects a double-click action on a column entry as shown in function block 2620, then a column's comment is displayed as shown in function block 2622 to aid the user and control is passed back to label 2600 to update the display and await another user selection.

If a user selects a default naming action as shown in function block 2630, then the user is prompted as shown in function block 2632, the name is concatenated with a unique id as shown in function block 2634, all column name entries are replaced with corresponding unique names as shown in function block 2640 and control is passed back to label 2600 to update the display and await another user selection.

If a user selects a prefix for columns action as shown in function block 2640 then a user prompt is presented as shown in function block 2642, a prefix is concatenated with the entries as shown in function block 2644 and control is passed back to label 2600 to update the display and await another user selection.

If a user types in a new name or a new value as shown in function block 2650, then control is passed back to label 2600 to update the display and await another user selection.

Figure 27:
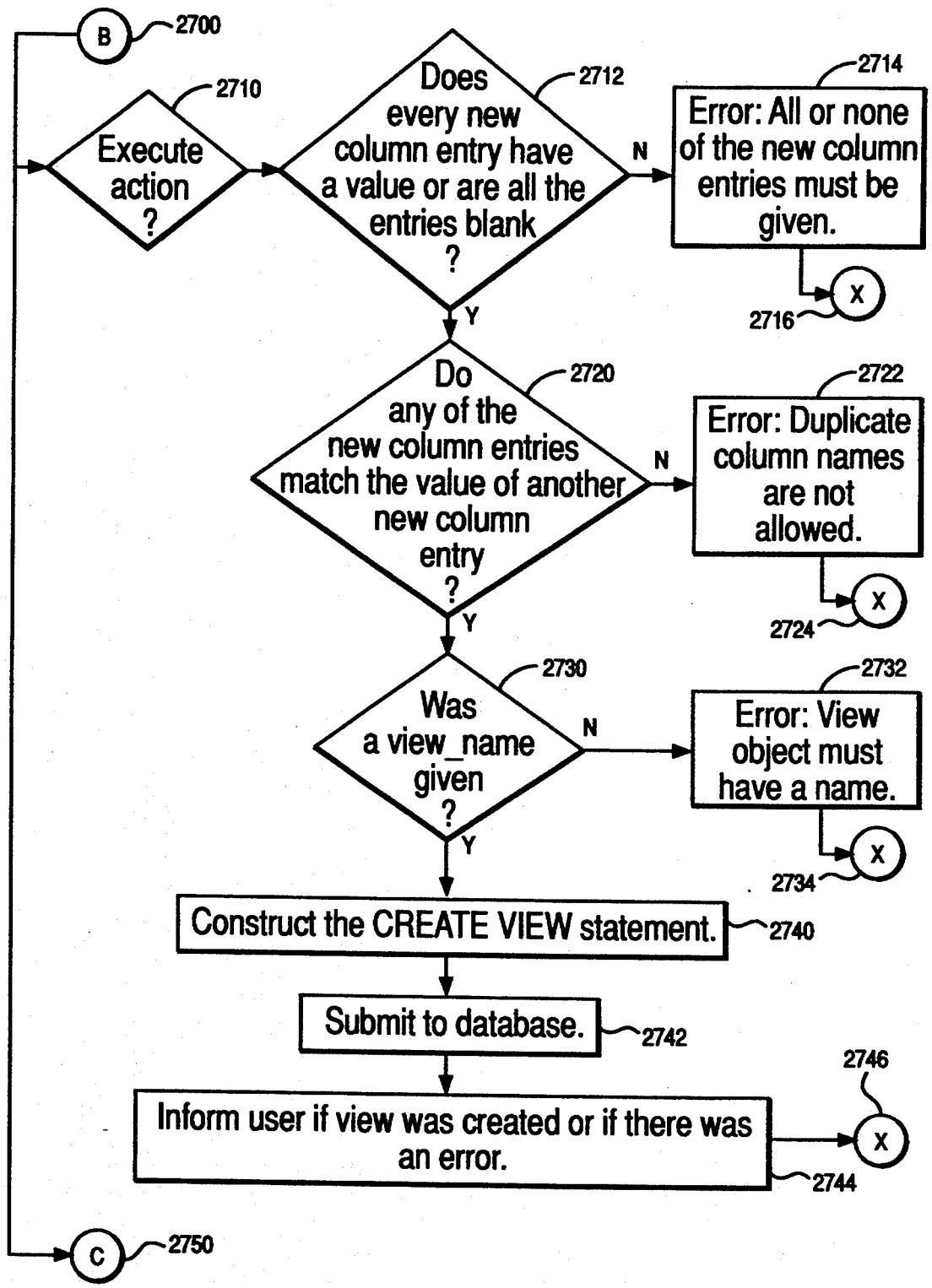

Control passes via label 2260 to label 2700 of FIG. 27 for further processing of user selections. If an execute action is detected at function block 2710, then a test is performed as indicated in decision block 2712. If entries have not been filled in then an error is detected and handled as shown in function block 2714 and control is passed back to label 2600 to update the display and await another user selection.

If no error is detected in decision block 2712, then another test is performed in decision block 2720 to determine if any of the new column entries match. If an error is detected, then it is handled as shown in function block 2722 and control is passed back to label 2600 to update the display and await another user selection.

If no error is detected in decision block 2720, then another test is performed in decision block 2730 to determine if any of the new column entries match. If an error is detected, then it is handled as shown in function block 2732 and control is passed back to label 2600 to update the display and await another user selection.

If no error is detected in decision block 2730, then the create view statement is constructed as shown in function block 2740, the statement is submitted to the database server as shown in function block 2742, a message is displayed as shown in function block 2744 and control is passed back to label 2600 to update the display and await another user selection.

Figure 28:
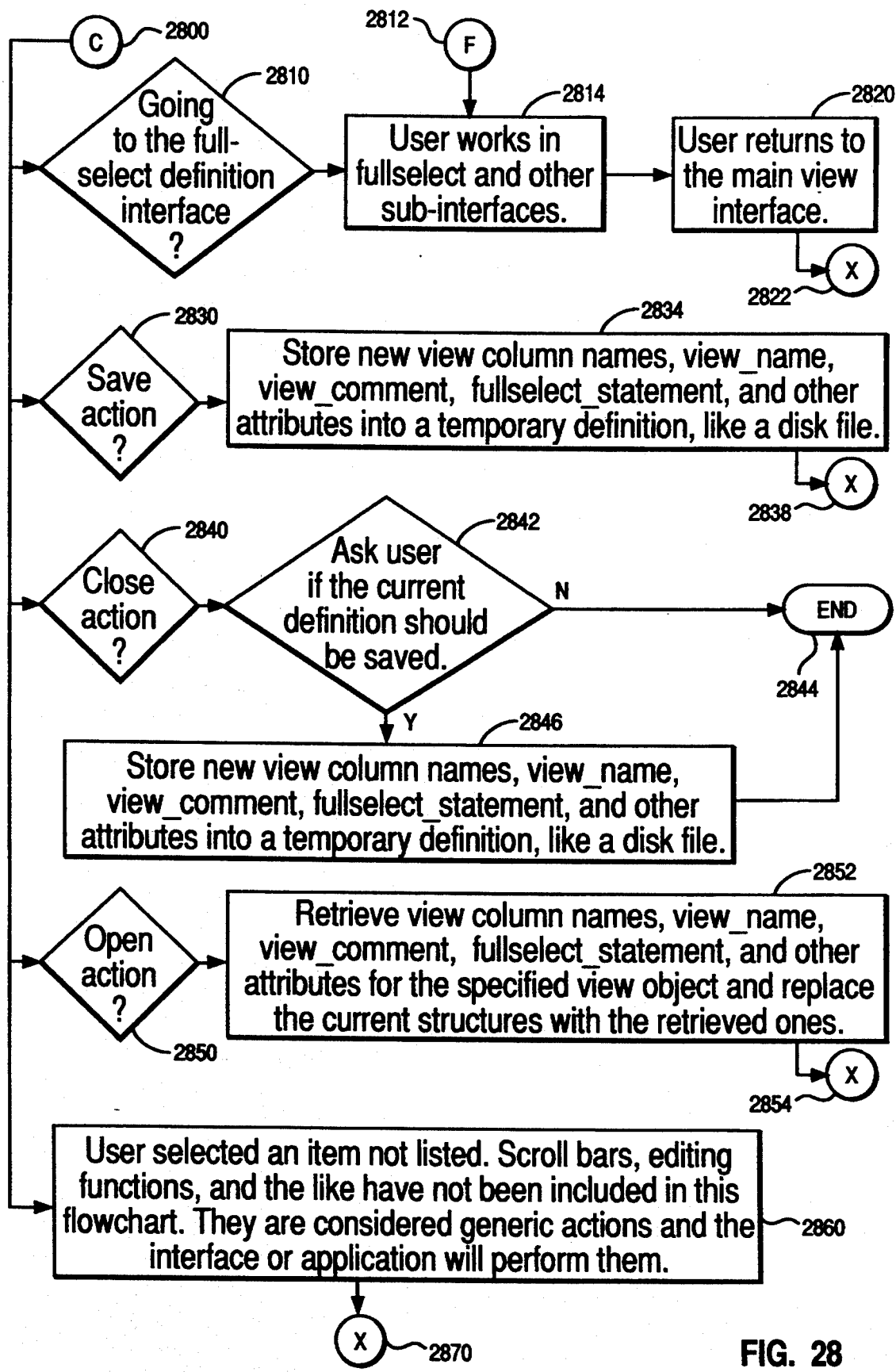

Control passes via label 2750 to label 2800 of FIG. 28 for further processing of user selections. If an FULLSELECT action is detected at function block 2810, then a user is transferred to a fullselect mode as shown in function block 2814 and detailed in earlier flowcharts of the subject invention until a return is detected in function block 2820 whereupon control is passed back to label 2600 to update the display and await another user selection.

If a save action is detected at function block 2830, then attribute information is stored as shown in function block 2834 and control passes back to label 2600 to update the display and await another user selection.

If a close action is detected at function block 2840, then the user is prompted as shown in function block 2842 to save or not to save. If save is indicated, then the new attribute information is saved prior to exiting at label 2844. If not, then an immediate exit without save is performed.

If an open action is detected at function block 2850, then attribute information is retrieved as shown in function block 2852 and control passes back to label 2600 to update the display and await another user selection.

If another user selection was made as indicated in function block 2860, then the selection is processed as shown in function block 2860 and control is passed back to label 2600 to update the display and await another user selection.

```
        'PMConstants ' !
     !View class methods ! !
     !View methods !
        buildMenuBar "Private - Create the menus that make up the menu
        bar."
```

```
| textPane eachMenu |
"    menuWindow addMenu: self fileMenu owner: self."
    (self class canUnderstand: #saveAs) ifFalse: [
        (eachMenu := menuWindow menuTitled: '~File')
notNil
            ifTrue: [eachMenu disableItem: #saveAs]].
"   textPane := self searchForDefaultTextPane.
    textPane notNil ifTrue: [
        menuWindow addMenu: TextPane editMenu owner:
textPane.
        menuWindow addMenu: TextPane smalltalkMenu owner:
textPane.
        ]."
    children do: [ :subpane |
        eachMenu := subpane menu.
        eachMenu notNil ifTrue: [
            menuWindow addMenu: eachMenu.
        ]].
    menuWindow systemMenu
        insertItem: '~Zoom Text    Alt+Z'
        selector: #zoom
        accelKey: $z
        accelBits: AfChar | AfAlt
        after: 5.
    menuWindow systemMenu
        insertItem: 'Fonts...'
        selector: #setFonts
        accelKey: nil
        accelBits: nil
        after: 6!

close
        "close application"
    super close.!

getTablesViews: aListPane
        "fills the tables and views lists
        with a list of user selectable tables and views"
    aListPane contents: MasterTableList.!
```

```
initWindowSize
        "view class method -> Initializes the size of the
window"
    ^(Display width + 3) @ (Display height)!

label: aString
        "Set the window label of the receiver to
aString."
        "Changed from base method to always set label
to
            aString"
    label := aString.
    label size > 500 ifTrue: [ label := label copyFrom: 1
to: 500 ].
        "Experimentally determined that labels more than
500 bytes
         cause PM to mess up the title bar."
    handle isNil ifTrue: [ ^self ].
    handle isValid ifTrue: [
        parent handle setWindowText: label;
        changeSwitchEntry: label ].!

putText: aText inPane: aTextPane
        "view class method -> puts text in a selected
text pane
         after the cursor, modified flag turned off to
keep save
         changes pop-up from showing until user closes
interface"
    aTextPane insert: aText.
    aTextPane modified: false.
    self activeTextPane: aTextPane.! !

SUBSELECT Software

View subclass: #SubSelectView
  instanceVariableNames:
    'tlListPane t2ListPane clListPane c2ListPane
```

```
selectText fromText whereText groupByText havingText '
  classVariableNames: ''
  poolDictionaries: ''   !
!SubSelectView class methods ! !
!SubSelectView methods !
clearSubSelect
        "clears the text panes in the sub select view"
    whereText reinitialize; contents: ''; display.
    groupByText reinitialize; contents: ''; display.
    havingText reinitialize; contents: ''; display.
    self activeTextPane: whereText.!

contentsFrom: aTextPane
        "fills the from text pane"
    ^nil!

contentsGroupBy: aTextPane
        "fills the group by text pane"
    ^nil!

contentsHaving: aTextPane
        "fills the having text pane"
    ^nil!

contentsSelect: aTextPane
        "fills the select text pane"
    ^nil!

contentsWhere: aTextPane
        "fills the where text pane"
    ^nil!

getColumns: aListPane
        "gets the columns for the selected table
         (from one of the two table lists)"
    | x |
    (c1ListPane = aListPane)
        ifTrue: [x := t1ListPane selection]
        ifFalse: [x := t2ListPane selection].
    (x isNil)
```

```
        ifFalse: [aListPane contents: (MasterColumnList
at: x)].!

headingFrom: aTextPane
        "heading for from text pane"
    aTextPane contents: 'FROM CLAUSE:'.!

headingGroupBy: aTextPane
        "heading for group by text pane"
    aTextPane contents: 'GROUP BY CLAUSE:'.!

headingHaving: aTextPane
        "heading for having text pane"
    aTextPane contents: 'HAVING CLAUSE:'.!

headingSelect: aTextPane
        "heading for select text pane"
    aTextPane contents: 'SELECT CLAUSE:'.!

headingWhere: aTextPane
        "heading for where text pane"
    aTextPane contents: 'WHERE CLAUSE:'.!

initSubSelect
        "initializes sub select view variables"
            "tables and column structures are for demo
purposes"
    | tables |
    exists := 0.
    SubSelectList := SortedCollection new.
    NewColumnList := SortedCollection new.
    MasterTableList := OrderedCollection new.
    MasterColumnList := OrderedCollection new.

buttons := #('=' '<>' '<' '>' '<=' '>=' 'NOT'
'BETWEEN' 'AND' 'IS' 'NULL' 'LIKE').
    Tables := #('BOOKS' 'ORG' 'STAFF' 'EMPVIEW' 'TAXCAL'
```

'SUM1' 'SUM2').
    MasterTableList add: 'Defined Columns'.
    Tables do: [:x | MasterTableList add: x].

TableColumns := #(
                            ('AUTHOR - VARCHAR(40)' 'TITLE - VARCHAR(40)' 'GENRE - SMALLINT'
                             'TYPE - SMALLINT' 'PRICE - DECIMAL(7,2)')
                            ('DEPTNUMB - SMALLINT' 'DEPTNAME - VARCHAR(14)'
                             'MANAGER - SMALLINT' 'DIVISION - VARCHAR(10)'
                             'LOCATION - VARCHAR(13)')
                            ('ID - SMALLINT' 'NAME - VARCHAR(9)' 'DEPT - CHAR(5)'
                             'YEARS - SMALLINT' 'SALARY - DECIMAL(7,2)' 'COMM - DECIMAL(7,2)')
                            ('ID - SMALLINT' 'LASTNAME - VARCHAR(30)' 'FIRSTNAME - VARCHAR(30)')
                            ('SUM(INCOME)' 'SUM(DEDUCT)')
                            ('SUM(SALARY)' 'AVG(COMM)')
                            ('COUNT(INVEST)')
                            ).
    (NewColumnList isNil)
        ifTrue: [MasterColumnList add: #()]
        ifFalse: [MasterColumnList add: NewColumnList].
    TableColumns do: [:x | MasterColumnList add: x].!

menuSubSelect2: aListPane
    "Creates the sub select view menu."
    aListPane setMenu: ((Menu
        labels: '~Define Column\~Full Select' withCrs
        lines: #(1)
        selectors: #(openDefineColumnView openFullSelectView))
            title: '~Screens';
            owner: self;
            yourself)!

```
menuSubSelect: aListPane
        "Creates the sub select view menu."
    aListPane setMenu: ((Menu
        labels: '~Save\~Reformat\~Clear' withCrs
        lines: #(2)
        selectors: #(saveSubSelect reformatSubSelect
clearSubSelect))
            title: '~SubSelect';
            owner: self;
            yourself)!

openDefineColumnView
        "opens full select window"
    DefineColumnView new openDefineColumn!

openFullSelectView
        "opens full select window"
    FullSelectView new openFullSelect!

openSubSelect
        "main method for sub select view

SubSelectView new openSubSelect
"
    | groupPane pos |

" *** initial setup ***"
    self initSubSelect.

self label: 'View SubSelect Definition'.

" *** first table/view list selection ***"
    self addSubpane:
        ( t1ListPane := ListPane new
            owner: self;
            when: #getContents perform: #getTablesViews:
;
            when: #select perform: #selectedTablesViews:
```

```
;
"                       when: #doubleClickSelect perform: #hideShow:
;"

when: #getMenu perform: #menuSubSelect: ;
                        framingRatio:
                            ((0 @ (36/42)) corner: ((1/4) @ 1)) ).

" *** first column list selection ***"
        self addSubpane:
            (c1ListPane := ListPane new
                owner: self;
                when: #getContents perform: #getColumns: ;
                when: #select perform: #selectedColumns: ;
"               when: #doubleClickSelect perform: #hideShow:
;"
                when: #getMenu perform: #menuSubSelect2: ;
                framingRatio:
                    (((1/4) @ (36/42)) corner: ((2/4) @ 1))
).

" *** second column list selection ***"
        self addSubpane:
            (c2ListPane := ListPane new
                owner: self;
                when: #getContents perform: #getColumns: ;
                when: #select perform: #selectedColumns: ;
"               when: #doubleClickSelect perform: #hideShow:
;"
"               when: #getMenu perform: #menuTablesViews: ;"
                framingRatio:
                    (((1/2) @ (36/42)) corner: ((3/4) @ 1))
).

" *** second tables and views list selection *** "
        self addSubpane:
            (t2ListPane := ListPane new
                owner: self;
                when: #getContents perform: #getTablesViews:
```

```
;
                when: #select perform: #selectedTablesViews:
;
"               when: #doubleClickSelect perform: #hideShow:
;"
"               when: #getMenu perform: #menuTablesViews: ;"
                framingRatio:
                    (((3/4) @ (36/42)) corner: (1 @ 1)) ).

" *** buttons ***"
    self addSubpane:
        (groupPane := GroupPane new
            owner: self;
            framingRatio: ((0 @ (32/42)) corner: (1 @
(36/42)));
"           when: #getContents perform: #input;"
"           when: #getMenu perform: #inputMenu:;"
            when: #childClicked perform: #processClick:).
        1 to: 4 do: [:x |
            1 to: 3 do: [:y |
                pos := (y - 1) * 3 + x.
                groupPane addSubpane: (ButtonPane new
                    contents: (buttons at: pos);
                    pushButton;
                    framingRatio: (((x - 1) / 4) @ ((y - 1) /
3)
                        corner: ((x / 4) @ (y / 3))) ).
        ]].

" *** Select heading ***"
    self addSubpane:
        (TextPane new
            owner: self;
            style: TextPane noScrollbarsFrameStyle;
            when: #getContents perform: #headingSelect:;
            framingRatio: ((0 @ (30/42)) corner: (1 @
(32/42))) ).
```

```
" *** Select text ***"
    self addSubpane:
        (selectText := SQLPane new
            owner: self;
            when: #getContents perform: #contentsSelect:
;
            framingRatio: ((0 @ (25/42)) corner: (1 @
(30/42))) ).

" *** From heading ***"
    self addSubpane:
        (TextPane new
            owner: self;
            style: TextPane noScrollbarsFrameStyle;
            when: #getContents perform: #headingFrom:;
            framingRatio: ((0 @ (23/42)) corner: (1 @
(25/42))) ).

" *** From text ***"
    self addSubpane:
        (fromText := SQLPane new
            owner: self;
            when: #getContents perform: #contentsFrom: ;
            framingRatio: ((0 @ (19/42)) corner: (1 @
(23/42))) ).

" *** Where heading ***"
    self addSubpane:
        (TextPane new
            owner: self;
            style: TextPane noScrollbarsFrameStyle;
            when: #getContents perform: #headingWhere:;
            framingRatio: ((0 @ (17/42)) corner: (1 @
(19/42))) ).

" *** Where text ***"
    self addSubpane:
        (whereText := SQLPane new
            owner: self;
```

```
               when: #getContents perform: #contentsWhere: ;
               framingRatio: ((0 @ (12/42)) corner: (1 @
(17/42))) ).

" *** GroupBy heading ***"
    self addSubpane:
        (TextPane new
            owner: self;
            style: TextPane noScrollbarsFrameStyle;
            when: #getContents perform: #headingGroupBy:
;
            framingRatio: ((0 @ (10/42)) corner: (1 @
(12/42))) ).

" *** GroupBy text ***"
    self addSubpane:
        (groupByText := SQLPane new
            owner: self;
            when: #getContents perform: #contentsGroupBy:
;
            framingRatio: ((0 @ (6/42)) corner: (1 @
(10/42))) ).

" *** Having heading ***"
    self addSubpane:
        (TextPane new
            owner: self;
            style: TextPane noScrollbarsFrameStyle;
            when: #getContents perform: #headingHaving: ;
            framingRatio: ((0 @ (4/42)) corner: (1 @
(6/42))) ).

" *** Having text ***"

self addSubpane:
    (havingText := SQLPane new
        owner: self;
        when: #getContents perform: #contentsHaving:
```

```
;
            framingRatio: ((0 @ 0) corner: (1 @ (4/42)))
).

self openWindow.
    self activeTextPane: selectText.!

processClick: aGroupPane
        "processes subselect button clicks"
    | button word |
    button := (aGroupPane childClicked) contents.
    word :=  button , ' '.
    (whereText = activeTextPane)
        ifTrue: [self putText: word inPane: whereText].
    (groupByText = activeTextPane)
        ifTrue: [self putText: word inPane: groupByText].
    (havingText = activeTextPane)
        ifTrue: [self putText: word inPane: havingText].!

reformatSubSelect
        "reformats sub select text panes"
        "not yet implemented"
    ^nil!

saveSubSelect
        "saves subselect statement in SubSelectList"
    | answer subSelectString whereContents
      groupByContents havingContents |
    answer := MessageBox confirm: 'Save SubSelect?'.

(answer)
    ifTrue: [
        whereContents := ((whereText contents) zapCrs)
trimBlanks.
        groupByContents := ((groupByText contents)
zapCrs) trimBlanks.
        havingContents := ((havingText contents) zapCrs)
trimBlanks.
```

```
        subSelectString := 'SELECT * FROM NULLID.ORG ',
            'WHERE ', whereContents,
            ' GROUP BY ', groupByContents,
            ' HAVING ', havingContents.
        (exists = 0)
            ifTrue: [ SubSelectList add: subSelectString]
            ifFalse: [ SubSelectList at: exists put:
subSelectString].].!

selectedColumns: aListPane
        "puts the tablename.column name in the appopriate
            text pane"
    | tableName columnName endChar contents done i |
    (clListPane = aListPane)
        ifTrue: [tableName := tlListPane selectedItem]
        ifFalse: [tableName := t2ListPane selectedItem].
    contents := aListPane selectedItem.
    (tableName = 'Defined Columns')
        ifFalse: [ endChar := 0.
            done := false.
            i := 0.
            contents do: [:char |
                ((char = $-) and: [done = false])
                    ifTrue: [endChar := i.
                        done := true]
                    ifFalse: [i := i + 1]].
            columnName := contents copyFrom: 1 to:
(endChar - 1).
            columnName := tableName , '.' , columnName ,
' ']
        ifTrue: [ columnName := contents, ' '].
    (whereText = activeTextPane)
        ifTrue: [self putText: columnName inPane:
whereText].
    (groupByText = activeTextPane)
        ifTrue: [self putText: columnName inPane:
groupByText].
    (havingText = activeTextPane)
```

```
        ifTrue: [self putText: columnName inPane:
havingText].!

selectedTablesViews: aListPane
        "fills the appropriate column display
          from the selected table or view"
    | x y |
    x := aListPane selection.
    y := MasterColumnList at: x.
    (aListPane = t1ListPane)
        ifTrue: [ c1ListPane contents: y; restore;
display]
        ifFalse: [ c2ListPane contents: y; restore;
display].! !
```

FULLSELECT Software

```
View subclass: #FullSelectView
  instanceVariableNames:
    'fullSelectText '
  classVariableNames: ''
  poolDictionaries: ''     !

!FullSelectView class methods ! !

!FullSelectView methods !

clearFullSelect
        "clears the text pane in the full select window"
    fullSelectText contents: ' '.!

contentsFullSelect: aTextPane
        "fills the full select text pane"
    ^nil!
``` getSubSelects: aListPane
    "fills the subselect list with defined subselects"
    aListPane contents: SubSelectList.!

headingFullSelect: aTextPane
    "heading for full select text pane"
    aTextPane contents: 'FULL SELECT STATEMENT:'.!

initFullSelect
    "initializes sub select view variables"
"    buttons := #('EXISTS' 'NOT' 'IN' 'SOME' 'ANY' 'ALL' 'NULL' 'BETWEEN' 'AND' 'OPEN' 'DELETE' ' ')."
    buttons := #('EXISTS' 'NOT' 'UNION' 'INTERSECTION' 'EXCEPT' 'ALL' 'NULL' 'BETWEEN' 'AND' 'OPEN' 'DELETE' 'TRANSFER' 'CREATE').!

menuFullSelect: aListPane
    "Creates the full select view menu."
    aListPane setMenu: ((Menu
        labels: '~Save\~Reformat\~Clear' withCrs
        lines: #(2)
        selectors: #(saveFullSelect reformatFullSelect clearFullSelect))
            title: '~FullSelect';
            owner: self;
            yourself)!

openFullSelect
    " main method for full select view

FullSelectView new openFullSelect

"
    | groupPane pos|

" * initial setup *"
    self initFullSelect.

```
"       subSelectList := aSubSelectList."
        self label: 'View FullSelect Definition'.

" *** sub select list selection ***"
    self addSubpane:
        ( ListPane new
            owner: self;
            when: #getContents perform: #getSubSelects: ;
            when: #select perform: #selectedSubSelect: ;
"           when: #doubleClickSelect perform: #hideShow:
;"

when: #getMenu perform: #menuFullSelect: ;
            framingRatio:
                ((0 @ (11/18)) corner: (1 @ 1)) ).

" *** full select buttons ***"
    self addSubpane:
        (groupPane := GroupPane new
            owner: self;
            framingRatio: ((0 @ (7/18)) corner: (1 @
(10/18)));
"           when: #getContents perform: #input;"
"           when: #getMenu perform: #inputMenu:;"
            when: #childClicked perform: #processClick:).
        1 to: 3 do: [:x |
            1 to: 3 do: [:y |
                pos := (y - 1) * 3 + x.
            groupPane addSubpane: (ButtonPane new
                contents: (buttons at: pos);
                pushButton;
                framingRatio: (((x - 1) / 3) @ ((y - 1) /
3)
                    corner: ((x / 3) @ (y / 3))) ).
        ]].

" *** full select buttons (subselect set) ***"
    self addSubpane:
        (groupPane := GroupPane new
            owner: self;
            framingRatio: ((0 @ (10/18)) corner: (1 @
```

```
"           when: #getContents perform: #input;"
"           when: #getMenu perform: #inputMenu:;"
            when: #childClicked perform: #processClick:).
    1 to: 4 do: [:x |
        4 to: 4 do: [:y |
            pos := (y - 1) * 3 + x.
        groupPane addSubpane: (ButtonPane new
            contents: (buttons at: pos);
            pushButton;
            framingRatio: (((x - 1) / 4) @ 0
                corner: ((x / 4) @ 1)) ).
    ]].

" *** FullSelect heading ***"
    self addSubpane:
        (TextPane new
            owner: self;
            style: TextPane noScrollbarsFrameStyle;
            when: #getContents perform:
#headingFullSelect: ;
            framingRatio: ((0 @ (6 / 18)) corner: (1 @ (7
/ 18))) ).

" *** FullSelect text pane ***"
    self addSubpane:
        (fullSelectText := TextPane new "ViewPane"
            owner: self;
            when: #getContents perform:
#contentsFullSelect: ;
            framingRatio: ((0 @ 0) corner: (1 @ (6 /
18))) ).

self openWindow.

self activeTextPane: fullSelectText.!
```

```
processClick: aGroupPane
        "processes full select button clicks "
    | button word |
    button := (aGroupPane childClicked) contents.
    word :=  button , ' '.
    self putText: word inPane: fullSelectText.!

reformatFullSelect
        "reformats full select text pane"
          "not yet implemented"
     ^nil!

saveFullSelect
         "saves full select text pane"
          "not yet implemented"
      ^nil!

selectedSubSelect: aListPane
        "gets sub select statement and puts it in the
           full select text pane"
    | subSelect |
    subSelect := (aListPane selectedItem), ' '.
    self putText: subSelect inPane: fullSelectText.! !
                    MainView Software View subclass: #MainView
  instanceVariableNames:
    'nameText commentText columnsPane '
  classVariableNames: ''
  poolDictionaries: ''    !

!MainView class methods ! !

!MainView methods !

contentsComment: aTextPane
        "fills the Comment text pane"
      ^nil!
``` contentsName: aTextPane
    "fills the Name text pane"
    ^nil!

contentsViewColumns: aGraphPane
    "fills the view columns pane - for demo purposes"
    | pen area top bottom left right rowWidth columnWidth
    colCharWidth nextRow rows |
    rows := OrderedCollection new.
    rows := #( ('ORG.DEPTNUMB UNION AREA.DEPTNUMB' 'ID' )
            ('ORG.DEPTNAME UNION AREA.DEPTNAME'
'NAME')
            ('ORG.MANAGER UNION AREA.COORDINATOR'
'MANAGER')
            ('ORG.DIVISION UNION AREA.CODE'
'DIVISION')
            ('ORG.LOCATION UNION AREA.LOCATION'
'LOCATION')).
    colCharWidth := 50. "6"
    pen := aGraphPane pen.
    area := aGraphPane rectangle.
    top := area top - 10.
    bottom := area bottom - 18.
    left := area left - 20.
    right := area right.
    rowWidth := aGraphPane font height + 3.
    columnWidth := aGraphPane font width * (colCharWidth
+ 4).
    pen erase.
    pen drawRetainPicture: [
        top - rowWidth to: (bottom - 50) by: (0 -
rowWidth) do:
            [ :nextRowPos | pen place: left @ nextRowPos;
                goto: right @ nextRowPos].
        left + columnWidth to: (right + 50) by:
columnWidth do: [
            :nextColumnPos | pen place: nextColumnPos @
top;

```
                    goto: nextColumnPos @ bottom]].
        nextRowPos := top - rowWidth + 3.
        nextColumnPos := left + 20.
        nextRow := 1.
    pen drawRetainPicture:
    [ rows size timesRepeat:
            [ (rows at: nextRow) do: [ :nextItem |
                pen displayText: nextItem from: 1 to:
(nextItem size min: (colCharWidth - 1))
                at: nextColumnPos @ nextRowPos.
            nextColumnPos := nextColumnPos +
columnWidth].
            nextRow := nextRow + 1.
            nextRowPos := nextRowPos - rowWidth.
            nextColumnPos := left + 20]].!

headingComment: aTextPane
        "heading for Comment text pane"
    aTextPane contents: 'COMMENT:'.!

headingName: aTextPane
        "heading for Name text pane"
    aTextPane contents: 'NAME:'.!

initMainView
    " initializes main view "
    ^nil!

menuMainView: aViewPane
        "Creates the full select view menu."
    aViewPane setMenu: ((Menu
        labels: '~Save\~Reformat\~Clear' withCrs
        lines: #(2)
        selectors: #(saveMainView reformatMainView
clearMainView))
                title: '~Main View';
                owner: self;
                yourself)!
``` openMainView

"main method for main view

MainView new openMainView

"

| groupPane |

" * initial setup *"
    self initMainView.
    self label: 'View Main Statement'.

" * View Columns *"
    self addSubpane:
        (columnsPane := GraphPane new
            owner: self;
            when: #getContents perform:
contentsViewColumns:;
            framingRatio: ((0 @ 0) corner: (1 @ (5/8)))
).

" * buttons *"
    self addSubpane:
        (groupPane := GroupPane new
            owner: self;
            framingRatio: ((0 @ (5/8)) corner: (1 @ (6 / 8)));
"           when: #getContents perform: #input;"
"           when: #getMenu perform: #inputMenu:;"
            when: #childClicked perform: #processClick:).
        groupPane addSubpane:
            (ButtonPane new
                owner: self;
                checkBox;
                contents: 'WITH CHECK OPTION';
                when: #clicked perform: #checkButton:;
                selection: true;
                framingRatio: ( ((0 @ 0) corner: (1 @ 1)))).

```
" *** Name heading ***"
    self addSubpane:
        (TextPane new
            owner: self;
            style: TextPane noScrollbarsFrameStyle;
            when: #getContents perform: #headingName:;
            framingRatio: ((0 @ (7/8)) corner: ((1/3) @ 1)) ).

" *** Name text ***"
    self addSubpane:
        (nameText := SQLPane new "ViewPane"
            owner: self;
            style: TextPane noScrollbarsFrameStyle;
            when: #getContents perform: #contentsName: ;
            when: #getMenu perform: #menuMainView: ;
            framingRatio: (((1/3) @ (7/8)) corner: (1 @ 1)) ).

" *** Comment heading ***"
    self addSubpane:
        (TextPane new
            owner: self;
            style: TextPane noScrollbarsFrameStyle;
            when: #getContents perform: #headingComment:;
            framingRatio: ((0 @ (6/8)) corner: ((1/3) @ (7/8))) ).

" *** Comment text ***"
    self addSubpane:
        (commentText := SQLPane new "ViewPane"
            owner: self;
            style: TextPane noScrollbarsFrameStyle;
            when: #getContents perform: #contentsComment: ;
            framingRatio: (((1/3) @ (6/8)) corner: (1 @ (7/8))) ).
``` self openWindow.

self activeTextPane: nameText.! !

Logical Table View Software

View subclass: #DefineColumnView
  instanceVariableNames:
    'matrixPane tlListPane clListPane '
  classVariableNames: ''
  poolDictionaries: ''      !

!DefineColumnView class methods ! !

!DefineColumnView methods !

clearDefineColumn
    "clears defined columns matrix"
    | answer i row newColumn definedColumns |
    matrixPane currentRow: 1.
    1 to: matrixPane matrixY do: [:y |
      row := matrixPane matrix at: y.
        1 to: matrixPane matrixX do: [:x |
          row at: x put: '']].
   matrixPane display.!

contentsMatrixPane: aMatrixPane
    "get matrix pane contents"
    | contentsRow displayRow idCell contentsCell |
    1 to: aMatrixPane displayY do: [ :y |
    contentsRow := aMatrixPane matrix at: y.
    displayRow := aMatrixPane paneMatrix at: y.
    1 to: aMatrixPane displayX do: [:x |
      idCell := displayRow at: x.
      contentsCell := contentsRow at: x.
      idCell contents: contentsCell]].!

```
getColumns: aListPane
        "gets the columns for the selected table
            (from one of the two table lists)"
    | x |
    x := tlListPane selection.
    (x isNil)
        ifFalse: [aListPane contents: (TableColumns at:
x)].!

getTablesViews: aListPane
        "fills the tables and views lists
        with a list of user selected tables and views"
    aListPane contents: Tables.!

grantColumn
        "grants logical table authorizations"
            "not yet implemented"
      ^nil!

headingDefineColumn: aTextPane
        "heading for defined columns pane"
    aTextPane contents: 'DEFINED COLUMNS:'.!

initDefineColumn
        "initializes define column view variables"
    buttons := #('+' '-' '*' '/' 'SUM(' 'AVG(' 'COUNT('
'DISTINCT' 'MAX(' 'MIN(' 'DISTINCT' 'ALL' ')' ' ' ' ' ' ' ' '
').!

initMatrixPane: aMatrixPane
    "initialize matrix pane contents"
    | row |
    aMatrixPane currentRow: 1;
        paneTypes: #(1); "type of each pane in a row"
        matrix: OrderedCollection new; "contents in each
cell"
        paneMatrix: OrderedCollection new; "pane id of
each cell"
```

```
        displayX: 1; "number of horizontal cells to
display "
        displayY: 3; "number of vertical cells to
display"
        matrixX: 1; "number of horizontal cells in
matrix"
        matrixY: 3. "number of vertical cells in matrix"
        1 to: aMatrixPane matrixY do: [ :y |
            row := OrderedCollection new.
            1 to: aMatrixPane matrixX do: [:x |
                row add: ' '].
            aMatrixPane matrix add: row].!

menuAuthorizations
        "Creates the authorizations menu."
    ^Menu new
        appendItem: '~Grant' selector: #grantColumn;
        appendItem: '~Revoke' selector: #revokeColumn;
        title: '~Authorizations'!

menuDefineColumn
        "Creates the define column view menu."
    ^Menu new
        appendItem: '~Save' selector: #saveDefineColumn;
        appendItem: '!!Reformat' selector:
#reformatDefineColumn;
        appendSeparator ;
        appendItem: '~Clear' selector:
#clearDefineColumn;
        title: '~Logical Table'!

openDefineColumn
        "main method for define column view

DefineColumnView new openDefineColumn

"
    | paneId groupPane lowerX lowerY upperX upperY row
pos |
```

```
" *** initial setup ***"
    self initDefineColumn.
    self label: 'View Logical Table Definition'.

" *** table/view list selection ***"
    self addSubpane:
        ( tlListPane := ListPane new
            owner: self;
            when: #getContents perform: #getTablesViews: ;

when: #select perform: #selectedTablesViews: ;

"           when: #doubleClickSelect perform: #hideShow: ;"

"           when: #getMenu perform: #menuDefineColumn: ;"

framingRatio:
                ((0 @ (11/18)) corner: ((1/2) @ 1)) ).

" *** column list selection ***"
    self addSubpane:
        (clListPane := ListPane new
            owner: self;
            when: #getContents perform: #getColumns: ;
            when: #select perform: #selectedColumns: ;
"           when: #doubleClickSelect perform: #hideShow: ;"
"           when: #getMenu perform: #menuTablesViews: ;"
            framingRatio:
                (((1/2) @ (11/18)) corner: (1 @ 1)) ).

" *** buttons ***"
    self addSubpane:
        (groupPane := GroupPane new
            owner: self;
            framingRatio: ((0 @ (7/18)) corner: (1 @ (11/18)));
```

```
"           when: #getContents perform: #input;"
"           when: #getMenu perform: #inputMenu:;"
            when: #childClicked perform: #processClick:).
    1 to: 4 do: [:x |
        1 to: 4 do: [:y |
            pos := (y - 1) * 4 + x.
            groupPane addSubpane: (ButtonPane new
                contents: (buttons at: pos);
                pushButton;
                framingRatio: (((x - 1) / 4) @ ((y - 1) /
4)
                    corner: ((x / 4) @ (y / 4))) ).
        ]].

" *** Define Column heading ***"
    self addSubpane:
        (TextPane new
            owner: self;
            style: TextPane noScrollbarsFrameStyle;
            when: #getContents perform:
#headingDefineColumn:;
            framingRatio: ((0 @ (6 / 18)) corner: (1 @ (7
/ 18))) ).

" *** matrix pane ***"
    self addSubpane:
        (matrixPane := MatrixPane new
            owner: self;
            framingRatio: ((0 @ 0) corner: (1 @ (6 /
18)));

when: #getContents perform:
#contentsMatrixPane:
"           when: #getMenu perform: #inputMenu:;"
"           when: #childClicked perform:
#processClick:").
```

```
        self initMatrixPane: matrixPane.
        1 to: (matrixPane displayY) do: [:y |
            row := OrderedCollection new.
            1 to: (matrixPane displayX) do: [:x |
                lowerY := 1 - ( (1 / (matrixPane
displayY) ) * y).
                lowerX := (x - 1) * (1 / (matrixPane
displayX) ).
                upperY := lowerY + (1 / (matrixPane
displayY)).
                upperX := lowerX + (1 / (matrixPane
displayX)).
                matrixPane addSubpane: (paneId :=
TextPane new "CellPane"
                    contents: (((matrixPane matrix) at:
y) at: x);
                    framingRatio: ((lowerX @ lowerY)
corner: (upperX @ upperY))).
                row add: paneId].
            matrixPane paneMatrix add: row].

self menuWindow addMenu: self menuDefineColumn owner:
self.
    self menuWindow addMenu: self menuAuthorizations
owner: self.
    self openWindow.
    self activeTextPane: ((matrixPane paneMatrix at: 1)
at: 1).!

processClick: aGroupPane
        "processes subselect button clicks"
    | button word row cell|
    button := (aGroupPane childClicked) contents.
    word :=  button , ' '.
    1 to: (matrixPane displayY) do: [:y |
        row := matrixPane paneMatrix at: y.
        1 to: (matrixPane displayX) do: [:x |
            cell := row at: x.
            (cell = activeTextPane)
```

```
                ifTrue: [self putText: word inPane: cell]
]].!

reformatDefinedColumn
        "reformats defined column fields"
            "not yet implemented"
    ^nil!

revokeColumn
        "revoke logical table authorizations"
            "not yet implemented"
    ^nil!

saveDefineColumn
        "saves defined columns in  statement in
NewColumnList"
    | answer startRow endRow row newColumn definedColumns
cellContents |
    answer := MessageBox confirm: 'Save Defined
Columns?'.
    (answer)
    ifTrue: [
        startRow := matrixPane currentRow.
        endRow := startRow + (matrixPane displayY) - 1.
        startRow to: endRow do: [ :y |
            row := matrixPane paneMatrix at: y.
            1 to: matrixPane matrixX do: [ :x |
                cellContents := (((row at: x) contents)
zapCrs) trimBlanks.
                ((matrixPane matrix) at: y) at: x put:
cellContents]].
        definedColumns := OrderedCollection new.
        1 to: matrixPane matrixY do: [:y |
        row := matrixPane matrix at: y.
        1 to: matrixPane matrixX do: [:x |
            newColumn := row at: x.
            (newColumn isNil)
                ifFalse: [definedColumns addLast:
``` newColumn]]].
    NewColumnList := definedColumns.
    MasterColumnList at: 1 put: NewColumnList].!

selectedColumns: aListPane
    "puts the tablename.column name in the appopriate
        text pane"
    | tableName columnName row cell contents done endChar
i |
    tableName := t1ListPane selectedItem.
    contents := aListPane selectedItem.
    endChar := 0.
    done := false.
    i := 0.
    contents do: [:char |
        ((char = $-) and: [done = false])
            ifTrue: [endChar := i.
                done := true]
            ifFalse: [i := i + 1]].
    columnName := contents copyFrom: 1 to: (endChar - 1).
    columnName := tableName , '.' , columnName , ' '.
    1 to: (matrixPane displayY) do: [:y |
        row := matrixPane paneMatrix at: y.
        1 to: (matrixPane displayX) do: [:x |
            cell := row at: x.
            (cell = activeTextPane)
                ifTrue: [self putText: columnName inPane:
cell]
    ]].!

selectedTablesViews: aListPane
    "fills the appropriate column display
        from the selected table or view"
    | x y |

```
x := aListPane selection.
y := TableColumns at: x.
(aListPane = t1ListPane)
    ifTrue: [ c1ListPane contents: y; restore;
display]! !
```

While the invention has been described in terms of a preferred embodiment in a specific system environment, those skilled in the art recognize that the invention can be practiced, with modification, in other and different hardware and software environments within the spirit and scope of the appended claims.

While the invention has been described in terms of a preferred embodiment in a specific system environment, those skilled in the art recognize that the invention can be practiced, with modification, in other and different hardware and software environments within the spirit and scope of the appended claims.

Having thus described our invention, what we claim as new, and desire to secure by Letters Patent is

1. An apparatus, having at least a display, for viewing database information stored in one or more rows and columns, comprising:
    (a) a first portion of said display for displaying a plurality of panes, wherein said panes comprise at least a SELECT clause pane, FROM clause pane, and WHERE clause pane to form a structured query language SELECT statement;
    (b) a second portion of said display for concurrently displaying a plurality of descriptors of said database information, said descriptors comprising at least one list of tables and at least one list of columns that reside within said tables;
    (c) a third portion of said display for concurrently displaying a plurality of relational operators;
    (d) means for selecting one of said panes;
    (e) means for selecting at least one of said relational operators;
    (f) means for selecting at least one of said tables and said columns; and
    (g) in response to selecting said pane, means for arranging said selected table, column and relational operator within said selected pane.

2. The apparatus according to claim 1 wherein said means for selecting said pane comprises positioning and actuating a pointing device over said SELECT clause pane, FROM clause pane, or WHERE clause pane to activate said pane.

3. The apparatus according to claim 2 further comprising a means for specifying conditions for said SELECT statement.

4. The apparatus according to claim 3 wherein said specifying means comprises:
    means for selecting said WHERE clause pane;
    means for selecting at least one table from said list of displayed tables;
    means for selecting at least one column from said list of columns; and
    means for selecting at least one operator, thereby forming a WHERE clause in said SELECT statement.

5. The apparatus according to claim 3 wherein said specifying means comprises:
    means for selecting a GROUP-BY clause pane from said panes;
    means for selecting at least one table from said list of displayed tables;
    means for selecting at least one column from said list of columns; and
    means for selecting at least one relational operator, thereby forming a GROUP-BY clause in said SELECT statement.

6. The method according to claim 3 wherein said specifying means comprises:
    means for selecting a HAVING clause pane from said panes;
    means for selecting at least one table from said list of displayed tables;
    means for selecting at least one column from said list of columns; and
    means for selecting at least one relational operator, thereby forming a HAVING clause in said SELECT statement.

7. A method for directing a computer to access a plurality of database information, comprising the steps of:
    displaying a plurality of panes on a first portion of a display, wherein said panes comprise at least a SELECT clause pane, from clause pane, and WHERE clause pane to form a structured query language SELECT statement;
    concurrently displaying a plurality of descriptors of said plurality of database information on a second portion of said display, said descriptors comprising at least one list of tables and at least one list of columns that reside within said tables;
    concurrently displaying at least one relational operator on a third portion of said display;
    selecting one of said panes;
    selecting at least one of said tables and columns;
    selecting at least one of said relational operators to modify said selected table and column; and in response to selecting said pane, arranging said selected table, column, and relational operator within said selected pane.

8. The method according to claim 7 wherein said step of selecting said pane comprises the steps of positioning and actuating a pointing device over said SELECT clause pane, FROM clause pane, or WHERE clause pane to activate said pane.

9. The method according to claim 8 further comprising the step of specifying conditions for said SELECT statement.

10. The method according to claim 9 wherein said specifying step comprises the steps of:
selecting said WHERE clause pane;
selecting at least one table from said list of displayed tables;
selecting at least one column from said list of columns; and
selecting at least one operator to modify said selected at least one column, thereby forming a WHERE clause in said SELECT statement.

11. The method according to claim 9 wherein said specifying step comprises the steps of:
selecting a GROUP-BY clause pane from said panes;
selecting at least one table from said list of displayed tables;
selecting at least one column from said list of columns; and
selecting at least one relational operator to modify said at least one column, thereby forming a GROUP-BY clause in said SELECT statement.

12. The method according to claim 9 wherein said specifying step comprises the steps of:
selecting a HAVING clause pane from said panes;
selecting at least one table from said list of displayed tables;
selecting at least one column from said list of columns; and
selecting at least one relational operator to modify said at least one column, thereby forming a HAVING clause in said SELECT statement.

13. An apparatus, having at least a display, for viewing database information stored in one or more rows and columns, comprising:
a first portion of said display for displaying at least one pane, wherein said at least one pane comprises at least a FULLSELECT text pane;
a second portion of said display for concurrently displaying a plurality of descriptors of said database information, said descriptors comprising a list of at least one SELECT statement;
a third portion of said display for concurrently displaying a plurality of relational operators;
means for selecting one of said FULLSELECT text panes;
means for selecting at least one of said SELECT statements;
means for selecting at least one of said relational operators; and
in response to selecting said FULLSELECT pane, means for arranging said at least one selected SELECT statement and relational operator within said FULLSELECT pane.

14. The apparatus according to claim 13 further comprising:
a fourth portion of said display for concurrently displaying a plurality of action operators.

15. The apparatus according to claim 14 wherein said for selecting said pane comprises means for positioning and actuating a pointing device over one of said action operators to activate said FULLSELECT text pane.

16. The apparatus according to claim 15 further comprising means for specifying conditions for said FULLSELECT statement.

17. The apparatus according to claim 16 wherein said action operators comprise OPEN, DELETE, TRANSFER, and CREATE action buttons.

18. The apparatus according to claim 17 wherein said specifying means comprises:
means for selecting said TRANSFER action button;
means for selecting a first said SELECT statement;
means for selecting at least one of said relation operators; and
means for selecting a second SELECT statement.

19. The apparatus according to claim 18 wherein said relation operators comprise NULL, BETWEEN, AND INTERSECTION, EXCEPT, ALL, EXISTS, NOT, and UNION buttons.

20. A method for directing a computer to access a plurality of database information, comprising the steps of:
displaying at least one pane on a first portion of a display, wherein said at least one pane comprises at least a FULLSELECT text pane;
concurrently displaying a plurality of descriptors of said plurality of database information on a second portion of said display, said descriptors comprising a list of SELECT statements;
concurrently displaying a plurality of relational operators on a third portion of said display;
selecting one of said FULLSELECT text pane;
selecting at least one of said SELECT statements;
selecting at least one of said relational operators; and
in response to selecting said FULLSELECT pane, arranging said selected at least one SELECT statement and said relational operator within said FULLSELECT pane.

21. The method according to claim 20 further comprising the steps of concurrently displaying a plurality of action operators on a fourth portion of said display.

22. The method according to claim 21 wherein said step of selecting said pane comprises the steps of positioning and actuating a pointing device over one of said action operators to activate said FULLSELECT text pane.

23. The method according to claim 22 further comprising the step of specifying conditions for a FULLSELECT statement.

24. The method according to claim 23 wherein said action operators comprise OPEN, DELETE, TRANSFER, and CREATE action buttons.

25. The method according to claim 24 wherein said specifying step comprises the steps of:
selecting said TRANSFER action button;
selecting a first said SELECT statement;
selecting at least one of said relation operators; and
selecting a second SELECT statement to modify said selected first SELECT statement according to said selected at least one relation operator, thereby forming said FULLSELECT statement.

26. The method according to claim 25 wherein said relation operators comprise NULL, BETWEEN, AND, INTERSECTION, EXCEPT, ALL, EXISTS, NOT, and UNION buttons.

* * * * *

UNITED STATES PATENT AND TRADEMARK OFFICE
CERTIFICATE OF CORRECTION

PATENT NO. : 5,418,950  
DATED : May 23, 1995  
INVENTOR(S) : Shih-Gong Li and Theodore J. L. Shrader Page 1 of 2

It is certified that error appears in the above-indentified patent and that said Letters Patent is hereby corrected as shown below:

Col. 22, line 30, delete "select$_3$" and insert --select_--;

Col. 25 & 26, LINE 63, " 'PMConstants'!... menu" should be moved to Col. 27, line 1, and inserted before --! textfame each Menu!...--

Col. 26, line 62, insert the following:

--SOURCE CODE LISTINGS

The following prototype code was written in Smalltalk/V PM for the OS/2 environment. View is the main class. Its subclasses are SubSelectView for the SubSelect interface, FullSelectView for the FullSelect interface, MainView for the main view interface, and DefineColumnView for the Logical Table interface.

```
           VIEW CLASS SOURCE CODE
    ApplicationWindow subclass:  =View
       instanceVariableNames:
         'exists buttons '
       classVariableNames:
         'MasterColumnList Views TableColumns
    SubSelectList MasterTableList Tables
    NewColumnList '
       poolDictionaries:
```

BEST AVAILABLE COPY

UNITED STATES PATENT AND TRADEMARK OFFICE
CERTIFICATE OF CORRECTION

PATENT NO. : 5,418,950
DATED : May 23, 1995
INVENTOR(S) : Shih-Gong Li and Theodore J. L. Shrader It is certified that error appears in the above-indentified patent and that said Letters Patent is hereby corrected as shown below:

Col. 85, line 31, after "Letters Patent is" insert --:--;
Col. 86, line 55, delete "from" and insert --FROM--; and
Col. 88, line 17, after "AND" insert --,--.

Signed and Sealed this

Twentieth Day of August, 1996

Attest:

BRUCE LEHMAN

*Attesting Officer*    *Commissioner of Patents and Trademarks*